United States Patent [19]
Johannsen

[11] Patent Number: 5,974,437
[45] Date of Patent: Oct. 26, 1999

[54] FAST ARRAY MULTIPLIER

[75] Inventor: David L. Johannsen, San Gabriel, Calif.

[73] Assignee: Synopsys, Inc., Mountain View, Calif.

[21] Appl. No.: 08/759,101

[22] Filed: Dec. 2, 1996

[51] Int. Cl.$^6$ .................................................. G06F 7/52
[52] U.S. Cl. .......................... 708/630; 708/625; 708/627
[58] Field of Search ........................ 364/748.11, 754.01, 364/757, 759, 760.01–760.04, 768, 786.03, 786.04

[56] References Cited

U.S. PATENT DOCUMENTS

| | | | |
|---|---|---|---|
| 4,168,530 | 9/1979 | Gajski et al. | 364/760 |
| 4,556,948 | 12/1985 | Mercy | 364/757 |
| 4,575,812 | 3/1986 | Kloker et al. | 364/760 |
| 4,748,583 | 5/1988 | Noll | 364/758 |
| 4,752,905 | 6/1988 | Nakagawa et al. | 364/757 |
| 4,831,577 | 5/1989 | Wei et al. | 364/757 |
| 4,843,585 | 6/1989 | Williams | 364/759 |
| 4,910,701 | 3/1990 | Gibbons et al. | 364/760 |
| 5,010,510 | 4/1991 | Nishimura et al. | 364/758 |
| 5,072,419 | 12/1991 | Zyner | 364/757 |
| 5,101,372 | 3/1992 | Heaslip | 364/758 |
| 5,181,185 | 1/1993 | Han et al. | . |
| 5,243,551 | 9/1993 | Knowles et al. | 364/750.5 |
| 5,265,043 | 11/1993 | Naini et al. | 364/757 |
| 5,325,320 | 6/1994 | Chiu | 364/760 |
| 5,347,482 | 9/1994 | Williams | 364/757 |
| 5,404,323 | 4/1995 | Xu et al. | 364/757 |
| 5,446,651 | 8/1995 | Moyse et al. | 364/760 |
| 5,491,640 | 2/1996 | Sharma et al. | 364/488 |
| 5,504,915 | 4/1996 | Rarick | 395/800 |
| 5,521,837 | 5/1996 | Frankle et al. | 364/491 |
| 5,524,090 | 6/1996 | Iwamura | 364/757 |

OTHER PUBLICATIONS

Kinsey, "M5C™ Series CMOS Gate Arrays Design Reference Guide", 1994, 7–86, Motorola M5C Series Design Reference Guide.

"Partial Product Array for High–Speed Multiply Using Adders for Multiple Additions", Jun. 1971, pp. 287–289, IBM Technical Disclosure Bulletin.

Wallace, "A Suggestion for a Fast Multiplier", Feb. 1964, vol. EC–13, pp. 14–17, IEEE Transactions on Electronic Computers.

Hwang, "Computer Arithmetic, Principles, Architecture, and Design", 1979, pp. 161–212, School of Electrical Engineering, Purdue University.

Johannsen, David Lawrence, *Silicon Compilation*, Technical Report #4530, Department of Computer Science, California Institute of Technology, Pasadena, California, 1981.

*Primary Examiner*—Emmanuel L. Moise
*Attorney, Agent, or Firm*—D'Alessandro & Ritchie

[57] ABSTRACT

A number of adder structures (also referred to herein as "tiles" and "Quickadders™") are provided which may be constructed with positively and/or negatively weighted and signed inputs and outputs and which may be placed so as to span one or more bitslices of a multiplier array. In a second aspect of the present invention, groups of replicable circuitry columns are provided for forming multiplier arrays for multiplying binary numbers X and Y to obtain a binary product Z. These groups of columns of circuitry include left column groups to handle X-inputs to the array, internal column groups, and right column groups to handle outputs to a CLA adder/subtractor (or equivalent) for processing the MSBs of the product. The LSBs of the product are produced directly by the array. The groups may be thought of as replacing 2, 3 or 4 conventional columns of full-adder circuitry of a basic array such as that shown in FIGS. 1 and 2. The new groups of columns significantly speed up the process of multiplication through use of rewiring techniques and the use of Fc, Fo, Fx, Fw, Fz, Fv, Fu and/or Fy-type Quickadders™ and associated circuitry.

69 Claims, 73 Drawing Sheets

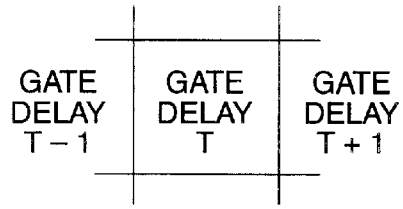
FIG. 6B
LEGEND OF THE TOPOLOGY SCHEMATIC COMPONENTS:
HALF ADDERS:
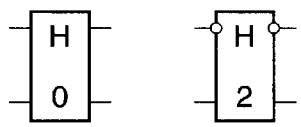
FULL ADDERS:
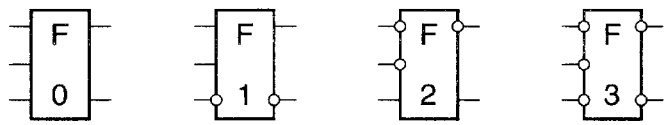
'AND' GATES:
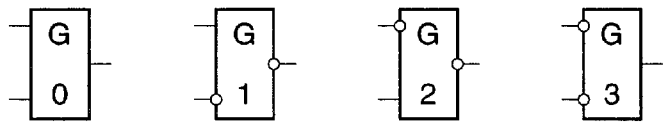
INPUT BUFFERS:
CRITICAL SIGNAL MARK:
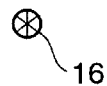
ITERATION CELL MARK:
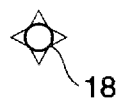
FIG. 7

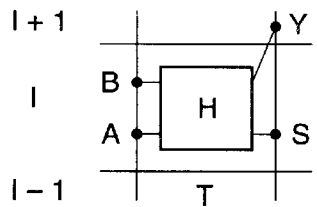
FORMS NEEDED:
| A | B | Y | S | |
|---|---|---|---|---|
| +1 | +1 | +2 | +1 | H0(0) |
| −1 | +1 | −2 | +1 | H2(1) |
FIG. 8
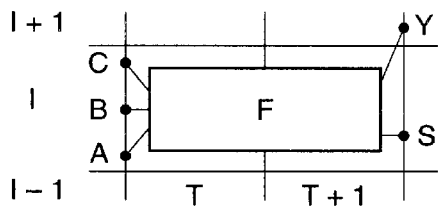
(A)
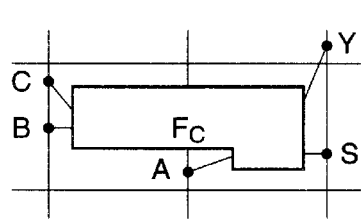
(B)
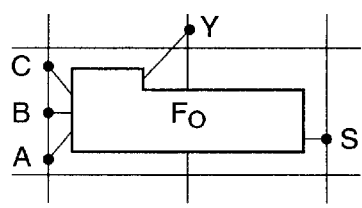
(C)
FORMS NEEDED:
| A | B | C | Y | S | | |
|---|---|---|---|---|---|---|
| +1 | +1 | +1 | +2 | +1 | F, $F_C$, $F_O$ | (0) |
| +1 | +1 | −1 | +2 | −1 | F, $F_C$ | (4) |
| +1 | −1 | +1 | +2 | −1 | F, $F_C$ | (2) |
| +1 | −1 | −1 | −2 | +1 | $F_O$ | (6) |
| −1 | +1 | +1 | +2 | −1 | $F_C$ | (1) |
| −1 | +1 | −1 | −2 | +1 | $F_C$ | (5) |
| −1 | −1 | +1 | −2 | +1 | F, $F_C$, $F_O$ | (3) |
| −1 | −1 | −1 | −2 | −1 | F, $F_C$ | (7) |
FIG. 9
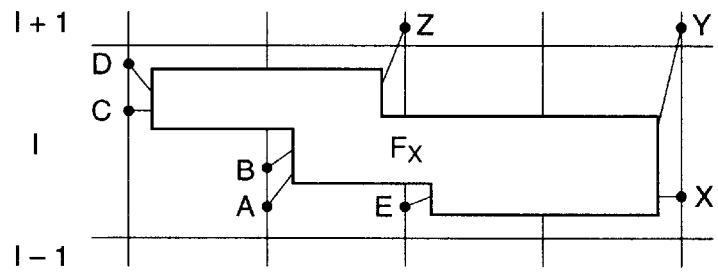
FORMS NEEDED:
| | A | B | C | D | E | Z | Y | X |
|---|---|---|---|---|---|---|---|---|
| $F_X(3)$ | −1 | −1 | +1 | +1 | +1 | −2 | +2 | +1 |
| $F_X(11)$ | −1 | −1 | +1 | −1 | +1 | −2 | +2 | −1 |
| $F_X(0)$ | +1 | +1 | +1 | +1 | +1 | +2 | +2 | +1 |
FIG. 10

TYPE D1F/S
WIDTH 7
TWO'S COMP.

TYPE D2I/S
WIDTH 7
TWO'S COMP.

TYPE D2F/S
WIDTH 7
TWO'S COMP.

TYPE E2i/S
WIDTH 8
TWO'S COMP.

TYPE G2/S
WIDTH 7
TWO'S COMP.

TYPE HF2C/S
WIDTH 5
TWO'S COMP.

"F"

```
                       SIGNED MULTIPLIER ARRAYS

//              Column index in multiplier array
//      mode  0     1     2     3     4     5     6     7     8     9     10
//
//      0:    .....A/S..Ci/S.Ci/S.Ci/S.Ci/S.Ci/S.Ci/S.Ci/S.Ci/S.Ci/S.Cf/S
//      1:    .....A/S..Ci/S......Hi/S......Hi/S......Hi/S......Hf/S
//            .....A/S.......Hi/S......Hi/S......Hi/S......Hf/S
//      2:    .....A/S..Ci/S......D1i/S.....D1i/S.....D1i/S.....D1f/S
//            .....A/S.......D1i/S.....D1i/S.....D1i/S.....D1f/S
//      3:    .....A/S..Ci/S.Ci/S.Ci/S...........E0i/S..........E0f/S
//            .....A/S..Ci/S.Ci/S...........E0i/S..........E0f/S
//            .....A/S..Ci/S...........E0i/S..........E0f/S
//      4:    .....A/S..Ci/S.Ci/S.Ci/S...........E1i/S..........E1f/S
//            .....A/S..Ci/S.Ci/S...........E1i/S..........E1f/S
//            .....A/S..Ci/S...........E1i/S..........E1f/S
//      5:    .....A/S.......D2i/S.....D2i/S.....D2i/S.....D2f/S
//            ..........B2/S......D2i/S.....D2i/S.....D2i/S.....D2f/S
//      6:    ..........B2/S......D2i/S..........E2i/S..........E2f/S
//            ................G2/S..........E2i/S..........E2f/S
//            .....A/S..Ci/S..........E2i/S..........E2f/S
```

*FIG. 24A*

```
                       UNSIGNED MULTIPLIER ARRAYS

//              Column index in multiplier array
//      mode  0     1     2     3     4     5     6     7     8     9     10
//
//      0:    .....A/U..C/U..C/U..C/U..C/U..C/U..C/U..C/U..C/U..C/U
//      1:    .....A/U..C/U.......H/U.......H/U.......H/U.......H/U
//            .....A/U.......H/U.......H/U.......H/U.......H/U
//      2:    .....A/U..C/U.......D1/U......D1/U......D1/U......D1/U
//            .....A/U.......D1/U......D1/U......D1/U......D1/U
//      3:    .....A/U..C/U..C/U..C/U............E0/U............E0/U
//            .....A/U..C/U..C/U............E0/U............E0/U
//            .....A/U..C/U............E0/U............E0/U
//      4:    .....A/U..C/U..C/U..C/U............E1i/U..........E1f/U
//            .....A/U..C/U..C/U............E1i/U...........E1f/U
//            .....A/U..C/U............E1i/U..........E1f/U
//      5:    .....A/U.......D2i/U.....D2i/U.....D2i/U......D2f/U
//            ..........B2/U......D2i/U.....D2i/U.....D2i/U.....D2f/U
//      6:    ..........B2/U......D2i/U..........E2i/U..........E2f/U
//            ................G2/U..........E2i/U...........E2f/U
//            .....A/U..C/U............E2i/U..........E2f/U
```

FAST ARRAY MULTIPLIER

BACKGROUND OF THE INVENTION

1. Technical Field

This invention relates to the field of array multipliers. More particularly, this invention relates to fast array multipliers which utilize optimized regular structure, elements and layout to achieve significant processing speed gains over prior art structures. Still more particularly, this invention relates to fast array multipliers which can be easily computer generated with CAD-type software and easily implemented in VLSI and other high density semiconductor chips.

2. Background Art

Array multipliers are used to multiply two binary number values, each having a known number of bits. FIG. 1 depicts a basic unsigned multiplier array for multiplying two 5 bit numbers, X and Y. FIG. 1 is, in essence, derived from FIG. 6.3 of Kai Hwang's book, *Computer Arithmetic: Principles, Architecture and Design*, John Wiley & Sons, 1979, p. 164. The least significant input bits (LSBs), i.e., $2^0$, are denoted $X_0$ and $Y_0$. The most significant input bits (MSBs) are denoted $X_4$, $Y_4$. Three types of devices are used within this array multiplier to accomplish the multiplication function. These are AND gates (denoted by a 2-input, 1-output device marked with a "G") which are used to form partial products and half-adders (denoted by a 2-input, 2-output device marked with an "H") and 3/2 full-adders or simply "full-adders" (denoted by a 3-input, 2-output device marked with an "F") which are used to combine the partial products into a product or result. A half-adder may be formed from a full-adder with one of its inputs tied to zero, or as a specialized device.

The multiplication of an N-bit binary number by an N-bit binary number yields a 2N-bit binary product. Likewise, the multiplication of an N-bit number by an M-bit number yields an N+M-bit binary product. In the array multiplier of FIG. 1, the product's 5 LSBs are obtained directly from outputs $Z_0$–$Z_4$ at the "bottom" of the array (Note that the terms "right", "left", "top" and "bottom" and similar positional notations are used herein with reference to idealized diagrams such as FIGS. 1 and 2 and are not meant to be limiting—actual circuit implementations in VLSI hardware will, in many cases, bear no physical relationship to these positional notations due to the use of CAD routing techniques). The product's MSBs are derived from applying the four pairs of carry and sum outputs along the "right" side of the array to an adder, typically a Carry Look Ahead (CLA) Adder, to yield outputs $Z_5$–$Z_9$, $Z_9$ being the final carry of this addition step. The ability to obtain $Z_0$–$Z_4$ directly without a large adder structure for processing all of the outputs of the array is a very advantageous feature of this type of multiplier from both a speed and an areal perspective. It is noted that it is virtually always the case that customers desire faster and smaller (or higher density) electronic components.

As discussed above, in the FIG. 1 array multiplier, there are three elements used. These elements are denoted "G0", "H0" and "F0". These are an AND gate and the most basic forms of half-adder and full-adder, respectively. The truth table for G0 (diagrammed in FIG. 3A) is simply that of a simple AND gate, as given in Table 1:

TABLE 1

| A | B | S |
|---|---|---|
| 0 | 0 | 0 |
| 0 | 1 | 0 |
| 1 | 0 | 0 |
| 1 | 1 | 1 |

The truth table for H0 (diagrammed in FIG. 4A) is given in Table 2:

TABLE 2

| A | B | Y | S |
|---|---|---|---|
| 0 | 0 | 0 | 0 |
| 0 | 1 | 0 | 1 |
| 1 | 0 | 0 | 1 |
| 1 | 1 | 1 | 0 |

The truth for F0 (diagrammed in FIG. 5A) is given in Table 3:

TABLE 3

| A | B | C | Y | S |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

An example of a binary multiplication of two five-bit binary numbers as it would be out with X=10101 and Y=11111 is set forth below:

|    |   |   |   |   |   | 1 | 0 | 1 | 0 | 1 | X |
|----|---|---|---|---|---|---|---|---|---|---|---|
|    |   |   |   |   | × | 1 | 1 | 1 | 1 | 1 | Y |
| P1 |   |   |   |   |   | 1 | 0 | 1 | 0 | 1 |   |
| P2 |   |   |   |   | 1 | 0 | 1 | 0 | 1 |   |   |
| P3 |   |   |   | 1 | 0 | 1 | 0 | 1 |   |   |   |
| P4 |   |   | 1 | 0 | 1 | 0 | 1 |   |   |   |   |
| P5 |   | 1 | 0 | 1 | 0 | 1 |   |   |   |   |   |
|    | 1 | 0 | 1 | 0 | 0 | 0 | 1 | 0 | 1 | 1 |   |

The array of data P1–P5 represents the "partial products" of the multiplication of Y×X and corresponds to the outputs of the various AND gates G0 in the FIG. 1 array. The row P1 is simply the outputs of the AND gates denoted G0 in the column under the Y0 input of FIG. 1. Row P2 corresponds to the outputs of the AND gates G0 under input Y1, etc.

The binary weight of the inputs and outputs is important. The binary weight refers to the relative binary magnitude of the input or output (or the partial product or other intermediate signal within the array multiplier). In the full-adder described by the truth table in Table 3, if each of the inputs have a binary weight of 1 (e.g., $2^0$), then Y has a binary weight of 2 (e.g., $2^1$) since it represents an accumulation of two of the binary inputs of weight 1. In adders, the binary weight of inputs and outputs may also be signed, i.e., it may be positive or negative and may thus represent: +1, −1, +2, −2, +4, −4, +8, −8, +16, −16, etc. depending upon the construction of the adder. It should also be noted that in full-adders, the outputs must be constructed to account for the full range of the possible inputs. Thus a simple unsigned input/output full-adder for adding three one-bit numbers of the same binary weight must provide for a sum output of the same binary weight as the inputs and a carry output of the next higher binary weight. For example, if the inputs each represent $2^0$ (or 1 decimal), then their sum is 3 decimal or "11" binary which resolves to $1 \times 2^0 + 1 \times 2^1$. This constraint applies to all adders, whether signed or not, and whether its inputs deal with one binary weight or a multitude of binary weights.

The term "bitslice" describes the diagonal part of the multiplier circuit located between the $X_N$ and $X_{N+1}$ bit input lines. Thus, bitslice B0 is the diagonal portion of array 10 of FIG. 1 between the $X_0$ and $X_1$ bit input lines as shown by dashed lines. This portion of the array has a binary magnitude or weight of 0 since its output, if "1" has a value of $2^0$. Bitslice B1, adjacent to B0 as shown, has a weight of 1, etc., up to bitslice B8, the diagonal at the upper right hand side of the FIG. 1 array.

While the array multiplier of FIG. 1 is a very straightforward way to produce an array multiplier, it does not represent the fastest approach to obtaining the product number. Furthermore, it lacks a mechanism for dealing with negative (e.g., two's complement) number multiplication.

The basic two's complement array multiplier of FIG. 2, derived from FIG. 6.10 of *Computer Arithmetic: Principles, Architecture and Design, supra*, p. 177, addresses the problem of signed numbers by using an array of AND gates and different types of half-adders and full-adders as shown. The MSBs of the product are obtained from a carry look ahead subtractor coupled to the carry and sum outputs along the right hand side of the array and to carry forward signal $Z_4$ as shown.

The essential difference between the "unsigned" multiplier array of FIG. 1 and the "two's complement" or "signed" multiplier array of FIG. 2 is that in FIG. 1 the bits denoted $X_4$, $Y_4$, i.e., the most significant bits in the X and Y inputs, have a value or magnitude of $2^4$ or 16. In FIG. 2, the same bits have a value of $-2^4$ or $-16$—the same binary magnitude, but a different sign. In this way, the MSB in FIG. 2 determines the sign of the number. Processing this negatively signed value requires that negatively signed values be accounted for in the array of FIG. 2. Accordingly, in the array of FIG. 2, bitslices B4–B8 provide for the possibility that $X_4$ and/or $Y_4$ may be asserted, denoting that X and/or Y is a negatively valued number. This is accomplished by providing versions of half-adders and full-adders which are adapted to receive negatively weighted inputs and provide negatively weighted outputs, where required.

In the FIG. 2 array multiplier, devices denoted "G1", "G2", "G3", "H2", "F1", "F2" and "F3" are also used to obtain the desired output. These devices are diagrammed, respectively, at FIGS. 3B, 3C, 3D, 4B, 5B, 5C and 5D. The black dots at the inputs and outputs of the devices in these figures (and the bubbled dots in, for example, FIG. 2) indicate negatively weighted input/output signals (i.e., those signals where a "1" represents a negatively weighted binary value). The G0, G1, G2 and G3 devices all have the same truth table and all represent the same circuit—the dot or bubble notation is merely used to indicate the existence of a negatively signed binary signal on a respective input or output which is a significant aid in comprehending the figures that follow. Thus, for example, each type of full-adder (FIGS. 5A, 5B, 5C and 5D) is named for the number of its negatively weighted inputs, thus F0 has no negatively weighted inputs, F2 has two negative inputs and one positive input, etc.

Noting that the F0 and F3 full adders and the F1 and F2 full adders share the same truth tables with different column headings, TABLE 4 shows the truth table for these various adders:

TABLE 4

| FULL ADDER | WEIGHTED INPUTS | | | WEIGHTED OUTPUTS | |
|---|---|---|---|---|---|
| F0 | A | B | C | Y | S |
| F3 | −A | −B | −C | −Y | −S |
| | 0 | 0 | 0 | 0 | 0 |
| | 0 | 0 | 1 | 0 | 1 |
| | 0 | 1 | 0 | 0 | 1 |
| | 0 | 1 | 1 | 1 | 0 |
| | 1 | 0 | 0 | 0 | 1 |
| | 1 | 0 | 1 | 1 | 0 |
| | 1 | 1 | 0 | 1 | 0 |
| | 1 | 1 | 1 | 1 | 1 |
| F1 | A | B | −C | Y | −S |
| F2 | −A | −B | C | −Y | S |
| | 0 | 0 | 0 | 0 | 0 |
| | 0 | 0 | 1 | 0 | 1 |
| | 0 | 1 | 0 | 1 | 1 |
| | 0 | 1 | 1 | 0 | 0 |
| | 1 | 0 | 0 | 1 | 1 |
| | 1 | 0 | 1 | 0 | 0 |
| | 1 | 1 | 0 | 1 | 0 |
| | 1 | 1 | 1 | 1 | 1 |

Signed array multipliers constructed according to FIG. 2 and similar models have regular structure, which lends itself to datapath implementation on VLSI chips, particularly deep sub-micron chips. Most interconnects are very short in these implementations which means that these interconnects will not have significant delays. Nonetheless, these multipliers are relatively slow. The speed of the circuit is limited by the propagation of data through the half-adders and full-adders from "left" to "right", with the result that it takes approximately one full-adder delay ("FAdelay"—the amount of time needed to propagate a signal from the inputs to the outputs of a conventional 3/2 full-adder—also referred to as two "gate-delays") for the signals to pass each "column" in the array (A "column" simply being a vertical array of full-adders one full-adder wide). For an N×N multiplier, the propagation delay through the array is approximately (N−1)* FAdelay. "Column 2" of FIG. 2 is the circuitry shown in the box labelled "Col. 2" of FIG. 2. Signals propagate from Column 0 at the "left" of the array through the array toward Column 4 at the right of the array and from there into the CLA subtractor for final processing of the MSBs of the product.

Three basic methods are known for increasing the speed of an array multiplier. First, recoding techniques such as Booth's algorithm (A. D. Booth, "A Signed Binary Multiplication Technique", Quart. J. Mich., Appl. Math, Vol. 4, Part 2, 1951) provides for reducing the number of partial products, and hence the number of full-adder columns within the array. Implementations of Booth-type multipliers are illustrated for example in U.S. Pat. Nos. 4,168,530 to Gajski et al. and 4,575,812 to Kloker et al. A major drawback to the use of Booth-type recoded multiplier structures in a VLSI chip is the fact that they tend to be large and require pre-processor blocks which consume additional area and add some delay.

Second, variations in gate level circuit design can be used to speed portions of the circuit. Unfortunately, because the elements of the multiplier, e.g., AND gates, half-adders and full-adders, tend to be highly specialized and predetermined, optimization within these elements tends to work against the desire for easy replication and scaling.

Finally, the interconnection scheme of the elements of the multiplier can be varied to affect performance. For example, a Wallace Tree or Binary Tree adder arrangement can be used to obtain a significant speed performance enhancement over the simple multipliers of FIGS. 1 and 2. A basic Wallace Tree is described by C. S. Wallace in "*A Suggestion for a Fast Multiplier*", *I.E.E.E. Transactions on Electronic Computers*, Vol. EC-13, Febuary 1964, pp. 14–17. Wallace Trees multipliers utilize a tree-like arrangement of carry-save adders (CSAs). While fast, unfortunately, these arrangements lead to complex interconnection arrangements, often with one or more signal leads being much longer than the others, resulting in signal propagation delay problems. They also do not lend themselves to easy replication and scaling.

U.S. Pat. No. 4,752,905 to Nakagawa et al. teaches the use of an array of positive input/positive output 3/2 full-adders (full-adders with three positively weighted binary inputs, A, B and C, and two positively weighted binary outputs, Y (carry) and S (sum)) designed so that the "C" input (one of the three inputs) can arrive later than the "A" and "B" inputs and still yield the desired Y and C outputs at the appointed time. These full-adders are part of the class of full-adders referred to herein as "Fc" adders (see, e.g., FIG. 9). In Nakagawa's embodiment, these Fc adders are used in an array structure to reduce inter-adder gate propagation delays approximately 50% over the basic designs shown in FIGS. 1 and 2. This is achieved, in effect, by interleaving the Fc adders to effectively compress the column widths of the adder arrays by directing "slow" output signals to skip over certain columns and using "fast" inputs to combine with skipped slow signals thus achieving a net speed gain in the processing of signals within the array itself. This approach, unfortunately, results in all of Nakagawa et al.'s output signals from the array being in the carry/sum format which requires that they be applied to an adder structure of some type in order to form the $Z_0 \ldots Z_N$ bit outputs which are required of a multiplier array. While Nakagawa et al.'s multiplier is fit for its intended purpose, additional speed performance gains are desired in array multipliers.

What is needed is an array-type multiplier circuit, suitable for easy replication and scaling within computer generated VLSI chip designs which provides the regularity of circuit layout desirable in such computer generated designs with the speed advantages of Wallace tree multipliers.

SUMMARY OF THE INVENTION

If an adder is thought of generally as providing the function of taking certain inputs at time 0 and providing certain outputs at a later time, such as time 2, 3, 4 or 5, corresponding to the number of gate-delays needed to propagate a signal from the inputs to the outputs of the adder, then the ability to receive inputs later than at time 0 and/or to generate outputs earlier than at time 2, 3, 4 or 5 can provide a means for decreasing the total time necessary for processing a signal through a multiplier array employing these specialized adders. Accordingly, in one aspect of the present invention, a number of adder structures (also referred to herein as "tiles" and "Quikadders™") are provided which may be constructed with positively and/or negatively weighted and signed inputs and outputs and which may be placed so as to span one or more bitslices of a multiplier array:

Fc is a 3/2 Quikadder™ with inputs B and C at time 0, input A at time 1, and outputs Y and C available at time 2.

Fo is a 3/2 Quikadder™ with inputs A, B and C at time 0, output Y available at time 1 and output C available at time 2.

Fx is a 5/3 Quikadder™ with inputs C and D at time 0, inputs A and B at time 1, output Z and input E at time 2, and outputs X and Y available at time 4.

Fw is a 5/3 Quikadder™ with inputs B, C, D and E at time 0, input A at time 1, output Z available at time 2, and outputs X and Y available at time 3.

Fz is a 5/3 Quikadder™ with inputs B, C and D at time 0, inputs A and E at time 1, output Z available at time 2, and outputs X and Y available at time 3.

Fv is a 5/3 Quikadder™ with inputs B, C and D at time 0, inputs A and E at time 1, outputs X and Z available at time 2, and output Y available at time 3.

Fu is a 5/3 Quikadder™ with inputs B, C, D and E at time 0, input A at time 1, and outputs X, Y and Z available at time 2.

Fy is a 5/3 Quikadder™ with inputs B, C and D at time 0, inputs A and E at time 1, and outputs X, Y and Z available at time 2.

According to a second aspect of the present invention, groups of replicable circuitry columns are provided for forming multiplier arrays for multiplying binary numbers X and Y to obtain a binary product Z. These groups of columns of circuitry include left column groups to handle X-inputs to the array, internal column groups, and right column groups to handle outputs to a CLA adder/subtractor (or equivalent) for processing the MSBs of the product. The LSBs of the product are produced directly by the array. The groups may be thought of as replacing 2, 3 or 4 conventional columns of full-adder circuitry of a basic array such as that shown in FIGS. 1 and 2. The new groups of columns significantly speed up the process of multiplication through use of rewiring techniques and the use of Fc, Fo, Fx, Fw, Fz, Fv, Fu and/or Fy-type Quikadders™ and associated circuitry.

OBJECTS AND ADVANTAGES OF THE INVENTION

Accordingly, it is an object and advantage of the present invention to provide novel classes of adders which may be easily replicated to provide for late inputs and/or early outputs for use in speeding up the processing of an array multiplier.

It is a further object and advantage of the present invention to provide novel classes of adders capable of processing both positively weighted binary input values and negatively weighted binary input values to produce corresponding positively weighted and/or negatively weighted binary output values, which adders may be easily replicated to provide for late inputs and/or early outputs for use in speeding up the processing of an array multiplier.

It is a further object of the present invention to provide improved circuitry for carrying out high speed binary multiplication, both signed and unsigned.

These and many other objects and advantages of the present invention will become apparent to those of ordinary skill in the art from a consideration of the drawings and ensuing description of the invention.

BRIEF DESCRIPTION OF THE DRAWINGS

FIG. 6B is a diagram showing the orientation of gate-delays.

FIG. 7 is a diagram showing the various symbols used to indicate half-adders, full-adders, AND gates, input buffers, critical signal marks and iteration cell marks in the drawings.

FIG. 8 is a diagram showing the timing and bitslice orientation of the inputs and outputs of a half-adder and calling out the types of half-adders used in the invention.

FIG. 9 is a diagram showing the timing and bitslice orientation of the inputs and outputs of type F 3/2 full-adders and type Fc and Fo 3/2 Quikadders™ and calling out the types of these devices used in the invention.

FIG. 10 is a diagram showing the timing and bitslice orientation of the inputs and outputs of an Fx Quikadder™ 5/3 adder and calling out the types of Fx Quikadders™ used in the invention.

FIG. 24A is a diagram showing a presently preferred method for constructing signed multiplier arrays from the aforedescribed columns and rewired groups of columns.

FIG. 24B is a diagram showing a presently preferred method for constructing unsigned multiplier arrays from the aforedescribed columns and rewired groups of columns.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 6A:
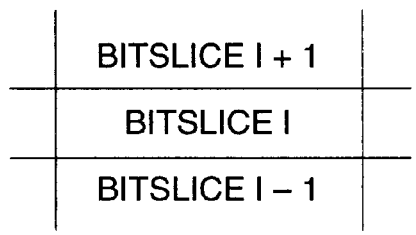
FIG. 6A is a diagram showing the orientation of bitslices.

At the outset we will define some symbols which are used in the figures in order to simplify the disclosure. Turning to FIG. 6A the concept of "bitslice" is denoted in the figures as shown in FIG. 6A—bitslices are diagonal slices through the multiplier array if the multiplier array is thought of as laid out according to FIGS. 1 and 2 (obviously, the actual physical gate level hardware implementation of the multiplier array may take any desired form or a form resulting from circuit optimization). A bitslice I-1 ("below" bitslice I) has weight of one binary magnitude less than bitslice I. Similarly, bitslice I+1 is located "above" bitslice I and has binary weight of one magnitude greater than bitslice I and two magnitudes greater than bitslice I-1. Examples of bitslices are B0 through B8 of FIGS. 1 and 2.

The concept of "gate-delay" provides a timing domain to the multiplier arrays discussed herein. In FIG. 6B the columns represent sequential gate-delay times reading from left to right of T-1, T and T+1. Thus the events occurring in column T occur one gate-delay time after those of column T-1 and one gate-delay time before those of column T+1. A typical FAdelay is equal to two gate-delays.

FIG. 7 is a legend of the symbols used in the figures. Half adders H0 and H2, Full Adders F0, F1, F2 and F3, And Gates G0, G1, G2 and G3 have all been described previously. Input buffers are indicated by symbols 12 and 1. The Critical Signal Mark is given by symbol 16. The Critical Signal Mark indicates signals with time constraints which preclude the use of conventional 3/2 full adders and instead requires the use of Quikadders™. The Cell Iteration Mark 18 is placed in bitslices which replicate to fill the datapath width of the desired device to be designed and/or fabricated. Where Cell Iteration Marks occur in each cell across a column or group of columns of circuitry, as, for example, at the box labelled 20 in FIG. 21H, the entire box may be replicated vertically to add binary width capacity to the circuit. Thus, in the circuit of FIG. 21H, a bit width of seven bits is provided—to expand this to 16 or 32 bits, simply replicate box 20 an additional 9 or 25 times, respectively. The Cell Iteration Mark in the drawings merely indicates cells which can be or have been iterated. For example, in box 21 of FIG. 21H there is a Cell Iteration Mark in only the left-most cell of box 21. To increase bit width, one would NOT iterate all of box 21, one would iterate box 20, above box 21. The cell in box 21 with the Cell Iteration Mark is simply the same as the cell above it in box 20.

FIG. 8 shows a half-adder block which occupies one bitslice and one gate-delay time. Two forms exist as shown by the weight table to the right of the half-adder block under the title "Forms Needed". These are type H0(0) and H2(1). In essence, a half-adder takes inputs of binary weight magnitude I (of sign either +or −), adds them, and generates a carry (Y) output of binary weight magnitude (I+1) or −(I+1), again, of either sign, and a sum (S) output of binary weight magnitude I (again, of either sign). The designation, for example, H2(1), simply refers to a type H2 half-adder with an A input of negative sign. This nomenclature assigns the value 1 if an A input is negatively signed, 2 for B, 4 for C, 8 for D, 16 for E, etc. The values are then added to determine the "number" for the adder block. Thus, for example, in FIG. 9, in the sixth entry of the "Forms Needed" table, since the A and C inputs for the indicated type Fc Quikadder™ are negative, the described Quikadder™ is a type Fc(5) (1+4=5).

FIG. 9 shows three basic forms of full-adders F, Fc and Fo (type Fc and Fo adders are 3/2 Quikadders™). Each of these full-adders exists in a single bitslice I and occupies two successive gate-delay times T and T+1. In the basic full-adder F, all three inputs A, B and C arrive at the beginning of gate-delay time T and result in outputs Y and S at the end of gate-delay time T+1. In Fc, inputs B and C arrive at the beginning of gate-delay time T, "late input" A arrives at the beginning of gate-delay time T+1 and outputs Y and S are available at the end of gate-delay time T+1. In Fo, inputs, B and C all arrive at the beginning of gate-delay time T and "early output" Y is available at the beginning of gate-delay time T+1 with output S available at the end of gate-delay time T+1. As shown in the table to the right of the full-adders in FIG. 9, a number of different versions of these full-adders are used to support different binary weight inputs and outputs in accordance with the present invention as shown.

FIG. 10 shows a 5/3 full-adder pair or "Quikadder™", Fx, which exists in a single bitslice, i.e., all inputs exist within bitslice I and outputs Z and Y are directed to bitslice I+1. Output X is directed to bitslice I. Three versions (Fx(3), Fx(11) and Fx(0)) are required as shown in the table at the bottom of FIG. 10.

Figure 11:
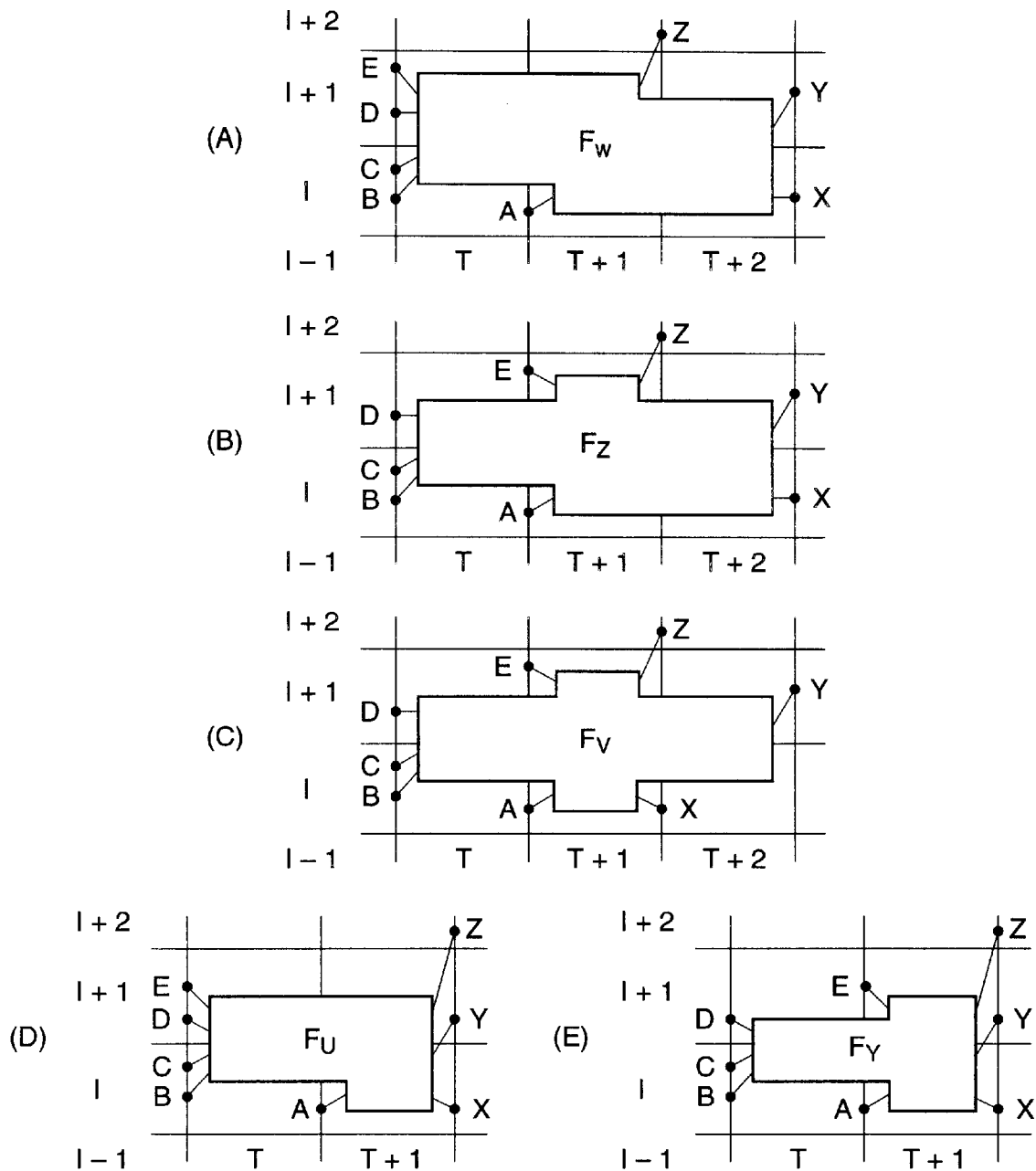
FIG. 11 is a diagram showing the timing and bitslice orientation of the inputs and outputs of Fw, Fz, Fv, Fu and Fy Quikadder™ 5/3 adders and calling out the types of these Quikadders™ used in the invention.

FIG. 11 shows five different 5/3 Quikadders™, Fw, Fz, Fv, Fu and Fy, which occupy adjacent bitslices. A 5/3 Quikadder™ has five inputs A, B, C, D, E and 3 outputs X, Y and Z. Each operates as shown in the diagrams using a combination of regular inputs, late inputs, early outputs and regular outputs as shown. Fw, Fz and Fv all require three gate delay times while Fu and Fy only require two gate-delay times. Output Z in each case is an output of two binary magnitudes greater than the A input, and hence is depicted as an output two bitslices above the A input as +/−4 in the "Forms Needed" table at the bottom of FIG. 11. Similarly, inputs E and D and output Y are one binary magnitude greater than the A input as shown in the diagram and table of FIG. 11.

FIG. 12 depicts for adders F, Fc, Fo, Fx, Fw, Fz, Fv, Fu and Fy a bitslice/timing diagram and a corresponding schematic diagram formed of F0 blocks with Critical Timing Marks marking early outputs and late inputs. These equivalent schematic symbols are used later on to more densely describe circuitry implementing the invention.

FIGS. 8, 9, 10 and 11 list some of the required circuit "tiles" used in constructing multiplier arrays according to the present invention. This section describes how to interpret the information set forth in those figures.

The line under "Forms Needed:" in FIG. 11 referring to Quikadder™ Fv(8) reads as follows:

| | A | B | C | D | E | Z | Y | X |
|---|---|---|---|---|---|---|---|---|
| Fv(8) | +1 | +1 | +1 | −2 | +2 | +4 | −2 | +1 |

This line identifies one of the circuit tiles. This tile uses the Fv timing constraints which are set forth in the bitslice/timing diagram of Fv in FIG. 11. This line also indicates the required signal weights and signs of the tile. Each of the vertical lines in the grid overlaying the Fv block in FIG. 11 represent time, with one gate-delay between lines. The B, C, and D inputs to the circuit are on one vertical line representing $T_0$, the A and E inputs are on the next line representing $T_1$, the X and Z outputs are on the line after that at $T_2$, and the Y output is on the final vertical line at $T_3$. From this diagram we can see that there should be approximately one gate-delay from the A and E inputs at $T_1$ to the X and Z outputs at $T_2$, that there should be approximately two gate-delays from the A and E inputs to the Y output, approximately two gate delays from the B, C, and D inputs to the X and Z outputs, and that there should be approximately three gate delays from the B, C, and D inputs to the Y output. Naturally, any implementation of the Fv(8) circuit may have less time along any of these paths, but if an implementation has a significantly longer delay, the performance of the multiplier will be degraded. For this discussion, the term "gate-delay" is defined relative to the delay through a conventional full-adder circuit such as F0. One gate-delay is one-half of the longest path through the full-adder.

The signal weights are used to define the logical behavior of the tile. For the example circuit, the A, B, and C inputs all have a weight of "1", the D input has the weight "−2", and the E input has the weight "2". The Z output of the circuit has the weight "4", the Y output has the weight. "−2", and the X output has the weight "+1". From this information the following Truth Table may be constructed.

TABLE 5

| A +1 | B +1 | C +1 | D −2 | E +2 | Val | Z +4 | Y −2 | X +1 |
|---|---|---|---|---|---|---|---|---|
| 0 | 0 | 0 | 0 | 0 | 0 | 0 | 0 | 0 |
| 0 | 0 | 0 | 0 | 1 | +2 | 1 | 1 | 0 |
| 0 | 0 | 0 | 1 | 0 | −2 | 0 | 1 | 0 |
| 0 | 0 | 0 | 1 | 1 | 0 | 0 | 0 | 0 |
| 0 | 0 | 1 | 0 | 0 | +1 | 0 | 0 | 1 |
| 0 | 0 | 1 | 0 | 1 | +3 | 1 | 1 | 1 |
| 0 | 0 | 1 | 1 | 0 | −1 | 0 | 1 | 1 |
| 0 | 0 | 1 | 1 | 1 | +1 | 0 | 0 | 1 |
| 0 | 1 | 0 | 0 | 0 | +1 | 0 | 0 | 1 |
| 0 | 1 | 0 | 0 | 1 | +3 | 1 | 1 | 1 |
| 0 | 1 | 0 | 1 | 0 | −1 | 0 | 1 | 1 |
| 0 | 1 | 0 | 1 | 1 | +1 | 0 | 0 | 1 |
| 0 | 1 | 1 | 0 | 0 | +2 | 1 | 1 | 0 |
| 0 | 1 | 1 | 0 | 1 | +4 | 1 | 0 | 0 |
| 0 | 1 | 1 | 1 | 0 | 0 | 0 | 0 | 0 |
| 0 | 1 | 1 | 1 | 1 | +2 | 1 | 1 | 0 |
| 1 | 0 | 0 | 0 | 0 | +1 | 0 | 0 | 1 |
| 1 | 0 | 0 | 0 | 1 | +3 | 1 | 1 | 1 |
| 1 | 0 | 0 | 1 | 0 | −1 | 0 | 1 | 1 |
| 1 | 0 | 0 | 1 | 1 | +1 | 0 | 0 | 1 |
| 1 | 0 | 1 | 0 | 0 | +2 | 1 | 1 | 0 |
| 1 | 0 | 1 | 0 | 1 | +4 | 1 | 0 | 0 |
| 1 | 0 | 1 | 1 | 0 | 0 | 0 | 0 | 0 |
| 1 | 0 | 1 | 1 | 1 | +2 | 1 | 1 | 0 |
| 1 | 1 | 0 | 0 | 0 | +2 | 1 | 1 | 0 |
| 1 | 1 | 0 | 0 | 1 | +4 | 1 | 0 | 0 |
| 1 | 1 | 0 | 1 | 0 | 0 | 0 | 0 | 0 |
| 1 | 1 | 0 | 1 | 1 | +2 | 1 | 1 | 0 |

TABLE 5-continued

| A  | B  | C  | D  | E  |     | Z  | Y  | X  |
|----|----|----|----|----|-----|----|----|----|
| +1 | +1 | +1 | -2 | +2 | Val | +4 | -2 | +1 |
| 1  | 1  | 1  | 0  | 0  | +3  | 1  | 1  | 1  |
| 1  | 1  | 1  | 0  | 1  | +5  | 1  | 0  | 1  |
| 1  | 1  | 1  | 1  | 0  | +1  | 0  | 0  | 1  |
| 1  | 1  | 1  | 1  | 1  | +3  | 1  | 1  | 1  |

The top of Table 5 above is labelled with the input and output signal names. Below these names are indicated the weights of the signals. Each line in the body of the table lists a particular combination of input values, followed by the logical value this combination represents, and ends with the required output pattern. There is one line in the table for each possible combination of input values. Consider, for example, line "N" of Table 5 marked above. The input pattern indicates that all of the inputs except for input A are active. The value associated with this line is "2". This is computed by summing the weights of all the active inputs. In this case, the active weights are "+1", "+1", "-2", and "+2", which results in the sum "+2". The output pattern indicates which outputs should be activated to result in a "2" output. To generate "+2", the "+4" and "-2" outputs should be active. Given the truth table for the tile and the timing constraints for the tile, a macrocell implementation can be generated for the tile, either through mechanical means, manual means, or any other process. Those of ordinary skill in the art of digital circuit design will readily appreciate how to carry out this process. All of the required Fu, Fv, Fw, Fy and Fz tiles can be constructed using this method. There are two additional considerations used in forming the Fx tiles. Line 3 (denoted Fx(0)) of FIG. 10 shows the requirements for one of the Fx tiles.

|       | A  | B  | C  | D  | E  | Z  | Y  | X  |
|-------|----|----|----|----|----|----|----|----|
| Fx(0) | +1 | +1 | +1 | +1 | +1 | +2 | +2 | +1 |

Note that the designation "Fx(0)" simply refers to a type Fx Quikadder™, the sum of whose negative input values is zero (counting the A input as a 1 if negative and a 0 if positive, the B input as a two if negative, etc., up to a 16 for E if negative). The timing constraints and the truth table for this tile are constructed as above. However, many of the input combinations for this tile represent the values "+2" or "+3". With the output weights of "+2", "+2", and "+1", there are two ways to represent the value "2", and there are two ways to represent the value "+3". The value "+2" can be represented by having either the Y or Z outputs being active. The value "+3" can be represented by having either Y and X active or by having Z and X active. This is indicated in the truth table of Table 6 by placing "e"s in the Z and Y columns. Table 6 is the resulting truth table for this particular Fx tile. For each line in the truth table with "e"s in the Z or Y column, we can choose to have either output active. The choice of which output to activate can vary from line to line of the table, and the choices made will influence the final circuit used to implement the tile. It is a requirement for the timing of the Fx tile that the Z output not depend upon the value of the E input. Because of this constraint, some of the "e" values must have the Z value set inactive. These lines in Table 6 are marked with an asterisk: "*" at the right side of the line. This constraint also forces the Z output to be active in other lines of the table. These lines in Table 6 are marked with double asterisks: "**". This constraint also causes the remaining lines containing "e"s to be paired. The pairs are shown in Table 6 with braces. For each pair, the two lines must use the same choice. Both lines must either activate Z or they must activate Y. If these restrictions on the "e" values are followed, output Z will not depend upon the value of input E. The choice of e values for the six pairs can be set in such a way as to minimize the circuitry or improve the performance of the tile. Those of ordinary skill in the art will readily appreciate how to accomplish this for their particular design and fabrication technology.

TABLE 6

| A  | B  | C  | D  | E  |     | Z  | Y  | X  |
|----|----|----|----|----|-----|----|----|----|
| +1 | +1 | +1 | +1 | +1 | Wgt | +2 | +2 | +1 |
| 0 | 0 | 0 | 0 | 0 | 0 | 0 | 0 | 0 |
| 0 | 0 | 0 | 0 | 1 | 1 | 0 | 0 | 1 |
| 0 | 0 | 0 | 1 | 0 | 1 | 0 | 0 | 1 |
| 0 | 0 | 0 | 1 | 1 | 2 | e | e | 0* |
| 0 | 0 | 1 | 0 | 0 | 1 | 0 | 0 | 1 |
| 0 | 0 | 1 | 0 | 1 | 2 | e | e | 0* |
| 0 | 0 | 1 | 1 | 0 | 2 | e | e | 0\ |
| 0 | 0 | 1 | 1 | 1 | 3 | e | e | 1/ |
| 0 | 1 | 0 | 0 | 0 | 1 | 0 | 0 | 1 |
| 0 | 1 | 0 | 0 | 1 | 2 | e | e | 0* |
| 0 | 1 | 0 | 1 | 0 | 2 | e | e | 0\ |
| 0 | 1 | 0 | 1 | 1 | 3 | e | e | 1/ |
| 0 | 1 | 1 | 0 | 0 | 2 | e | e | 0\ |
| 0 | 1 | 1 | 0 | 1 | 3 | e | e | 1/ |
| 0 | 1 | 1 | 1 | 0 | 3 | e | e | 1** |
| 0 | 1 | 1 | 1 | 1 | 4 | 1 | 1 | 0 |
| 1 | 0 | 0 | 0 | 0 | 1 | 0 | 0 | 1 |
| 1 | 0 | 0 | 0 | 1 | 2 | e | e | 0* |
| 1 | 0 | 0 | 1 | 0 | 2 | e | e | 0\ |
| 1 | 0 | 0 | 1 | 1 | 3 | e | e | 1/ |
| 1 | 0 | 1 | 0 | 0 | 2 | e | e | 0\ |
| 1 | 0 | 1 | 0 | 1 | 3 | e | e | 1/ |
| 1 | 0 | 1 | 1 | 0 | 3 | e | e | 1** |
| 1 | 0 | 1 | 1 | 1 | 4 | 1 | 1 | 0 |
| 1 | 1 | 0 | 0 | 0 | 2 | e | e | 0\ |
| 1 | 1 | 0 | 0 | 1 | 3 | e | e | 1/ |
| 1 | 1 | 0 | 1 | 0 | 3 | e | e | 1** |
| 1 | 1 | 0 | 1 | 1 | 4 | 1 | 1 | 0 |
| 1 | 1 | 1 | 0 | 0 | 3 | e | e | 1** |
| 1 | 1 | 1 | 0 | 1 | 4 | 1 | 1 | 0 |
| 1 | 1 | 1 | 1 | 0 | 4 | 1 | 1 | 0 |
| 1 | 1 | 1 | 1 | 1 | 5 | 1 | 1 | 1 |

The final consideration in the table construction is used for another Fx tile. Line 1 (denoted Fx(3)) of FIG. 10 shows the requirements for this particular Fx tile.

|       | A  | B  | C  | D  | E  | Z  | Y  | X  |
|-------|----|----|----|----|----|----|----|----|
| Fx(3) | -1 | -1 | +1 | +1 | +1 | -2 | +2 | +1 |

Table 7 is the truth table constructed for this tile. With these weights for the outputs, there are two ways to represent the value "0", and there are two ways to represent the value "+1". The value "0" can be represented by activating both the Z and Y outputs, or by having no outputs active. The value "+1 " can be represented by activating all three outputs, or by activating just the X output. This is represented in the Table 7 truth table with the letter "b" in the Z and Y outputs of any particular line. Whereas in Table 6 the "e" indicates that either output, but not both, should be active, the "b" in Table 7 indicates that both outputs should be active, or neither output should be active. As in the preceding case, some of the "b" values are constrained due to the requirement that the Z output not be influenced by the E input. These restrictions are indicated in Table 7 using the same notation as used in Table 6, i.e., * means that the Z (and Y) outputs should be inactive, "**" means that the Z (and Y)

outputs should be active, and the braces indicate that the two lines of the table should use the same choice for "b".

TABLE 7

| A<br>-1 | B<br>-1 | C<br>1 | D<br>1 | E<br>1 | Wgt | Y<br>2 | Z<br>-2 | X<br>1 |
|---|---|---|---|---|---|---|---|---|
| 0 | 0 | 0 | 0 | 0 | 0 | b | b | 0\ |
| 0 | 0 | 0 | 0 | 1 | 1 | b | b | 1/ |
| 0 | 0 | 0 | 1 | 0 | 1 | b | b | 1** |
| 0 | 0 | 0 | 1 | 1 | 2 | 1 | 0 | 0 |
| 0 | 0 | 1 | 0 | 0 | 1 | b | b | 1** |
| 0 | 0 | 1 | 0 | 1 | 2 | 1 | 0 | 0 |
| 0 | 0 | 1 | 1 | 0 | 2 | 1 | 0 | 0 |
| 0 | 0 | 1 | 1 | 1 | 3 | 1 | 0 | 1 |
| 0 | 1 | 0 | 0 | 0 | -1 | 0 | 1 | 1 |
| 0 | 1 | 0 | 0 | 1 | 0 | b | b | 0* |
| 0 | 1 | 0 | 1 | 0 | 0 | b | b | 0\ |
| 0 | 1 | 0 | 1 | 1 | 1 | b | b | 1 |
| 0 | 1 | 1 | 0 | 0 | 0 | b | b | 0\ |
| 0 | 1 | 1 | 0 | 1 | 1 | b | b | 1/ |
| 0 | 1 | 1 | 1 | 0 | 1 | b | b | 1** |
| 0 | 1 | 1 | 1 | 1 | 2 | 1 | 0 | 0 |
| 1 | 0 | 0 | 0 | 0 | -1 | 0 | 1 | 1 |
| 1 | 0 | 0 | 0 | 1 | 0 | b | b | 0* |
| 1 | 0 | 0 | 1 | 0 | 0 | b | b | 0\ |
| 1 | 0 | 0 | 1 | 1 | 1 | b | b | 1/ |
| 1 | 0 | 1 | 0 | 0 | 0 | b | b | 0\ |
| 1 | 0 | 1 | 0 | 1 | 1 | b | b | 1/ |
| 1 | 0 | 1 | 1 | 0 | 1 | b | b | 1** |
| 1 | 0 | 1 | 1 | 1 | 2 | 1 | 0 | 0 |
| 1 | 0 | 0 | 0 | 0 | -2 | 0 | 1 | 0 |
| 1 | 0 | 0 | 0 | 1 | -1 | 0 | 1 | 1 |
| 1 | 1 | 0 | 1 | 0 | -1 | 0 | 1 | 1 |
| 1 | 1 | 0 | 1 | 1 | 0 | b | b | 0* |
| 1 | 1 | 1 | 0 | 0 | -1 | 0 | 1 | 1 |
| 1 | 1 | 1 | 0 | 1 | 0 | b | b | 0* |
| 1 | 1 | 1 | 1 | 0 | 0 | b | b | 0\ |
| 1 | 1 | 1 | 1 | 1 | 1 | b | b | 1/ |

Figure 1:
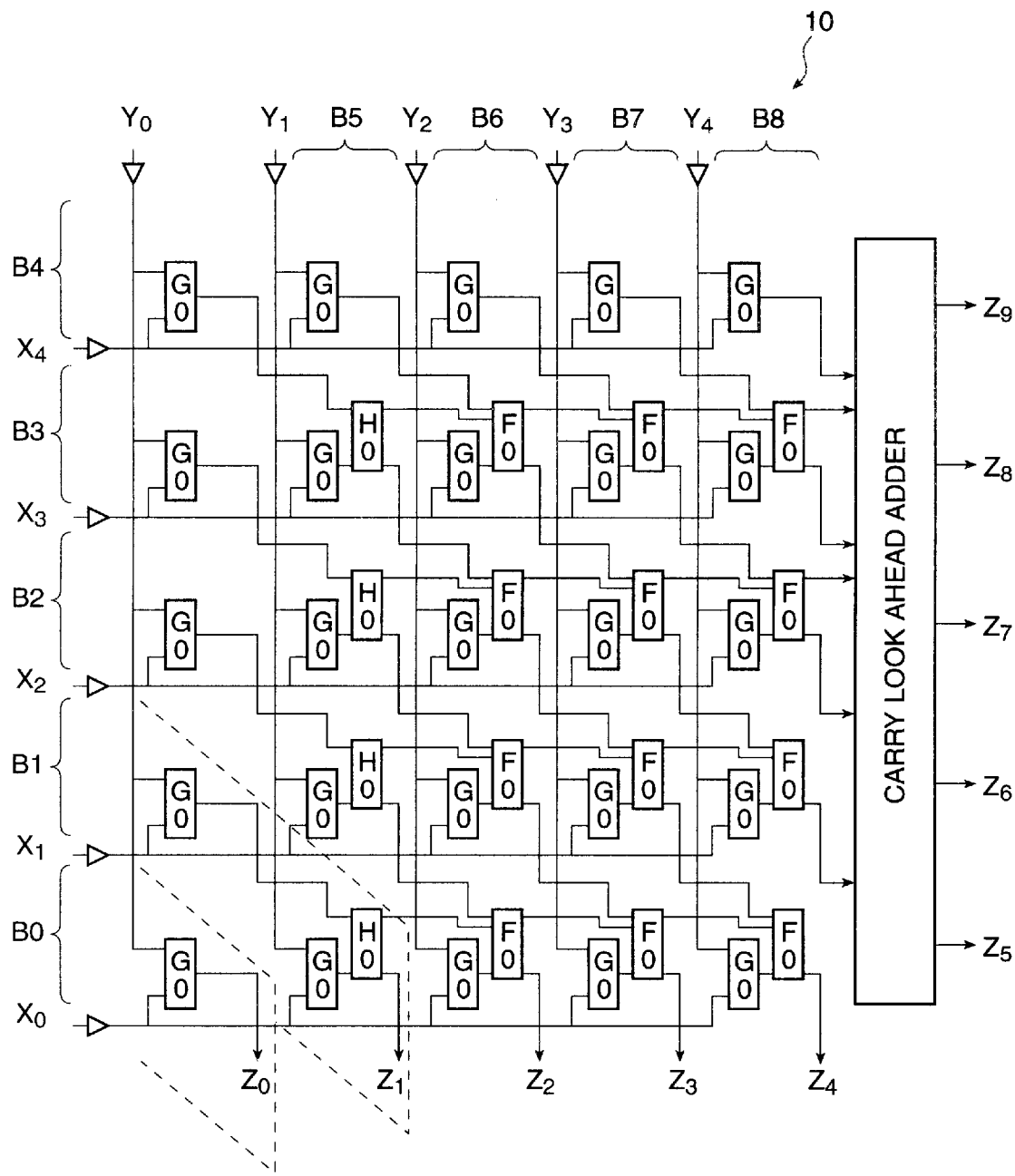
FIG. 1 is a schematic diagram of an unsigned five bit by five bit multiplier array according to the prior art.
Figure 2:
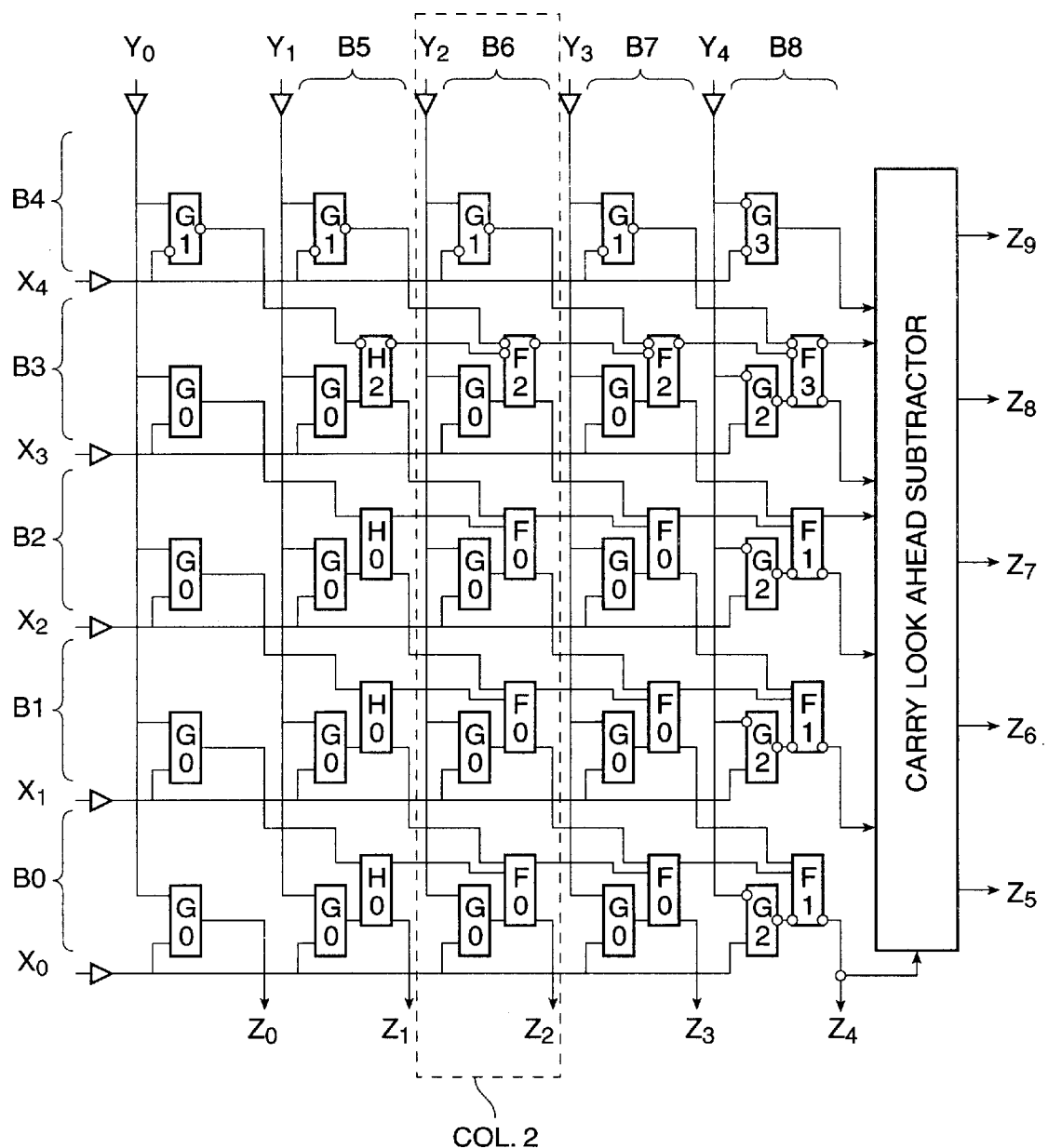
FIG. 2 is a is a schematic diagram of a two's complement five bit by five bit multiplier array according to the prior art.
Figure 3A:
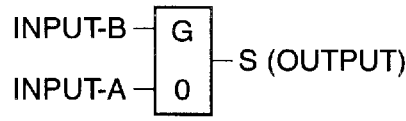
FIG. 3A is a diagram of a type "G0" AND gate.
Figure 3B:
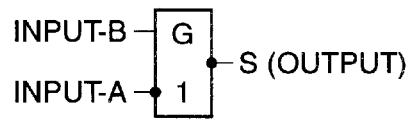
FIG. 3B is a diagram of a type "G1" AND gate.
Figure 3C:
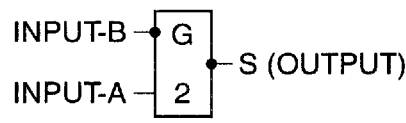
FIG. 3C is a diagram of a type "G2" AND gate.
Figure 3D:
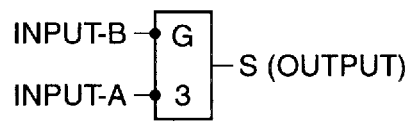
FIG. 3D is a diagram of a type "G3" AND gate.
Figure 4A:
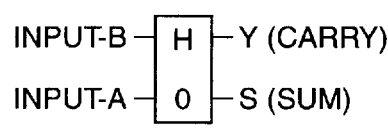
FIG. 4A is a diagram of a type "H0" half-adder.
Figure 4B:
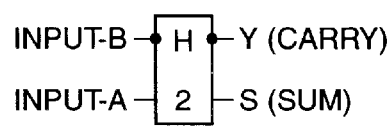
FIG. 4B is a diagram of a type "H2" half-adder.
Figure 5A:
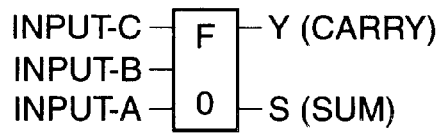
FIG. 5A is a diagram of a type "F0" 3/2 full-adder.
Figure 5B:
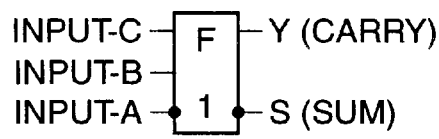
FIG. 5B is a diagram of a type "F1" 3/2 full-adder.
Figure 5C:
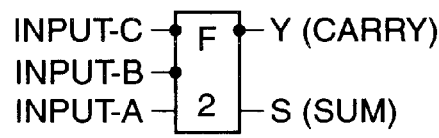
FIG. 5C is a diagram of a type "F2" 3/2 full-adder.
Figure 5D:
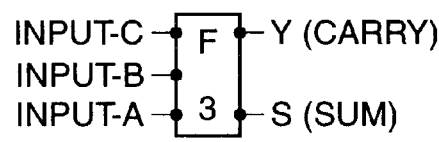
FIG. 5D is a diagram of a type "F3" 3/2 full-adder.

The basic multiplier arrays of FIGS. 1 and 2 form the basis for the present invention. These basic multiplier arrays have a very regular structural design which lends itself to relatively simple cell reproduceability. Signal path lengths are all relatively short in these arrays as well. Furthermore, the ability to directly calculate the LSBs of the product as in FIG. 1 at $Z_0 \ldots Z_4$ provides a speed and areal advantage over designs which require an adder or equivalent device to provide these values. These multiplier arrays have the property that for each X,Y location in the array, an AND gate (all G0-type in FIG. 1 and G0, G1 and G2-types in FIG. 2) multiplies the corresponding X-bit and Y-bit to produce a partial product value. The partial product of $X_2, Y_3$ therefore has a binary weight of 5 (2+3) and represents a value of $2^5$ or 32.

Figure 13:
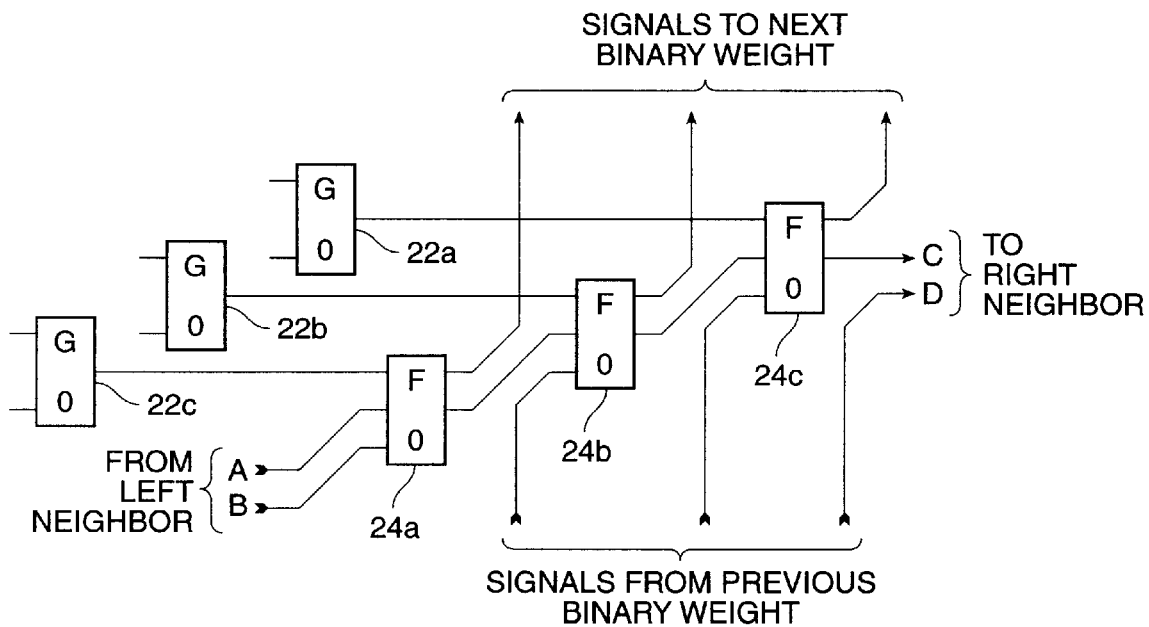
FIG. 13 is a schematic diagram showing the wiring of G0 and F0 devices in a three column group taken from the middle of a prior art multiplier array according to FIG. 1.

If we consider three columns from the middle of the FIG. 1 array, then look at the circuitry which sums the partial product for one particular binary weight of data, we find the logic set forth in FIG. 13. Referring to FIG. 13, the signals labelled "A" and "B" come from the column to the left of the group under consideration. The signals labelled "C" and "D" go to the column to the right of this group. If we look at the timing of the signals, the outputs of all of the AND gates 22a, 22b, 22c in the array settle very soon after the input data settle. The critical path through this design is from inputs "A" and "B" to outputs "C" and "D". As can be seen in FIG. 13, there are three FAdelays from inputs "A" and "B" to outputs "C" and "D" due to the arrangement of full-adders (type F0) 24a, 24b and 24c.

Figure 14:
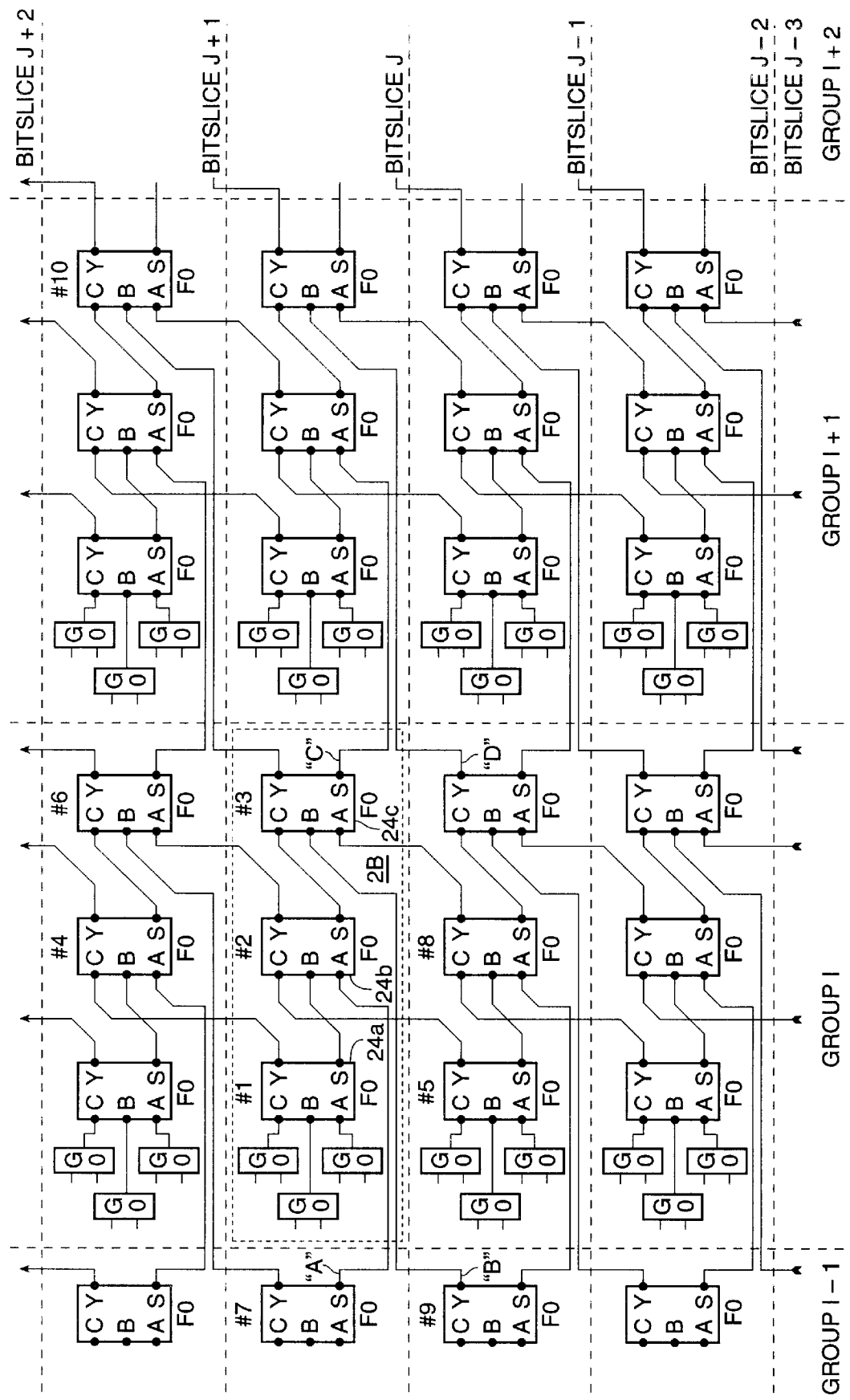
FIG. 14 is a schematic diagram showing the wiring of G0 and F0 devices in a three column group taken from the middle of a multiplier array modified from the form shown in FIG. 1 in accordance with one aspect of the present invention.

One aspect of this invention is that it speeds up the circuit by reconnecting the full-adders, as shown in FIG. 14. With this reconnection, full-adder 24a can compute its result as soon as the AND gates 22a, 22b and 22c settle—the remaining two adders must wait for the "A" and "B" inputs from the left neighbor. Also, with this interconnection, there is now a maximum propagation delay through the three columns of only 2 FAdelays. Hence, this reconnection has sped up the data flow through these columns by 33%.

Referring to FIG. 14, the wiring of the box or cell 23 comprising columns 1, 2 and 3 of group I, bitslice J of the multiplier array is as follows. (Note that Cell 23 is replicated a number of times in FIG. 14). The multiplier array includes a plurality of X inputs, each representing a bit of an X input value, a plurality of Y inputs, each representing a bit of a Y input value, an array of AND gates ("G0") disposed to form a partial product array of partial products of said X inputs and said Y inputs. At least a portion of the multiplier array is organized as shown in box 23 of FIG. 14 as a plurality of vertically oriented "groups" of circuitry as shown, each of the groups of circuitry having three columns of 3/2 full-adders, the left-most column of each group being referred to as "lower" than the middle column and the middle column being referred to as "higher" and the left-most group being referred to as "lower" than a group to the right of it, etc. Box 23 represents a first bitslice of said multiplier array in a first group of three columns of full-adders. The bitslice and group include a first, second and third 3/2 full-adder (denoted #1, #2 and #3 on FIG. 14), each having three inputs, a carry output and a sum output, the first 3/2 full-adder having each of said its three inputs connected to different outputs of said AND gates of said partial product array as shown, its carry output connected to a first input of a fourth 3/2 full-adder (denoted #4) in a next higher column of the same group in a next higher bitslice as shown, and its sum output connected to a first input of said second 3/2 full-adder. The second 3/2 full-adder has a second input connected to a carry output of a fifth (denoted #5) 3/2 full-adder in a next lower column of the same group in a next lower bitslice, a carry output connected to a first input of a sixth 3/2 full-adder (denoted #6) in a next higher column of the same group in a next higher bitslice, a sum output connected to a first input of said third 3/2 full-adder, and a third input connected to a sum output of a seventh 3/2 full-adder (denoted #7) in the same column of a next lower group in the same bitslice. The third 3/2 full-adder has a second input connected to a carry input of an eighth 3/2 full-adder (denoted #8) in a next lower column of the same group in a next lower bitslice, a third input connected to a carry output of a ninth 3/2 full-adder (denoted #9) in the same column of a next lower group in a next lower bitslice, a carry output connected to a first input of a tenth 3/2 full-adder (denoted #10) in the same column of a next higher group in the next higher bitslice.

To completely implement the replacement of the three columns with the rewiring of FIG. 14, one also has to compensate the circuitry at the top and bottom of the column to adjust for the boundary conditions. Circuitry to accomplish this is set forth hereinbelow.

Figure 12A:
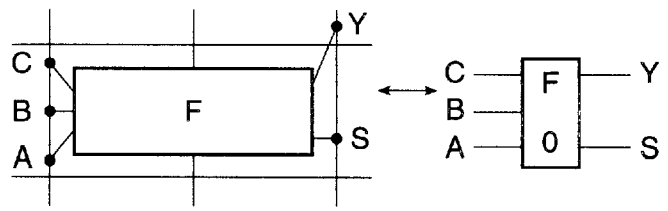
FIG. 12A is a diagram showing the timing and bitslice orientation of the inputs and outputs of a type F 3/2 full-adder and showing the equivalent topological drawing symbol for this device.
Figure 12B:
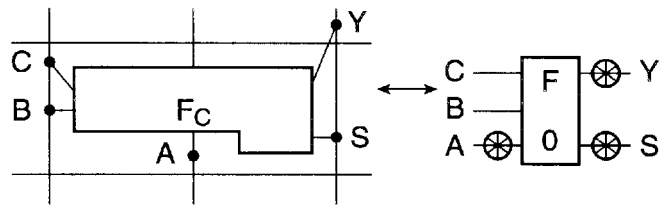
FIG. 12B is a diagram showing the timing and bitslice orientation of the inputs and outputs of a type Fc 3/2 Quikadder™ and showing the equivalent topological drawing symbol for this device.
Figure 12C:
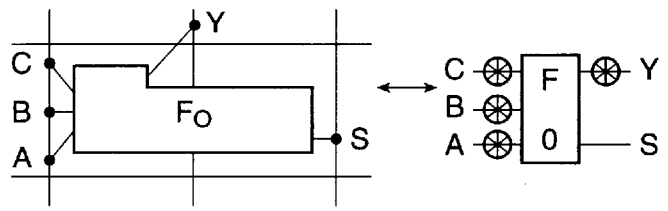
FIG. 12C is a diagram showing the timing and bitslice orientation of the inputs and outputs of a type Fo 3/2 Quikadder™ and showing the equivalent topological drawing symbol for this device.
Figure 12D:
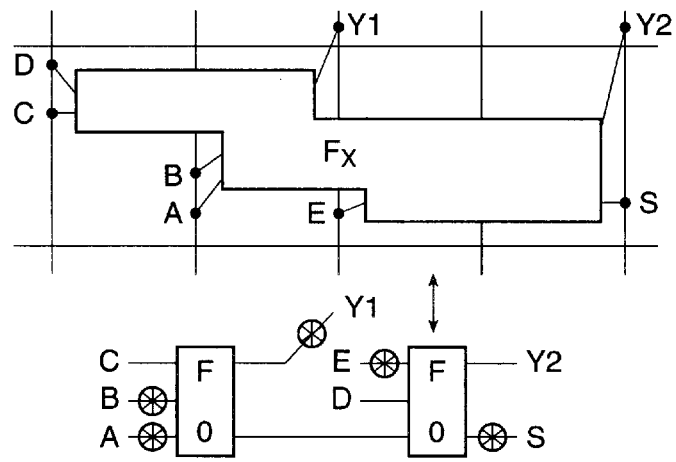
FIG. 12D is a diagram showing the timing and bitslice orientation of the inputs and outputs of a type Fx 5/3 Quikadder™ and showing the equivalent topological drawing symbol for this device.
Figure 12E:
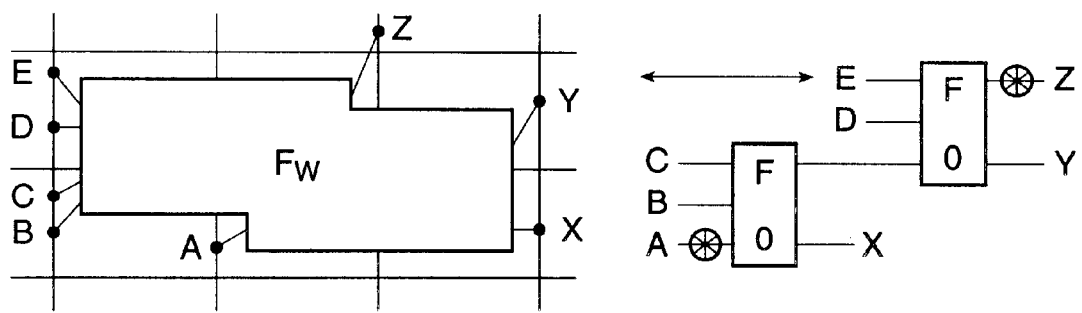
FIG. 12E is a diagram showing the timing and bitslice orientation of the inputs and outputs of a type Fw 5/3 Quikadder™ and showing the equivalent topological drawing symbol for this device.
Figure 12F:
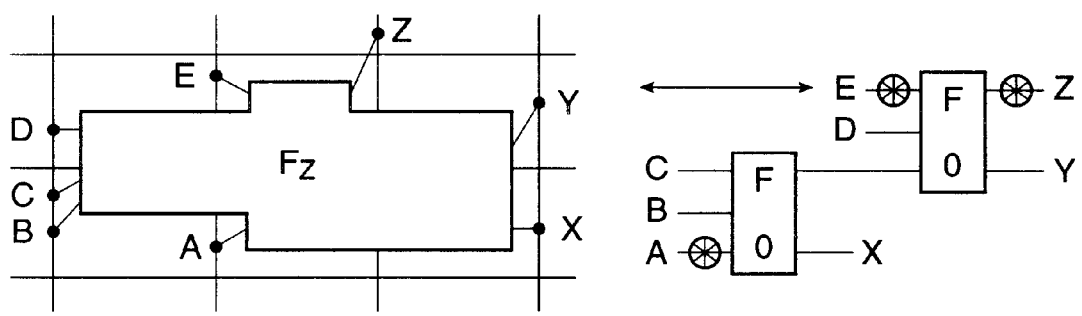
FIG. 12F is a diagram showing the timing and bitslice orientation of the inputs and outputs of a type Fz 5/3 Quikadder™ and showing the equivalent topological drawing symbol for this device.
Figure 12G:
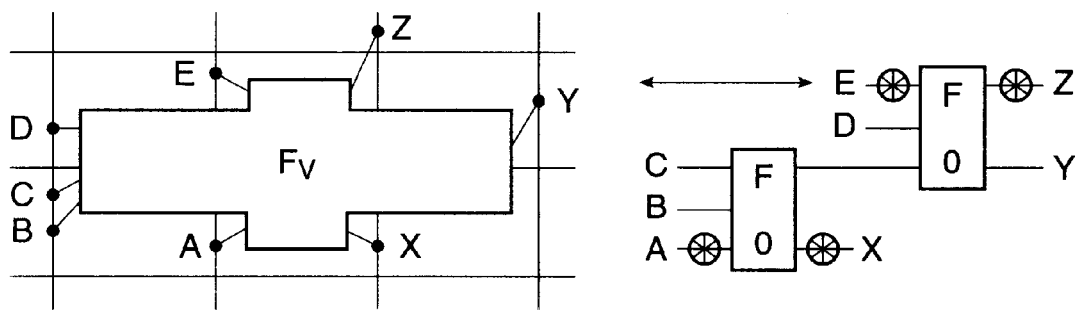
FIG. 12G is a diagram showing the timing and bitslice orientation of the inputs and outputs of a type Fv 5/3 Quikadder™ and showing the equivalent topological drawing symbol for this device.
Figure 12H:
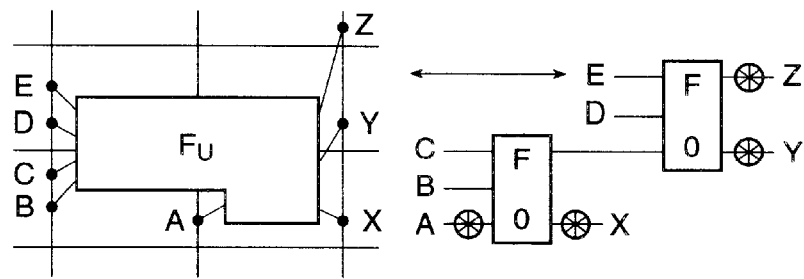
FIG. 12H is a diagram showing the timing and bitslice orientation of the inputs and outputs of a type Fu 5/3 Quikadder™ and showing the equivalent topological drawing symbol for this device.
Figure 12I:
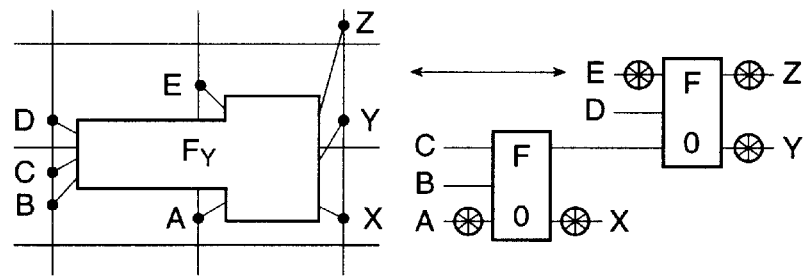
FIG. 12I is a diagram showing the timing and bitslice orientation of the inputs and outputs of a type Fy 5/3 Quikadder™ and showing the equivalent topological drawing symbol for this device.

It is possible to further speed the FIG. 14 embodiment by replacing the full-adder 24b with an Fc-type Quikadder™ as discussed above. In the Fc 3/2 Quikadder™ one of the three inputs is "faster" than the other two inputs. The maximum delay from this "fast" input to the outputs is shorter than the maximum delay from the other two inputs to the outputs. It is not uncommon for the path delay for the fast input to be half of the delay for the "slow" inputs. The invention can take advantage of this speed differential to further increase the speed of the array. In the multiplier array circuit of FIG. 14, if full-adder 24b is replaced with an Fc-type Quikadder™ as shown in FIG. 12B, its speed will be further increased. The remaining full-adders 24a, 24c cannot take advantage of an Fc Quikadder™ as it would provide no advantage. An Fc Quikadder™ may "cost" more in terms of area used on the chip and circuit complexity than a balanced full-adder such as an F-type full-adder, therefore, the more complex forms of adders should only be used where a clear speed advantage is provided thereby.

Figure 15:
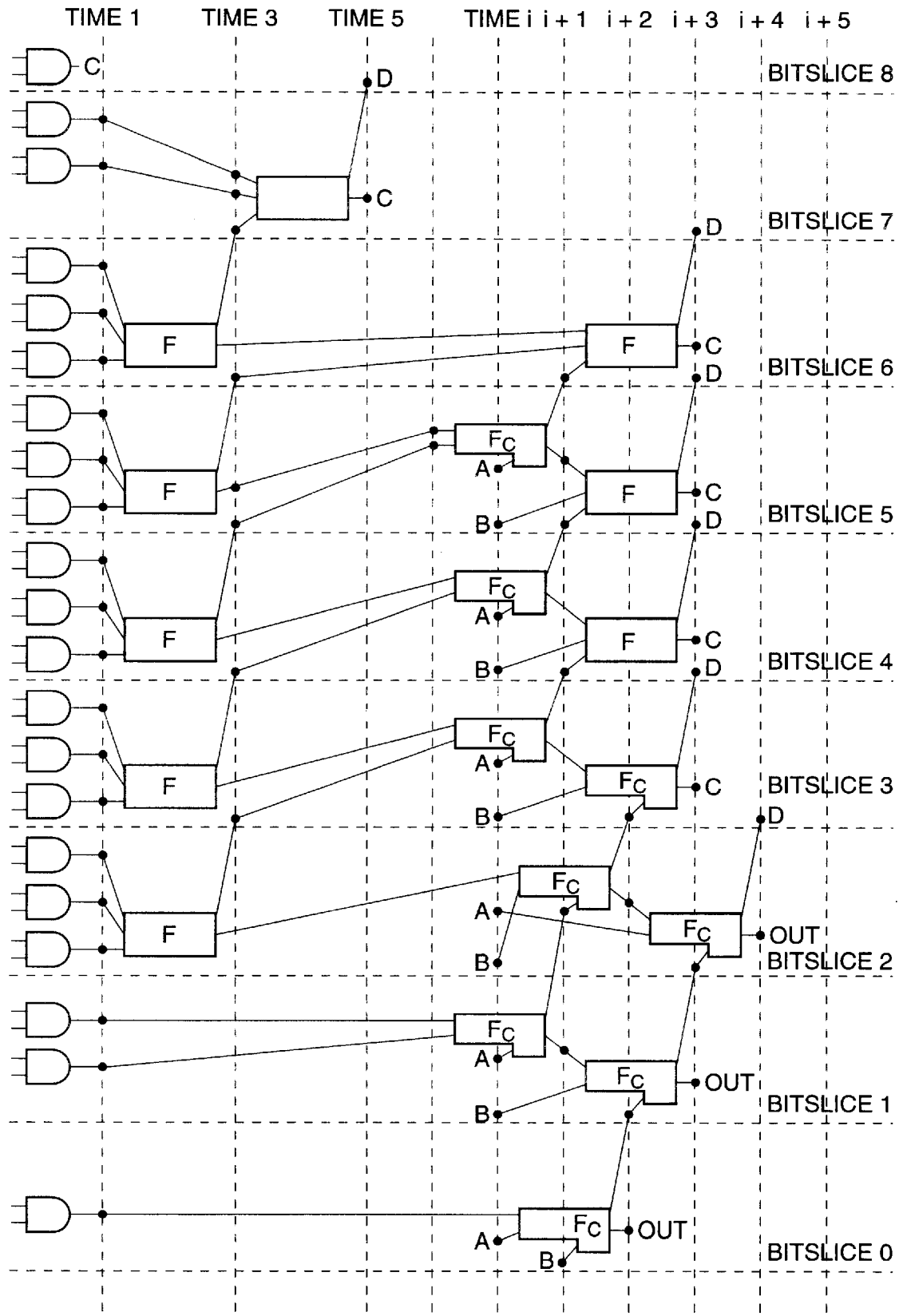
FIG. 15 is a diagram showing the timing and bitslice orientation of a portion of a multiplier array made in accordance with the present invention.

FIG. 15 is a symbolic timing diagram which indicates the relative times for all signals within the three-column group (this figure also shows the circuitry for meeting the "boundary conditions"—the top and bottom of the circuit). Note that for large multipliers, only about ⅓ of the full-adders in the circuit are modified to be Fc-type Quikadder™ and the delay through the three columns is only 1.5 FAdelay. In a traditional array multiplier which does not use the present invention (see, e.g., FIG. 1), having Fc Quikadder™ alone, without rewiring, does not increase the speed of the circuit, since there are two inputs to each full-adder which are on the critical path—the electrical path through the multiplier circuit along which input timing affects output timing. Hence, using this invention, the delay through each of the three columns is 50% of the delay through three similar columns in a traditional array configured as in FIG. 1.

Figure 21A:
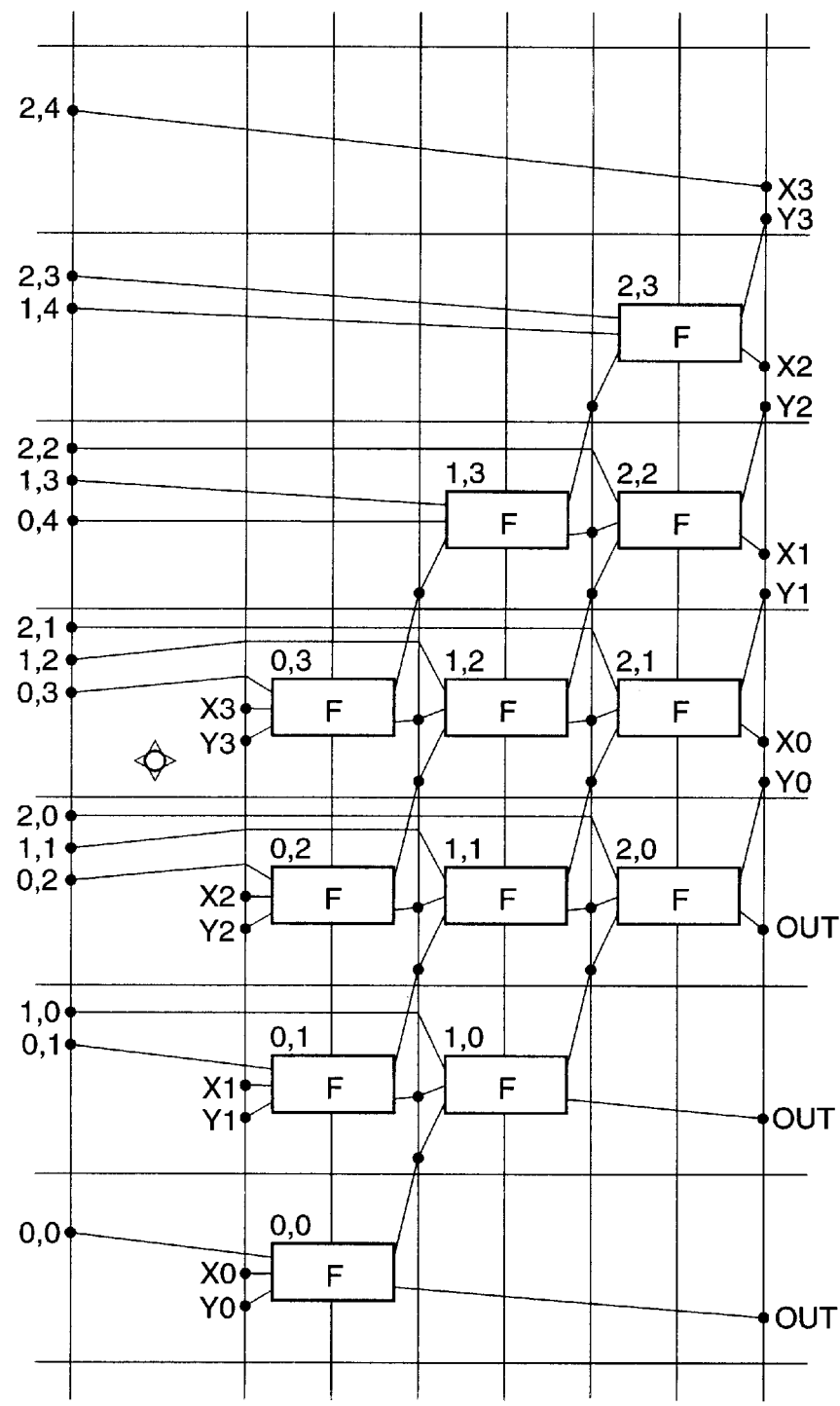
FIG. 21A is a bitslice/timing diagram of a prior art equivalent type "E-BASIC/U" group having a width of five bits and formed as part of an unsigned multiplier array.
Figure 21B:
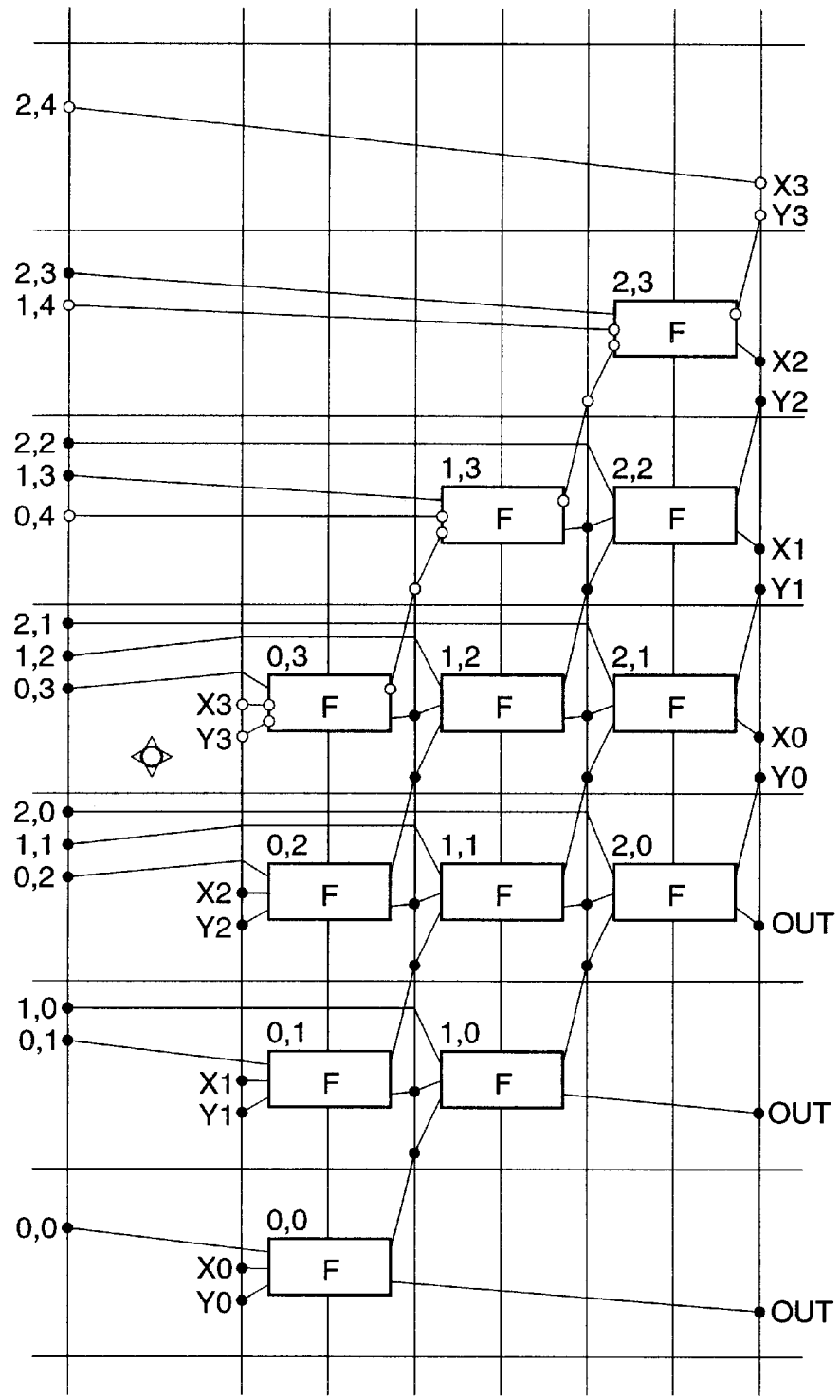
FIG. 21B is a bitslice/timing diagram of a prior art equivalent type "E-BASIC$_i$/S" group having a width of five bits and formed as part of a two's complement signed multiplier array.
Figure 21C:
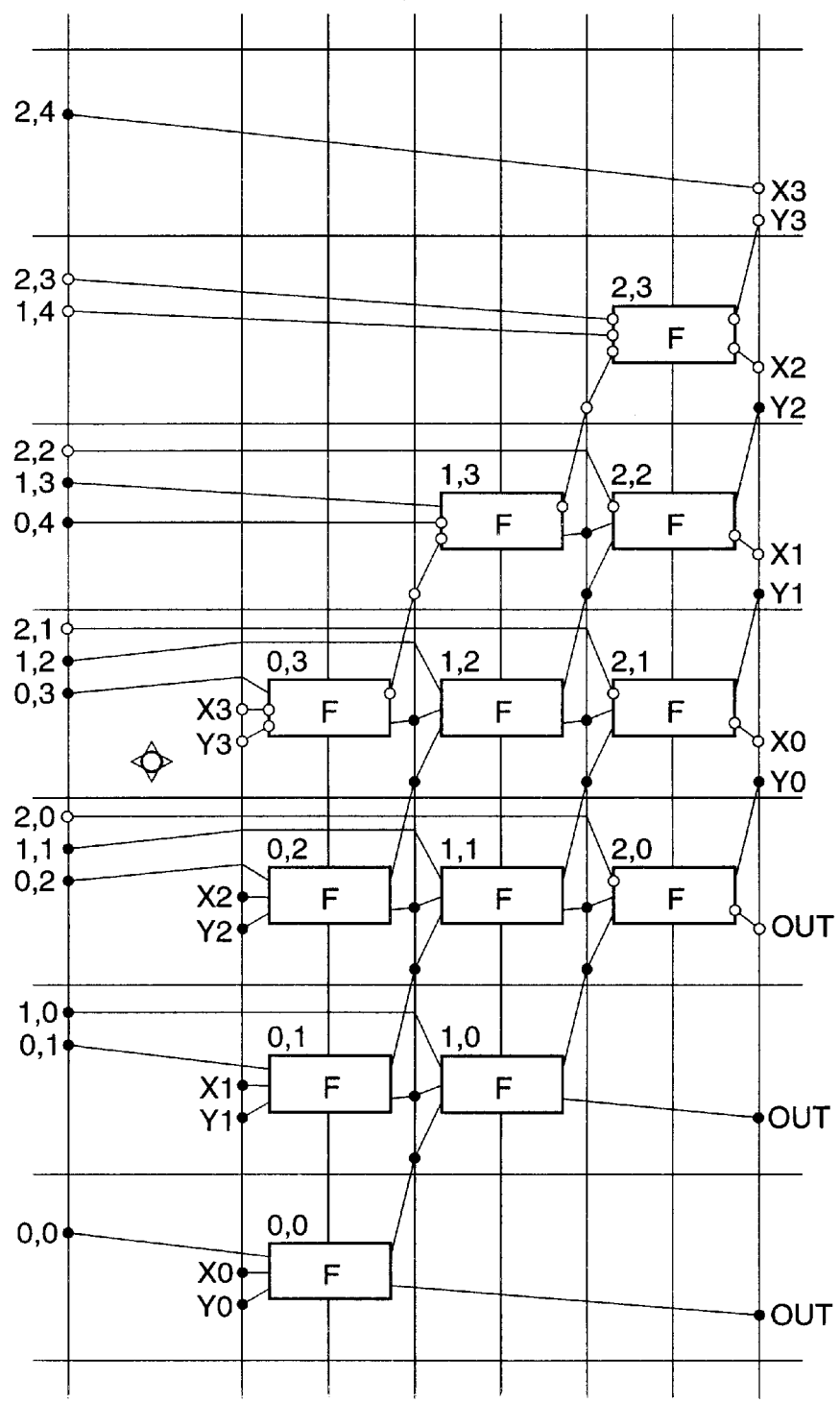
FIG. 21C is a bitslice/timing diagram of a prior art equivalent type "E-BASIC$_f$/S" group having a width of five bits and formed as part of a two's complement signed multiplier array.
Figure 21D:
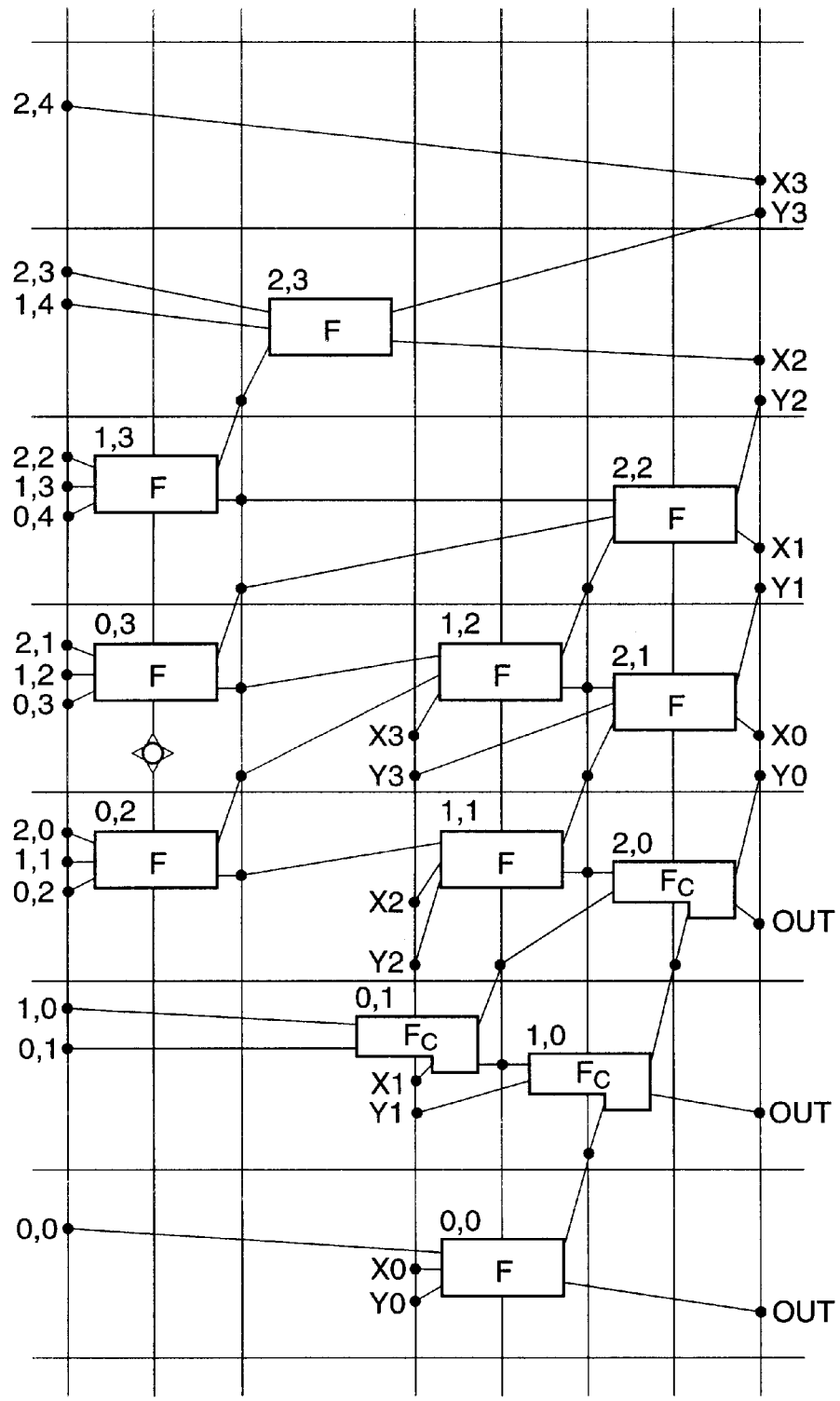
FIG. 21D is a bitslice/timing diagram of a type "E0/U" group having a width of five bits and formed as part of an unsigned multiplier array in accordance with a preferred embodiment of the present invention.
Figure 21E:
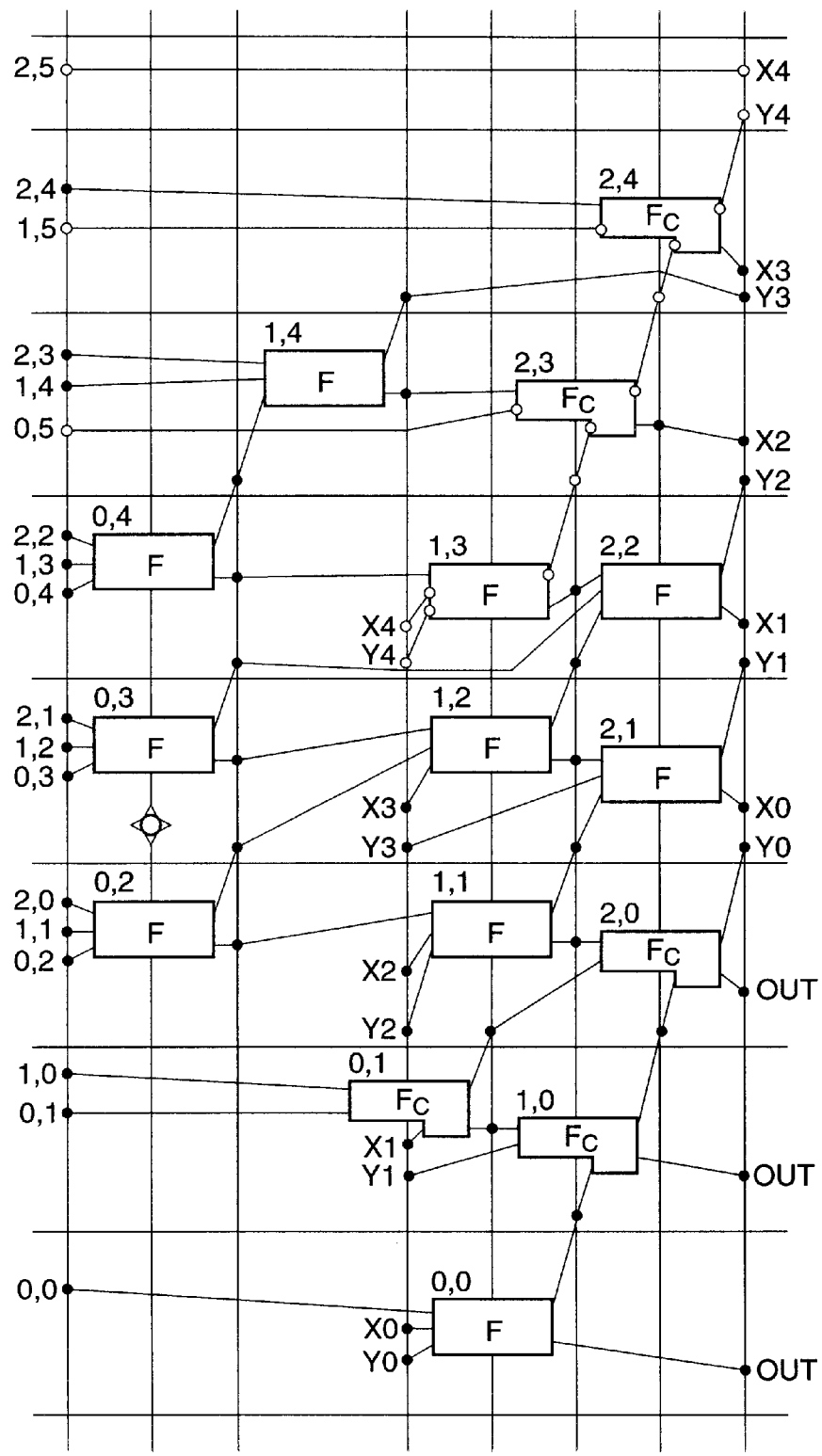
FIG. 21E is a bitslice/timing diagram of a type "E0i/S" group having a width of six bits and formed as part of a two's complement signed multiplier array in accordance with a preferred embodiment of the present invention.
Figure 21F:
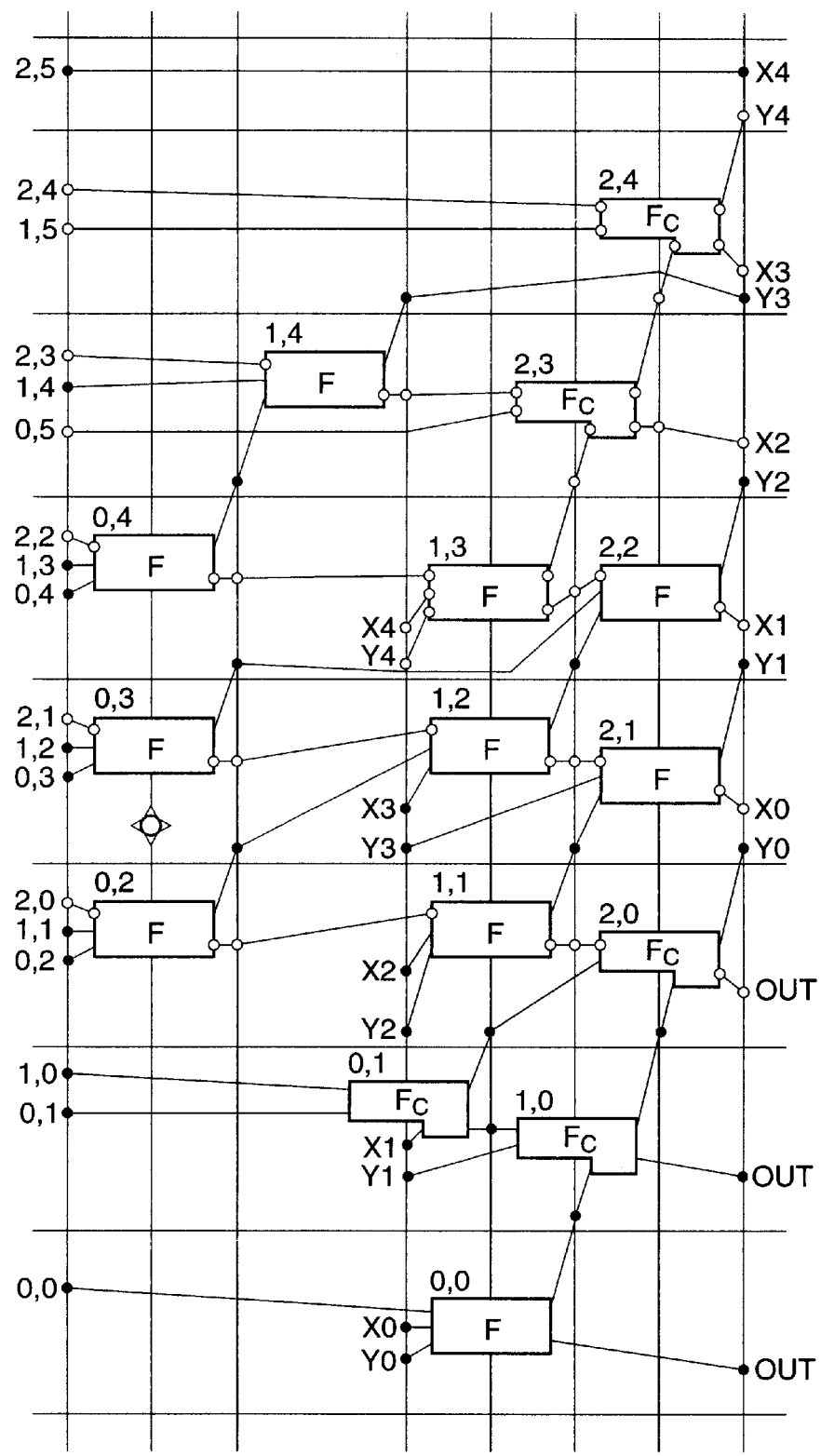
FIG. 21F is a bitslice/timing diagram of a type "E0f/S" group having a width of six bits and formed as part of a two's complement signed multiplier array in accordance with a preferred embodiment of the present invention.
Figure 21G:
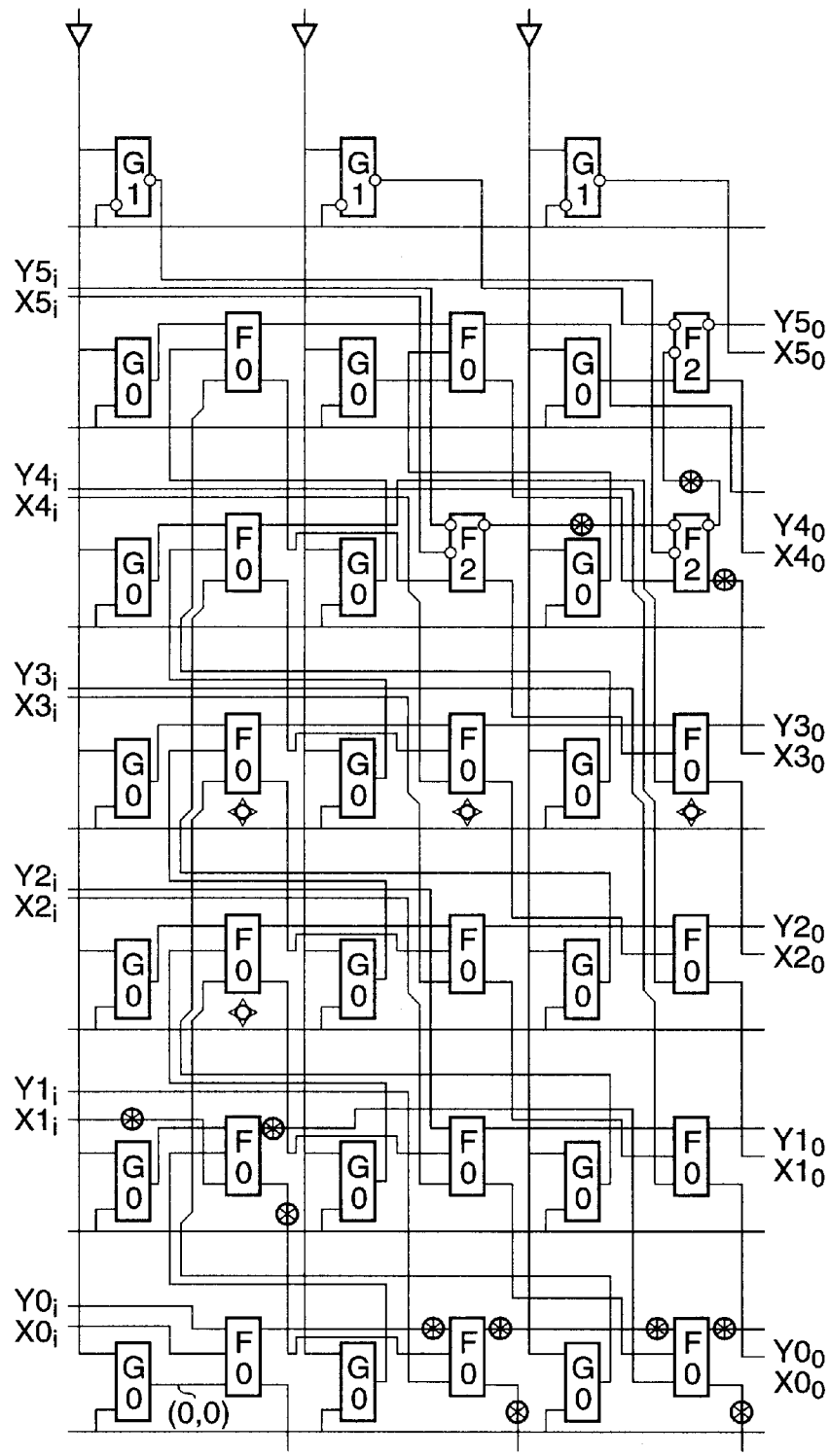
FIG. 21G is a topological schematic diagram of a group formed in accordance with the bitslice/timing diagram of FIG. 21E, but with a width of seven bits.
Figure 21H:
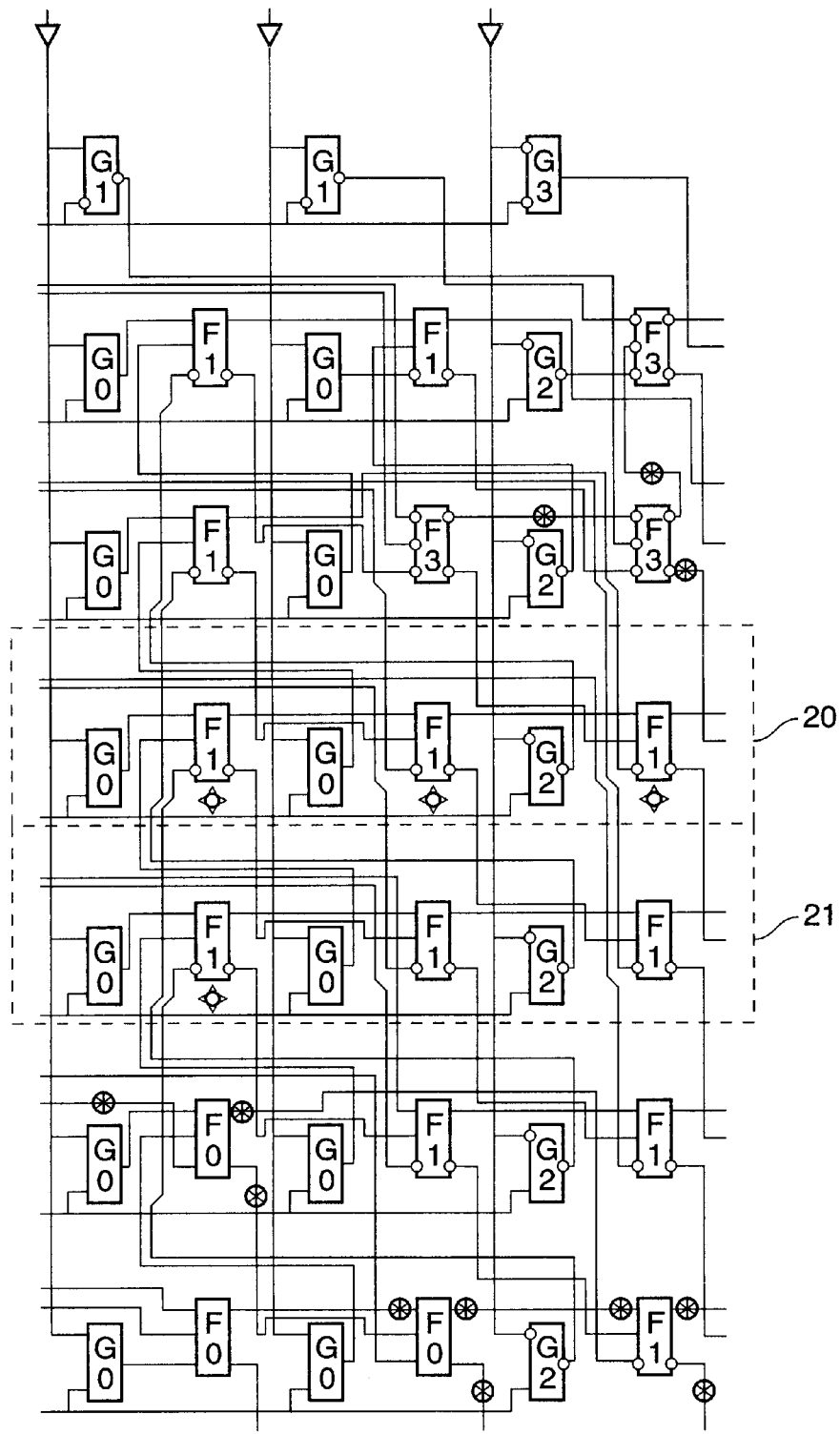
FIG. 21H is a topological schematic diagram of a group formed in accordance with the bitslice/timing diagram of FIG. 21F, but with a width of seven bits.
Figure 21I:
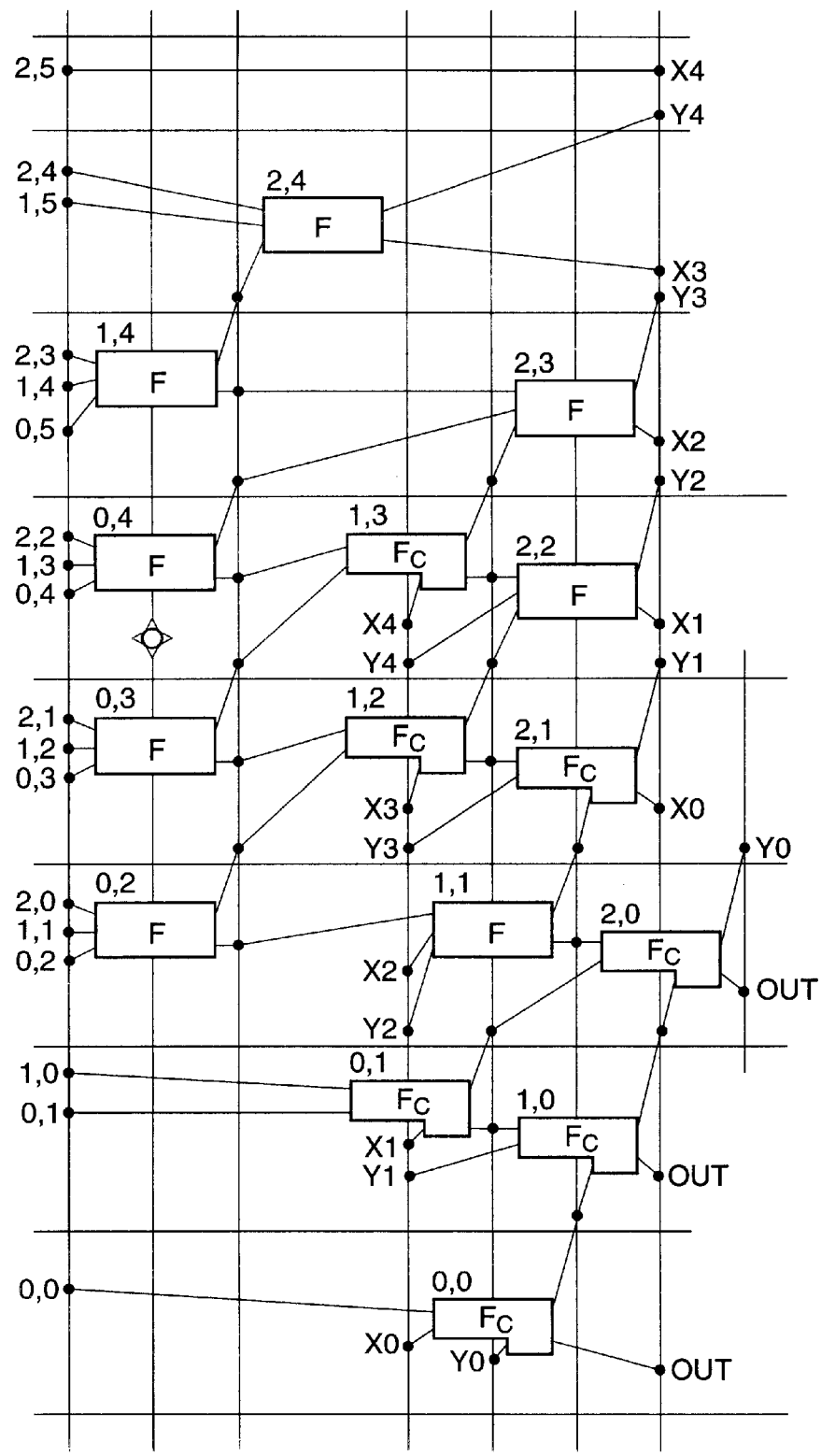
FIG. 21I is a bitslice/timing diagram of a type "E1i/U" group having a width of six bits and formed as part of an unsigned multiplier array in accordance with a preferred embodiment of the present invention.
Figure 21J:
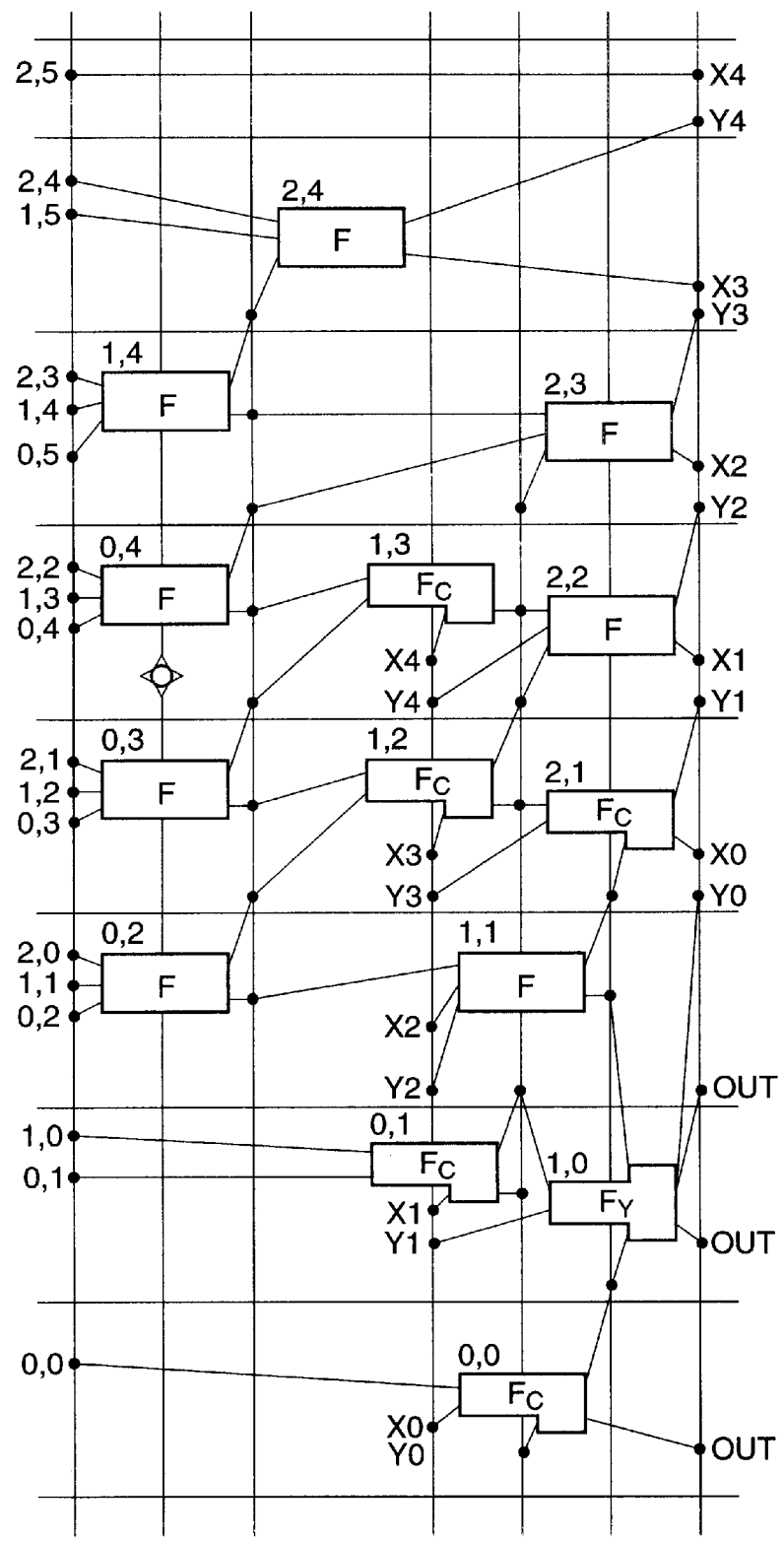
FIG. 21J is a bitslice/timing diagram of a type "E1f/U" group having a width of six bits and formed as part of an unsigned multiplier array in accordance with a preferred embodiment of the present invention.
Figure 21K:
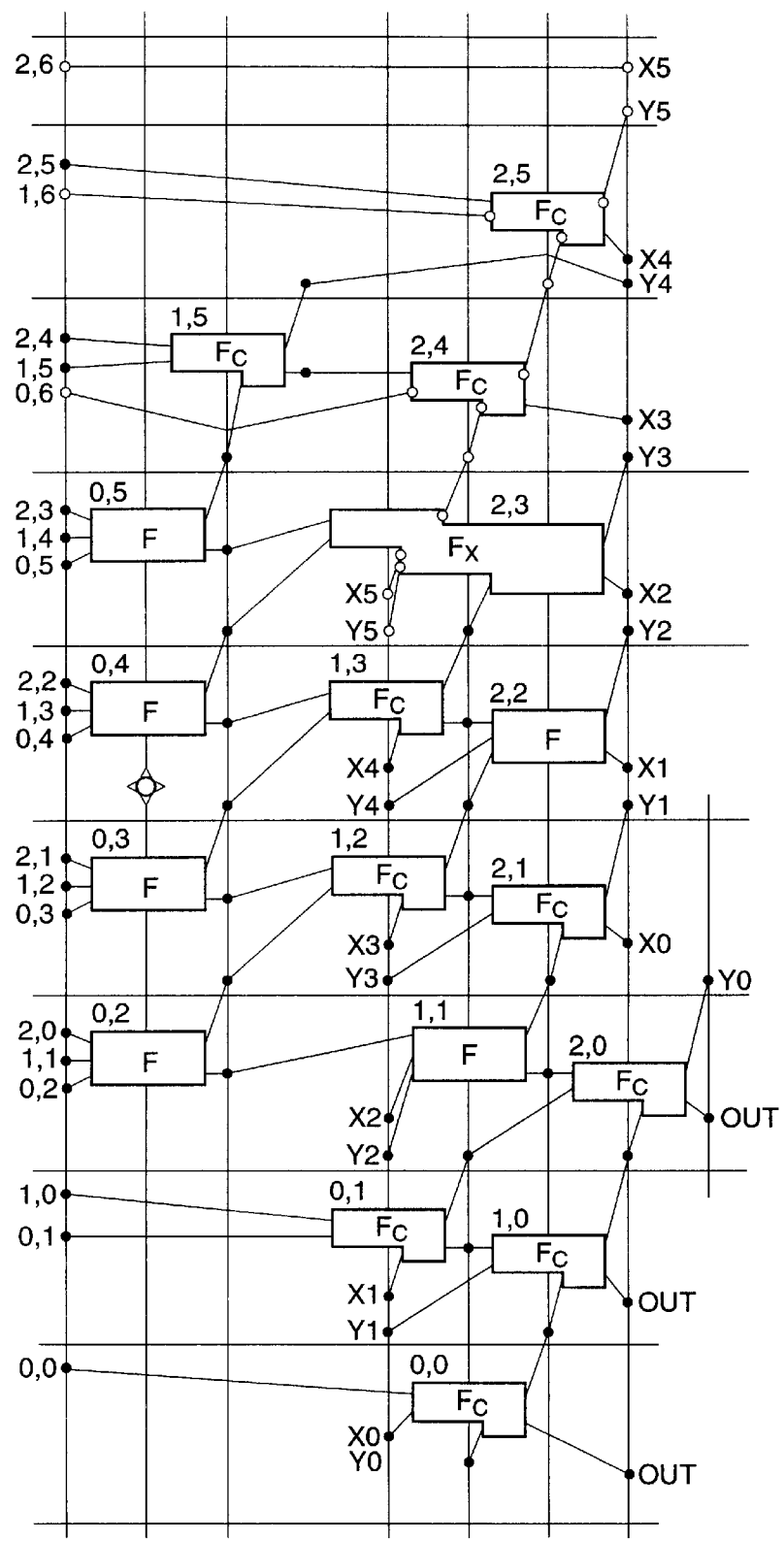
FIG. 21K is a bitslice/timing diagram of a type "E1i/S" group having a width of seven bits and formed as part of a two's complement signed multiplier array in accordance with a preferred embodiment of the present invention.
Figure 21L:
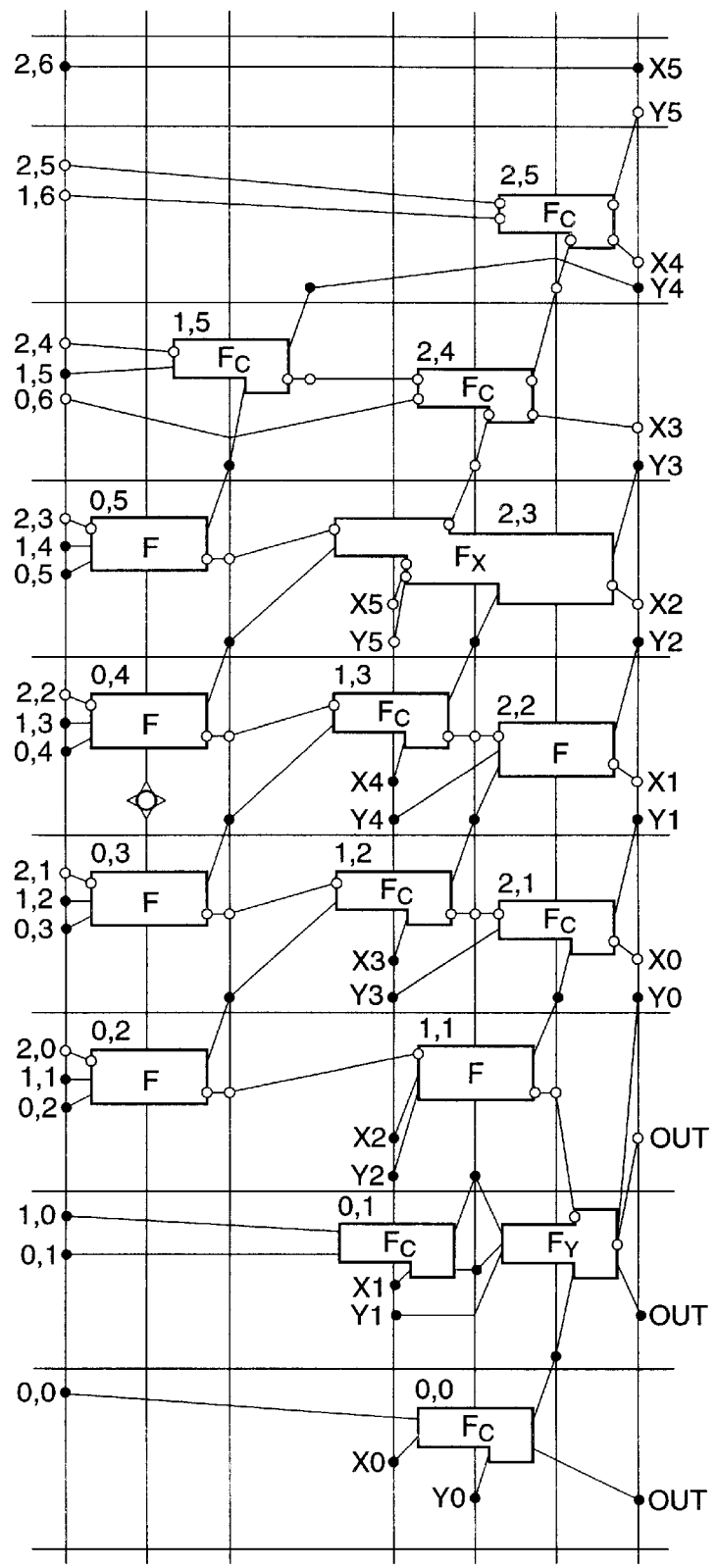
FIG. 21L is a bitslice/timing diagram of a type "E1f/S" group having a width of seven bits and formed as part of a two's complement signed multiplier array in accordance with a preferred embodiment of the present invention.
Figure 21M:
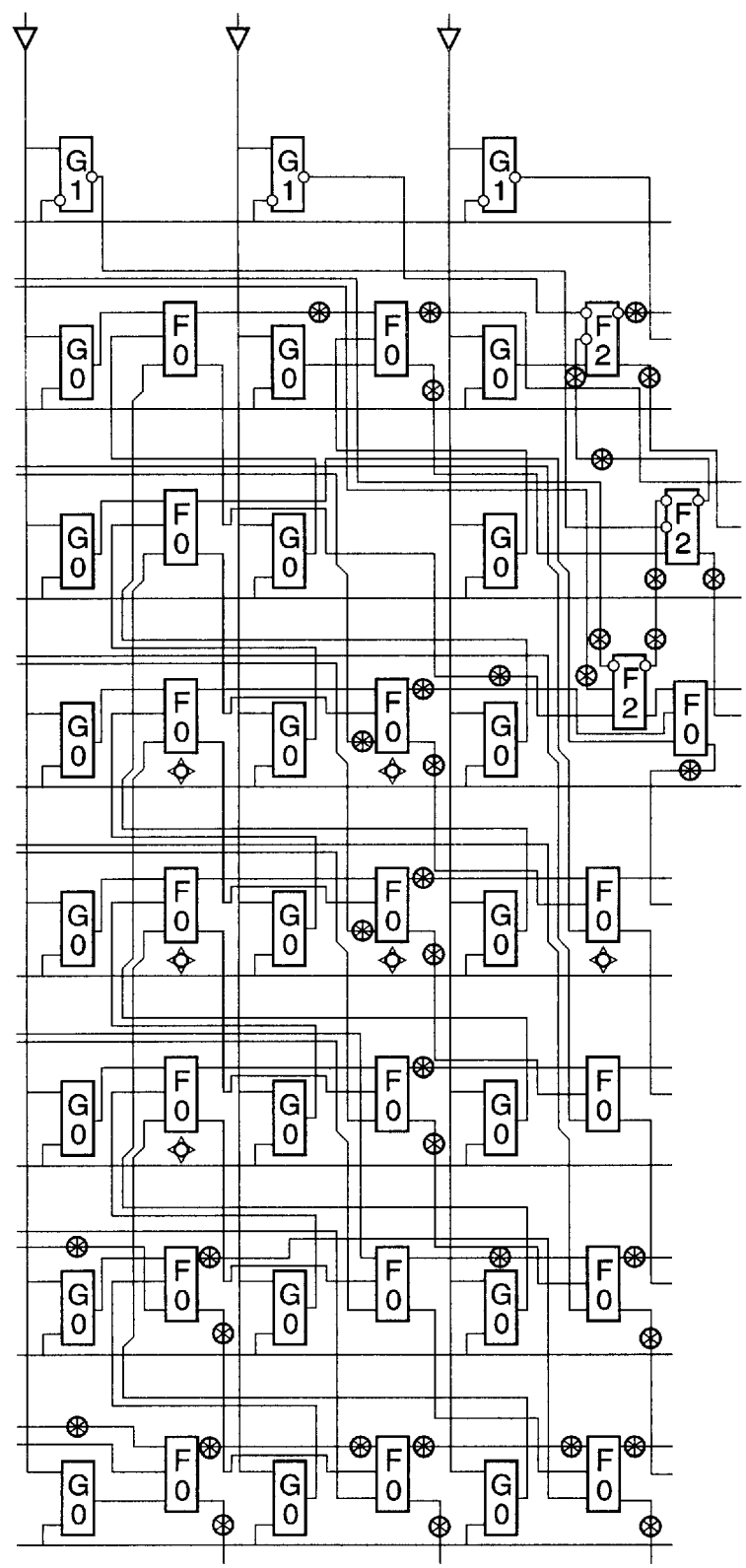
FIG. 21M is a topological schematic diagram of a group formed in accordance with the bitslice/timing diagram of FIG. 21K, but with a width of eight bits.

FIG. 21M shows placement and routing which can be used to implement the invention in the array with regular structure. FIG. 21 M is a circuit group three full-adders wide in effect. Note that the longest interconnect (other than the input signals) is about four bitslices long. Also note that the interconnect is regular within the central portion of the array, with modifications from this regularity necessary in the first and last few rows of the array to meet the top and bottom boundary conditions of the array.

Figure 16:
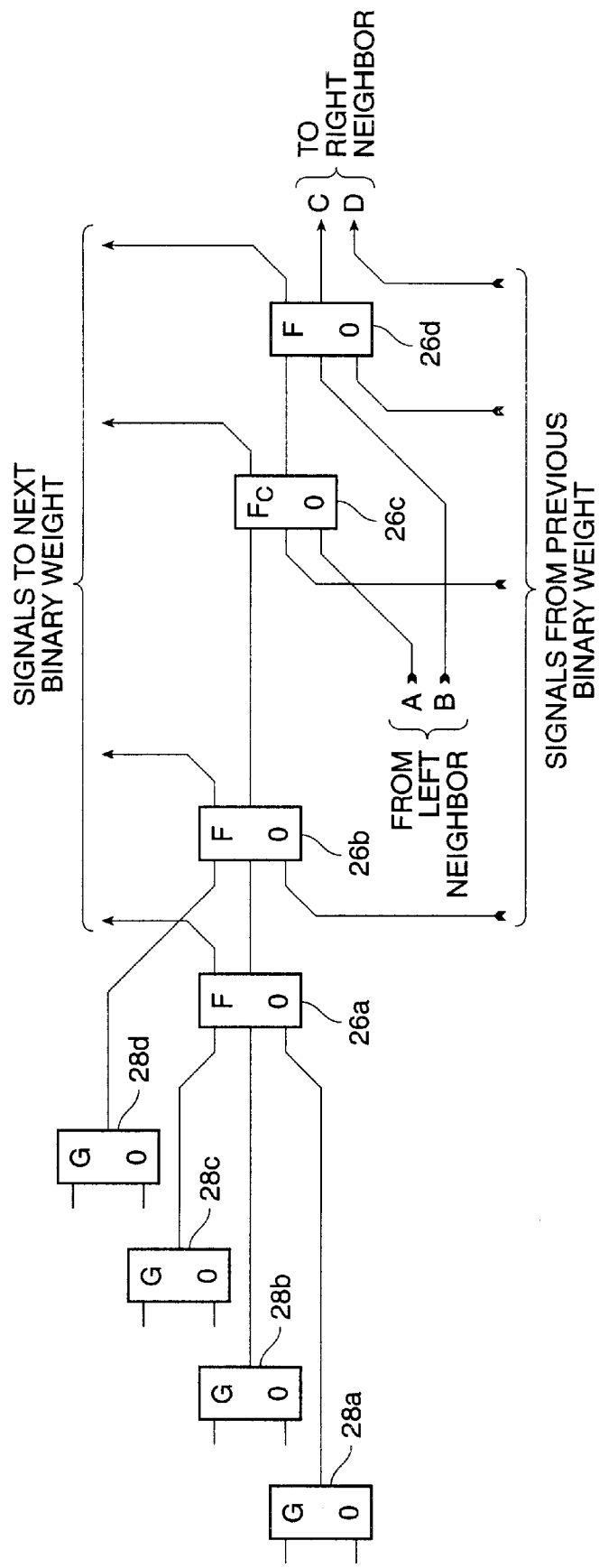
FIG. 16 is a schematic diagram showing the wiring of four internal columns of a multiplier array modified from the form shown in FIG. 1 in accordance with the present invention.

The invention can also be generalized to groups of four or more columns. FIG. 16 shows the symbolic timing diagram for a four-column type "F" circuit group. In this case, two of the full-adders 26a, 26b operate upon the data from the group's AND gates 28a, 28b, 28c, 28d, while the remaining two full-adders 26c, 26d (26c being a type Fc Quikadder™) also read from the two data values from the left neighboring column. In general, for groups of any size, all but two of the full-adders will operate upon the AND gate data, while the remaining type F and type Fc adders will add in the data from the columns to the left.

The propagation delay through a four-column group as in FIG. 16 is 1.5 FAdelays, while the corresponding delay through four columns of a conventional array multiplier as in FIG. 1 is 4 FAdelays. The delay through the type F column groups of the invention is therefore about 38% of the delay through a conventional array multiplier.

As the number of columns in a group increases, the average route length increases and the routing complexity within the group also increases. At some point, increasing the routing complexity and length will have a detrimental impact and the delays imposed by the longer routes will offset the speed gains achieved by propagating through fewer gates. These thresholds are strongly influenced by the fabrication technology used in fabricating the actual hardware. For existing fabrication technologies, four-column groups appear to be a practical limit. As fabrication technologies improve, five-column and larger column groups may become practical using the principals set forth herein.

A complete multiplier implemented using this invention will have a structure arranged in substitute column groups. There will be a "left" column group to handle input. This group will not differ much from the circuitry of conventional multiplier arrays. Next will be a series of internal column groups to flesh out the array multiplier. Finally, a right column group will provide outputs to a CLA adder/subtractor. For example, a speed-optimized array multiplier according to the present invention may have the same first two or three circuit columns as a conventional array multiplier. Next to the right may be one, two or three three-column groups. The remaining columns in the array may then be implemented as four-column groups (see, e.g., FIG. 16). The array, if it is to use four-column groups, must have at least one three-column group, or else the delays in the first (from left to right) four-column group will not be set by the propagating signals, but by summation of the AND gate outputs within that group, resulting in a less efficient design. The variability in the number of groups of each type is required because the array must be built with complete groups. For example, a 16×16 bit multiplier array may be constructed out of the first two columns of a conventional multiplier array, two three-column groups, and two four-column groups, for a total of 16 columns to process the 16 Y-inputs.

PRESENTLY PREFERRED GROUPS

Figure 17A:
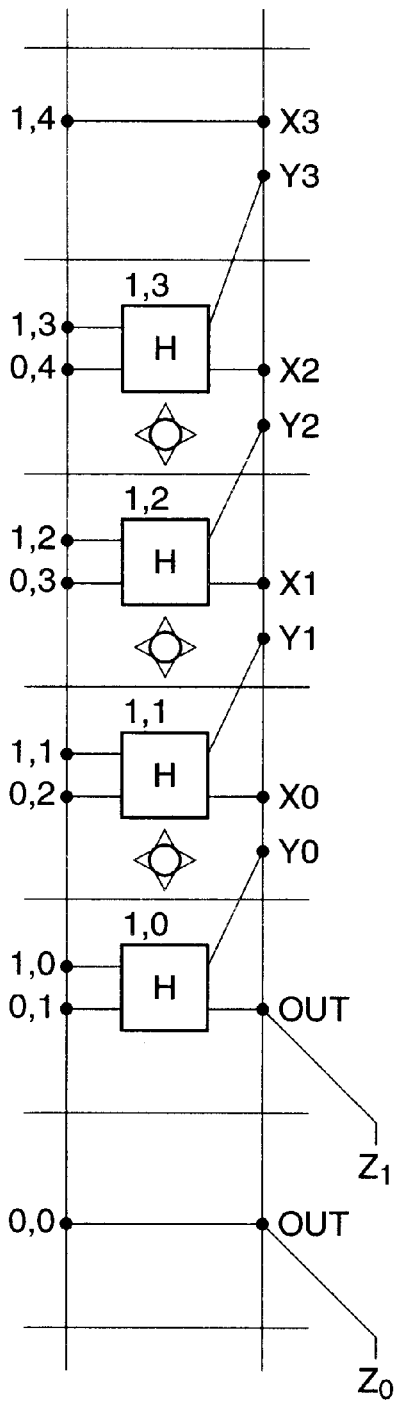
FIG. 17A is a bitslice/timing diagram of a prior art equivalent column "A/U" having a width of five bits and formed as part of an unsigned multiplier array.

FIG. 17A is a bitslice/timing diagram of a prior art equivalent column "A/U" having a width of five bits and formed as part of an unsigned multiplier array. This group or column "A/U" simply represents a left vertical slice of two of the columns of the unsigned multiplier of FIG. 1. The three Cell Iteration Marks simply represent three identical cells within the vertical group A. To increase the bit-width for additional X-bit processing, one would add additional Cells as marked with the Cell Iteration Marks as desired and adjacent to the cells bearing the Cell Iteration Marks. Note that the "A/U" group of FIG. 17A does not include the array of AND gates explicitly. These are referred to in the figure by the pairs of numbers at the left, i.e., "0,3" which refers to the output of the AND gate at column 0 (counting from the left, starting at zero), row 3 (counting from the bottom, starting at zero). This is more clearly understood by reference back to FIG. 1. LSB outputs $Z_0$ and $Z_1$ are also available directly from the group "A/U" circuit block as shown. The circuit signals $X_0$, $Y_0$, etc. are the outputs of the A group and are passed to the next group to the right. After processing through the complete array multiplier, these signals, still called $X^0$, $Y_0$, etc. in the drawings (but obviously changed) are applied to a CLA adder/subtractor to obtain the MSBs of Z, the output.

Figure 17B:
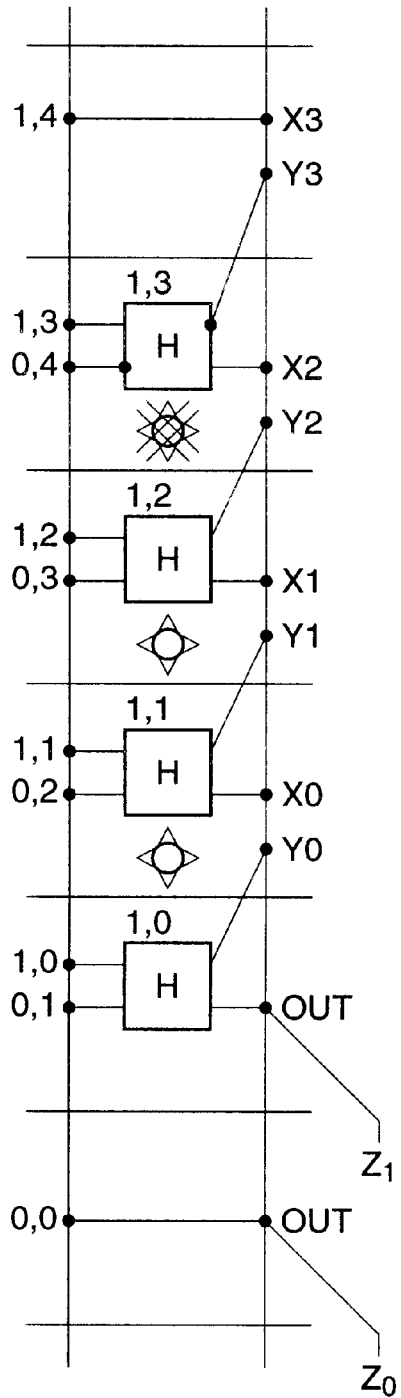
FIG. 17B is a bitslice/timing diagram of a prior art equivalent column "A/S" having a width of five bits and formed as part of a two's complement signed multiplier array.

FIG. 17B is a bitslice/timing diagram of a prior art equivalent column "A/S" having a width of five bits and formed as part of a two's complement signed multiplier array.

Figure 17C:
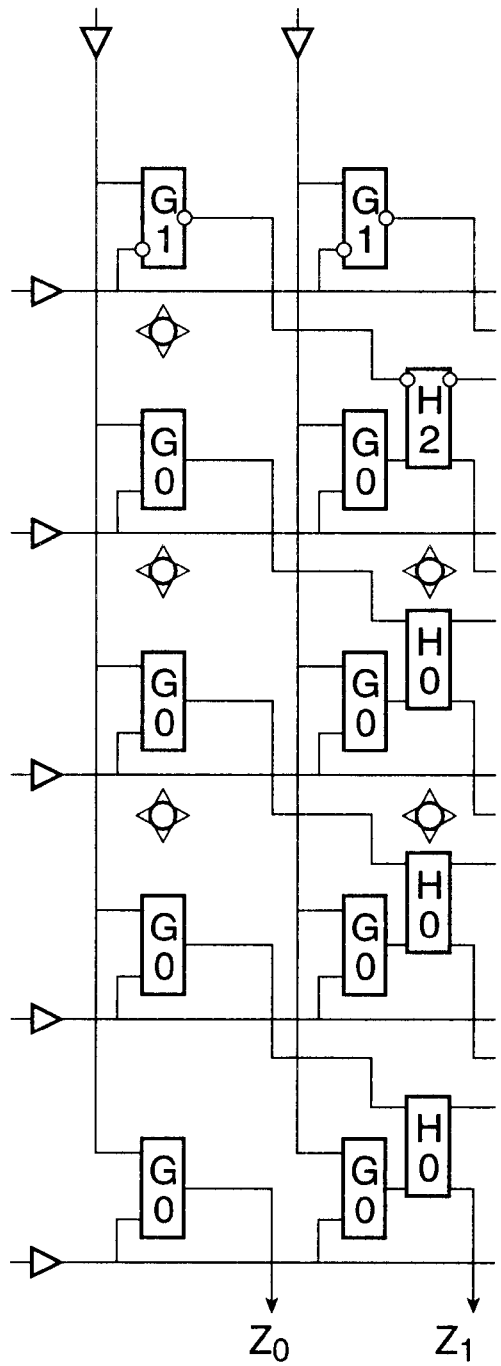
FIG. 17C is a topological schematic diagram of a column formed in accordance with the bitslice/timing diagram of FIG. 17B.

FIG. 17C is a topological schematic diagram of a column formed in accordance with the bitslice/timing diagram of FIG. 17B. This diagram shows the placement of the AND gates omitted from FIG. 17B.

Figure 18A:
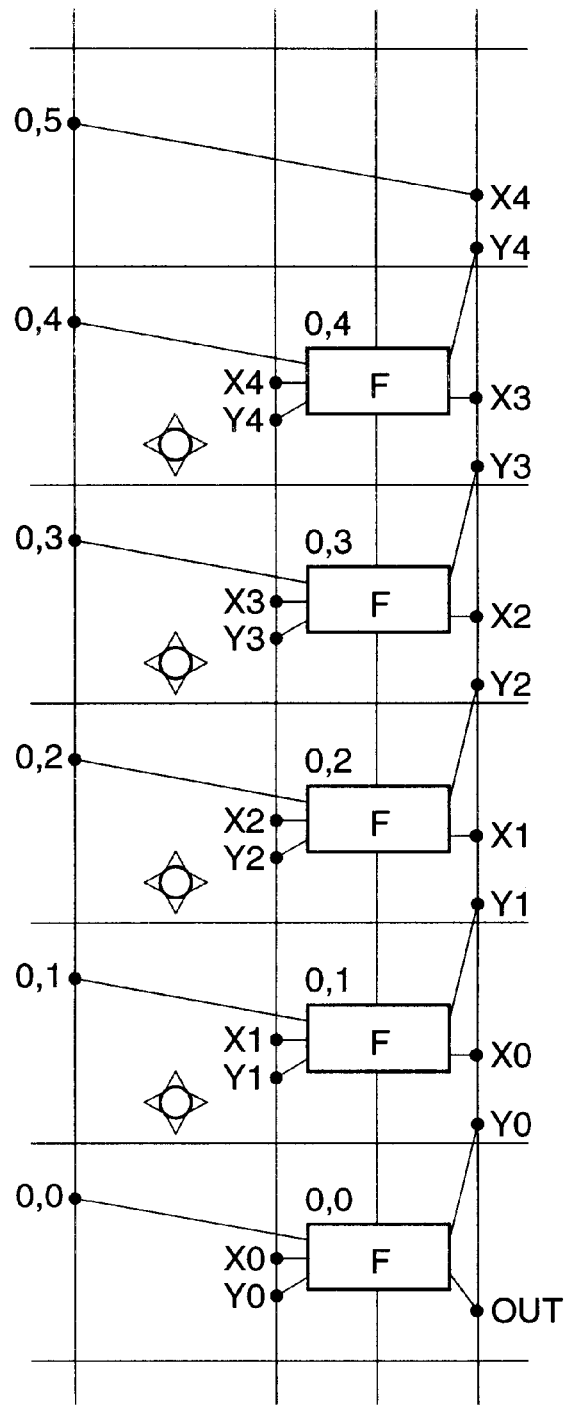
FIG. 18A is a bitslice/timing diagram of a prior art equivalent column "C/U" having a width of 6 bits and formed as part of an unsigned multiplier array.

FIG. 18A is a bitslice/timing diagram of a prior art equivalent column "C/U" having a width of 6 bits and formed as part of an unsigned multiplier array. column or group C is simply a one column group from FIG. 1. An array as in FIG. 1 could be constructed from one group A at the left and a number of group C elements to the right of the group A. Since FIG. 1 is unsigned, no special treatment is needed at the right side of the array and the outputs of the final group C go directly into a CLA adder to obtain the MSBs of the output Z.

Figure 18B:
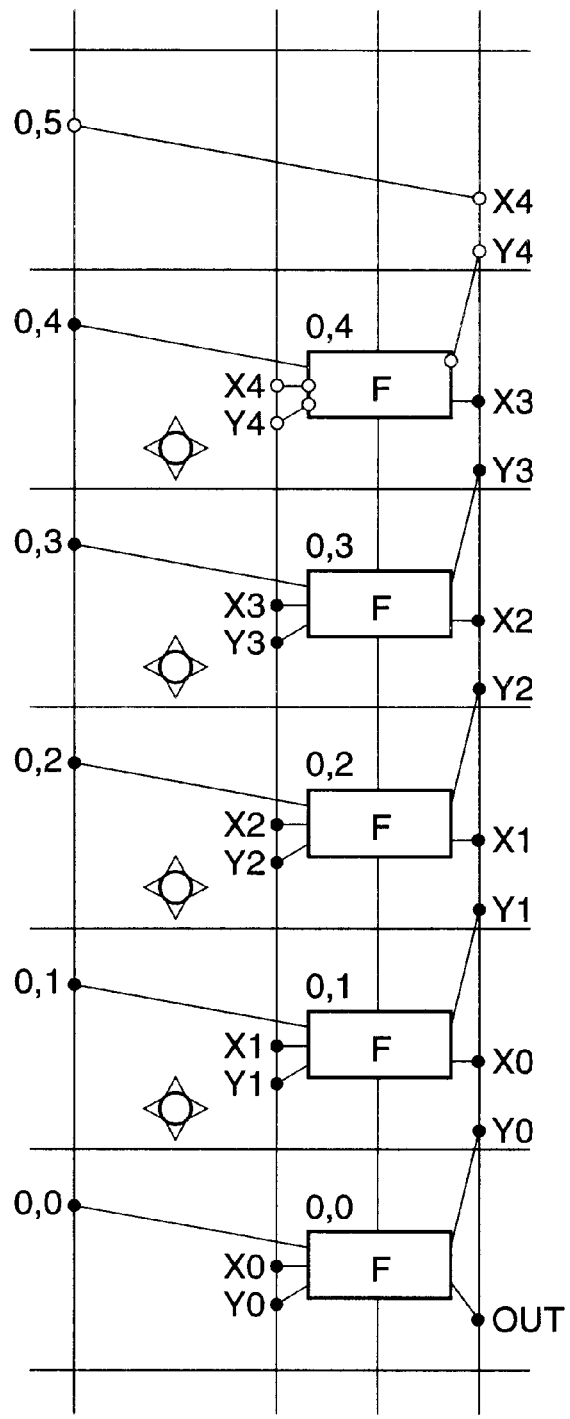
FIG. 18B is a bitslice/timing diagram of a prior art equivalent column "Ci/S" having a width of 6 bits and formed as part of a two's complement signed multiplier array.

FIG. 18B is a bitslice/timing diagram of a prior art equivalent column "Ci/S" having a width of 6 bits and formed as part of a two's complement signed multiplier array. In signed arithmetic, there is a difference between the "internal" columns and the "final" column. Thus group "Ci/S" represents an internal group version of group "C/U" for two's complement math and the group "Cf/S" is required to provide an output to the CLA subtractor.

Figure 18C:
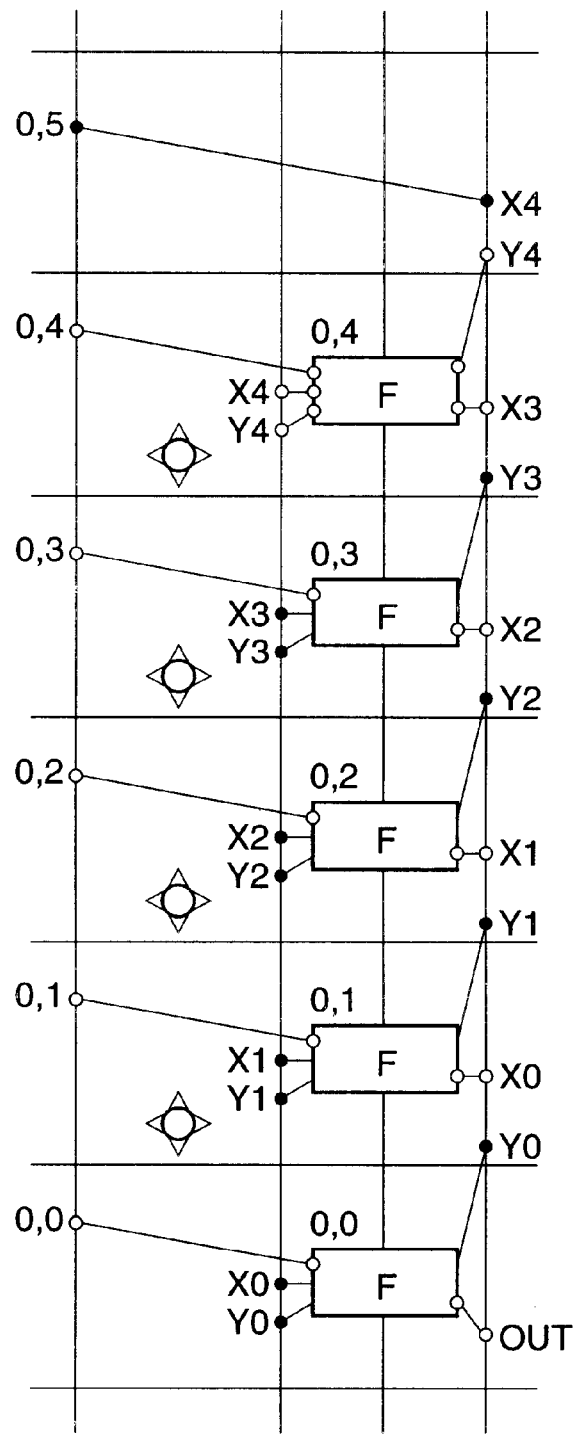
FIG. 18C is a bitslice/timing diagram of a prior art equivalent column "Cf/S" having a width of 6 bits and formed as part of a two's complement signed multiplier array.

FIG. 18C is a bitslice/timing diagram of a prior art equivalent column "Cf/S" having a width of 6 bits and formed as part of a two's complement signed multiplier array.

Figure 18D:
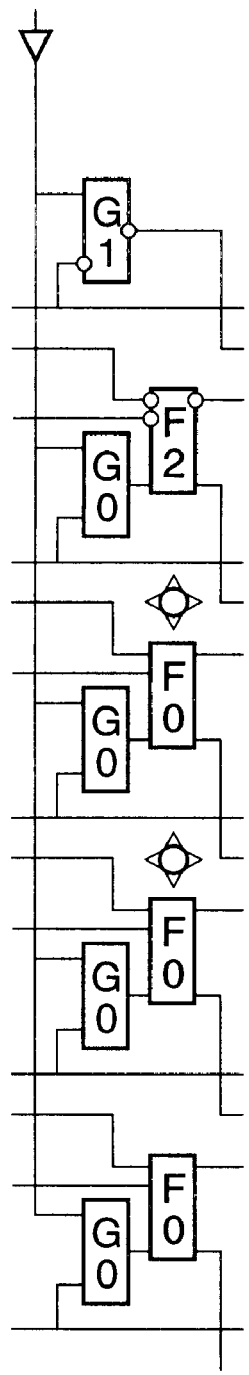
FIG. 18D is a topological schematic diagram of a column formed in accordance with the bitslice/timing diagram of FIG. 18B, but with a width of five bits.

FIG. 18D is a topological schematic diagram of a column formed in accordance with the bitslice/timing diagram of FIG. 18B, but with a width of five bits.

Figure 18E:
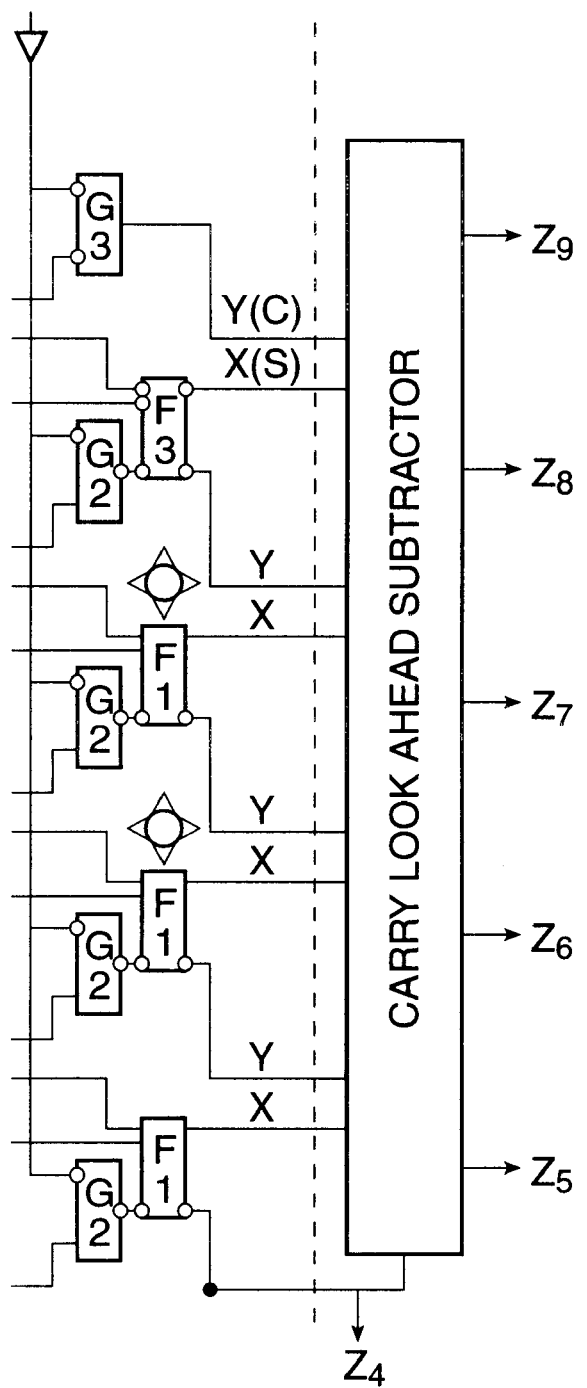
FIG. 18E is a topological schematic diagram of a column formed in accordance with the bitslice/timing diagram of FIG. 18C, but with a width of five bits and also showing the placement of the MSB CLA subtractor which would be connected to it.

FIG. 18E is a topological schematic diagram of a column formed in accordance with the bitslice/timing diagram of FIG. 18C, but with a width of five bits and also showing the placement of the MSB CLA subtractor which would be connected to it.

Figure 19A:
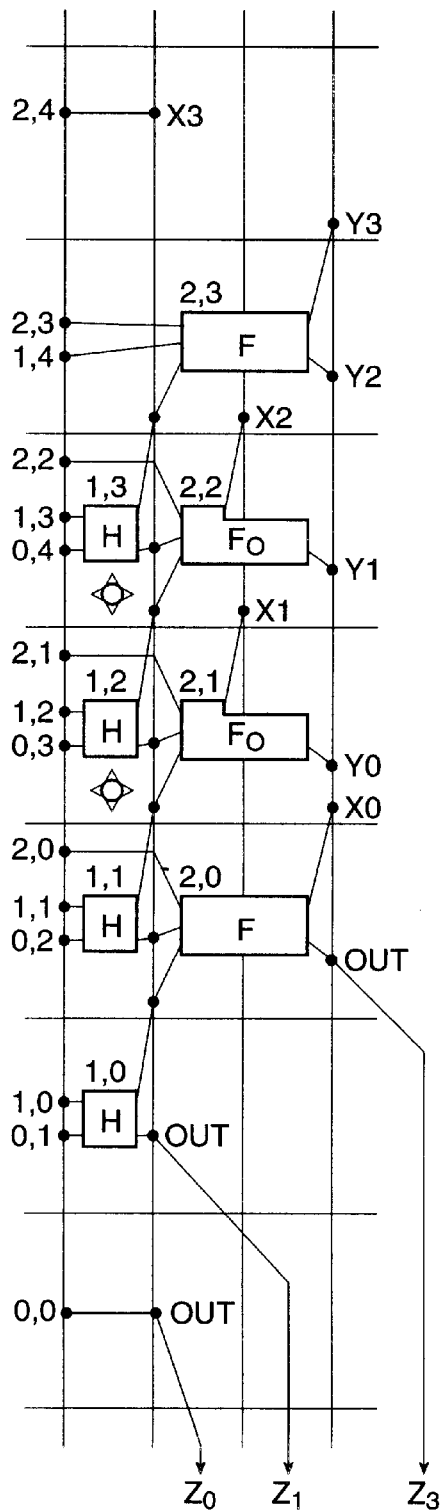
FIG. 19A is a bitslice/timing diagram of a type "B2/U" group having a width of five bits and formed as part of an unsigned multiplier array in accordance with a preferred embodiment of the present invention.

FIG. 19A is a bitslice/timing diagram of a type "B2/U" group having a width of five bits and formed as part of an unsigned multiplier array in accordance with a preferred embodiment of the present invention. Note that group B2 is designed to be a replacement for an A and an adjacent C, i.e., it is three columns wide and goes on the "left" of the array. Also note that $X_1 \ldots X_N$ outputs are available before their corresponding $Y_1 \ldots Y_N$ outputs. Group B2 takes advantage of the timing of the Fo Quikadder™.

Figure 19B:
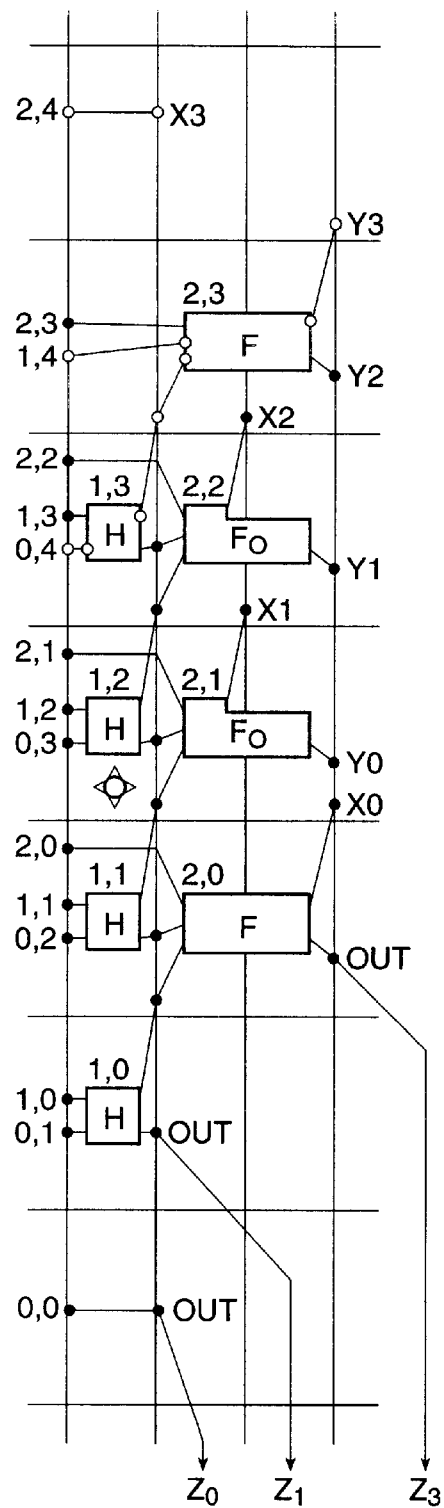
FIG. 19B is a bitslice/timing diagram of a type "B2/S" group having a width of five bits and formed as part of a two's complement signed multiplier array in accordance with a preferred embodiment of the present invention.

FIG. 19B is a bitslice/timing diagram of a type "B2/S" group having a width of five bits and formed as part of a two's complement signed multiplier array in accordance with a preferred embodiment of the present invention.

Figure 19C:
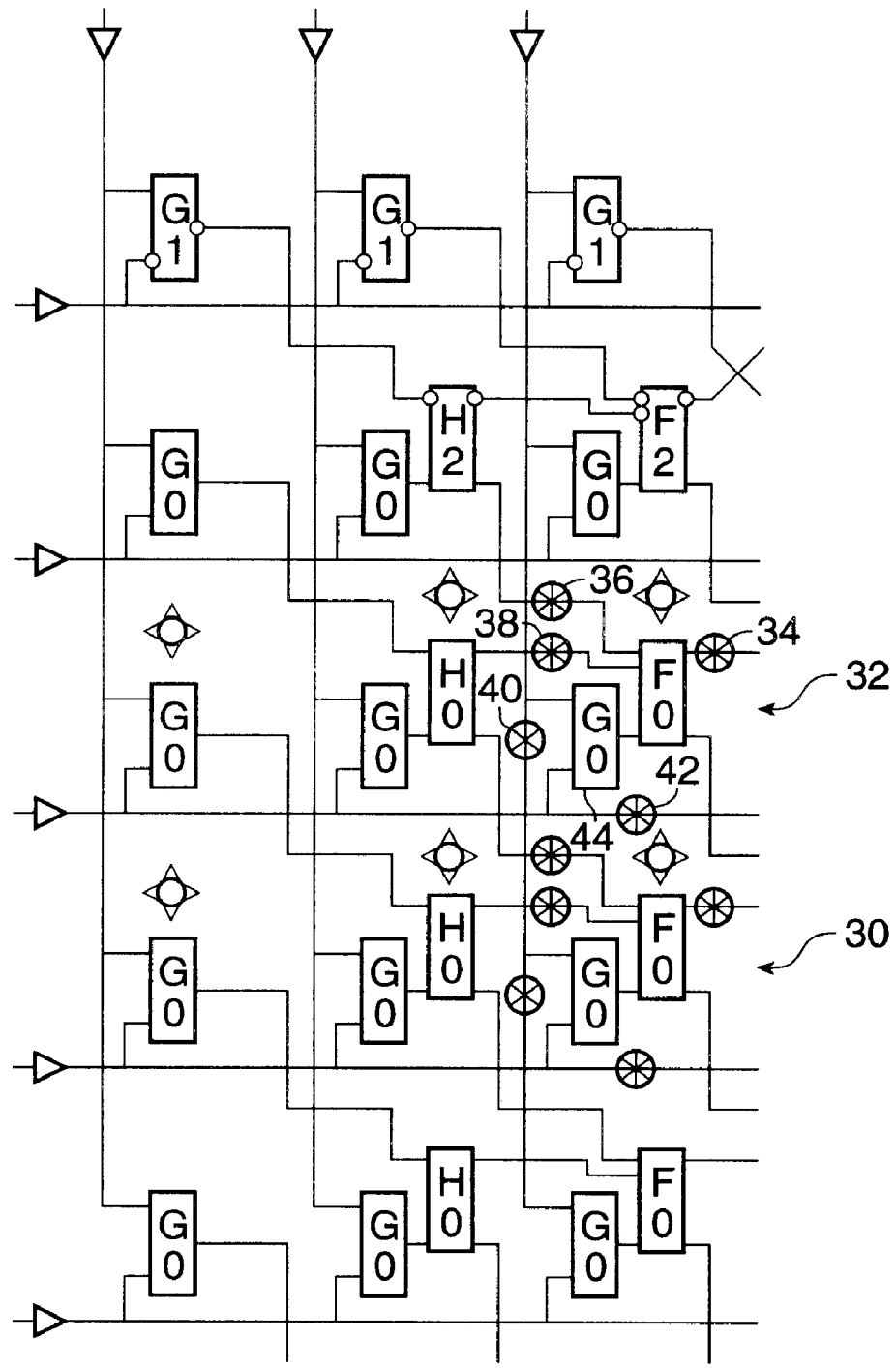
FIG. 19C is a topological schematic diagram of a group formed in accordance with the bitslice/timing diagram of FIG. 19B.

FIG. 19C is a topological schematic diagram of a group formed in accordance with the bitslice/timing diagram of FIG. 19B. Note that the "F0" blocks 30, 32 in the second full-adder column are equivalent to the FIG. 12C Fo block due to the critical timing marks 34, 36, 38, 40 and 42 (for block 32) which define an FO block with A, B, C inputs critical and Y output critical. Note that the criticality of the C input is inherent from the criticality of the inputs to its corresponding G0 AND gate 44.

Figure 20A:
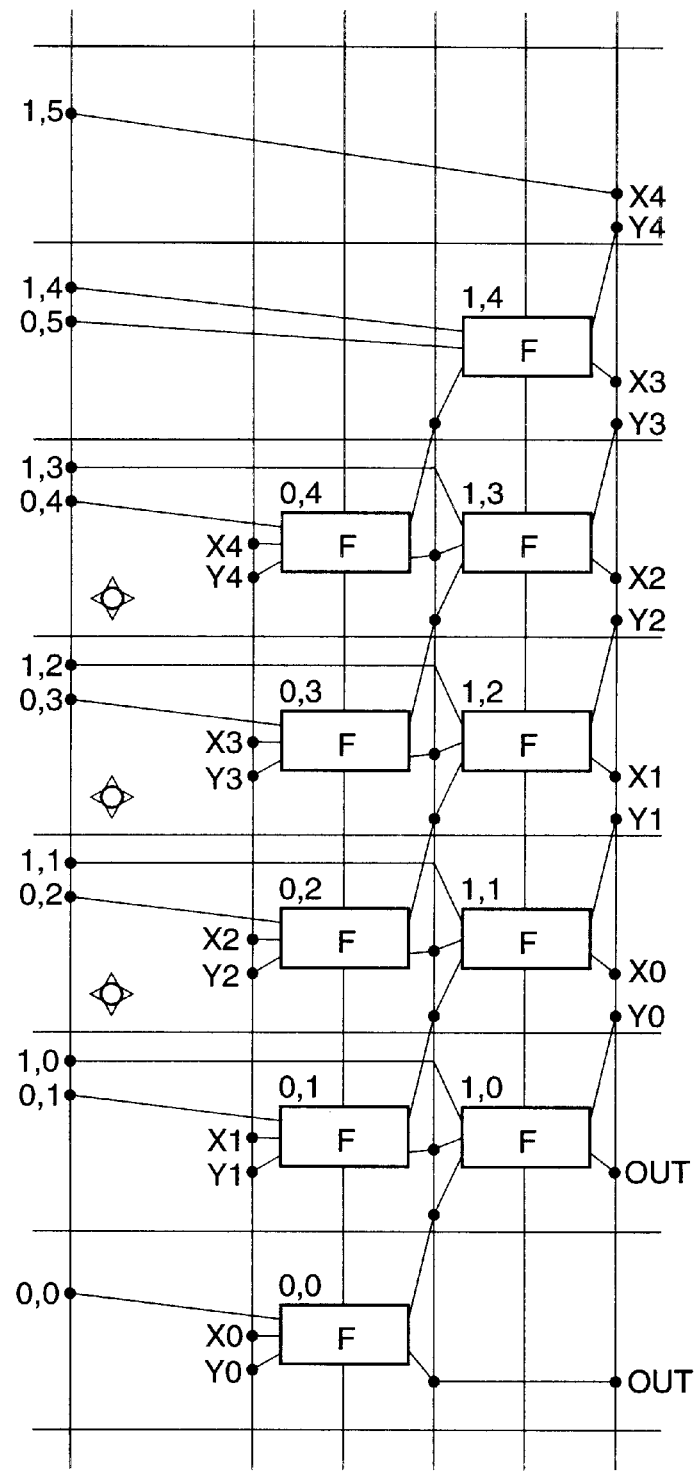
FIG. 20A is a bitslice/timing diagram of a prior art equivalent type "D-BASIC/U" group having a width of six bits and formed as part of an unsigned multiplier array.

FIG. 20A is a bitslice/timing diagram of a prior art equivalent type "D-BASIC/U" group having a width of six bits and formed as part of an unsigned multiplier array. D groups have a width of 2 columns. This group is equivalent to a pair of C groups from FIG. 1.

Figure 20B:
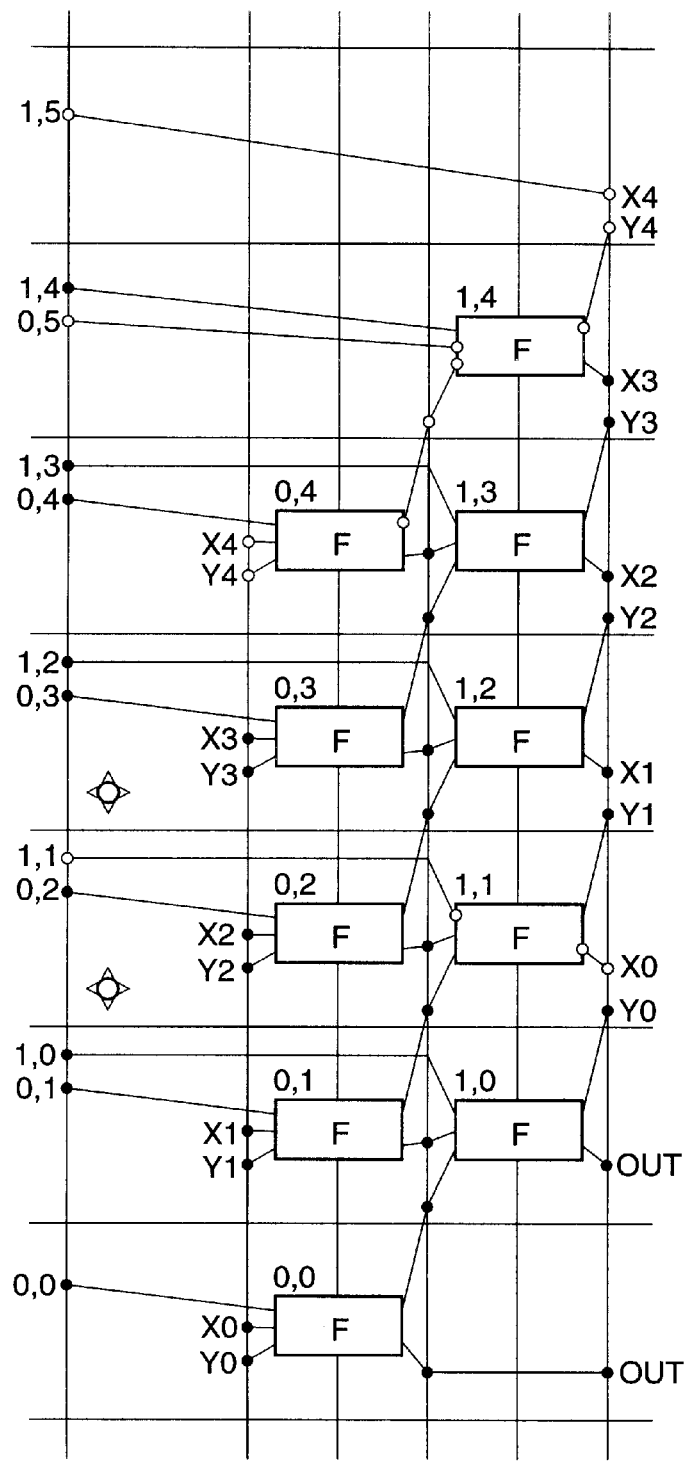
FIG. 20B is a bitslice/timing diagram of a prior art equivalent type "Di/S" group having a width of six bits and formed as part of a two's complement signed multiplier array.

FIG. 20B is a bitslice/timing diagram of a prior art equivalent type "Di/S" group having a width of six bits and formed as part of a two's complement signed multiplier array. This group is equivalent to a pair of Ci groups from FIG. 2.

Figure 20C:
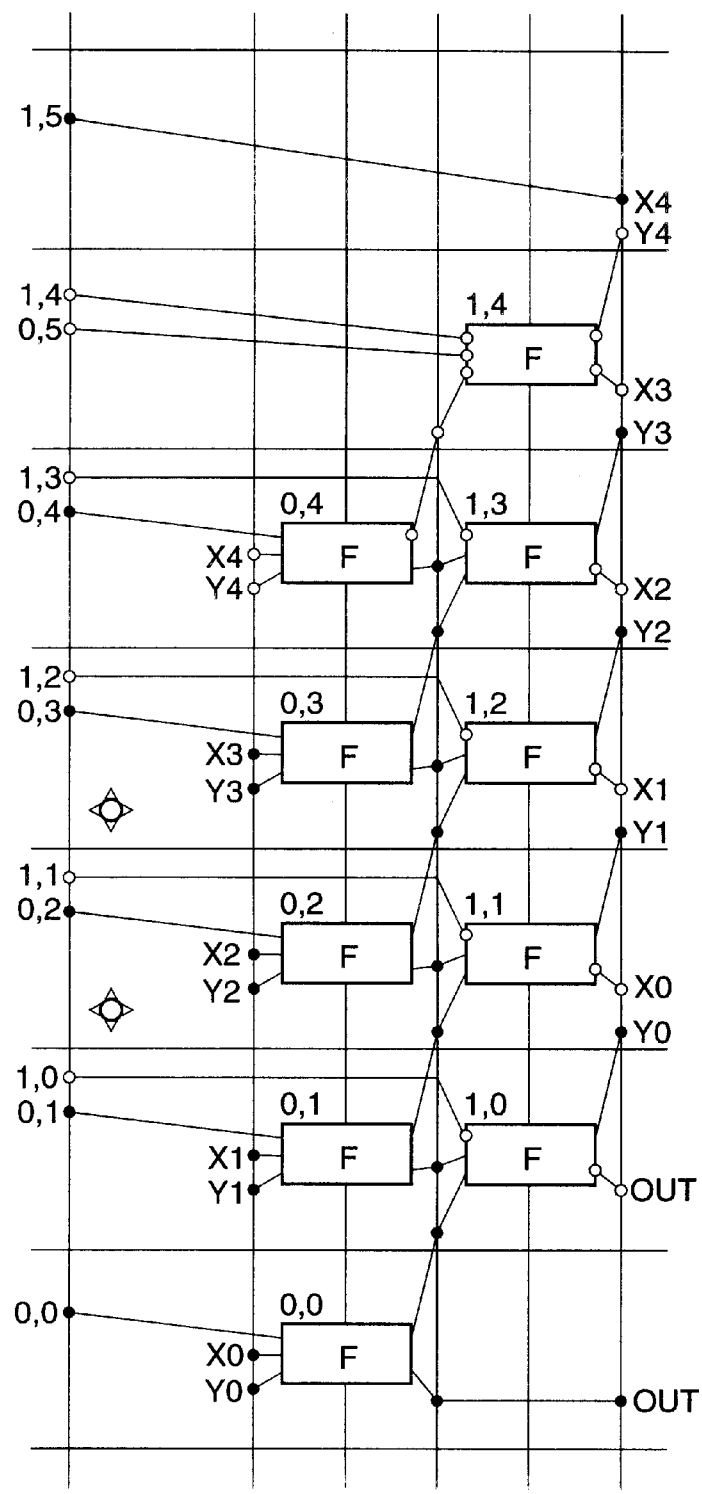
FIG. 20C is a bitslice/timing diagram of a prior art equivalent type "Df/S" group having a width of six bits and formed as part of a two's complement signed multiplier array.

FIG. 20C is a bitslice/timing diagram of a prior art equivalent type "Df/S" group having a width of six bits and formed as part of a two's complement signed multiplier array. This group is equivalent to a Ci+Cf group.

Figure 20D:
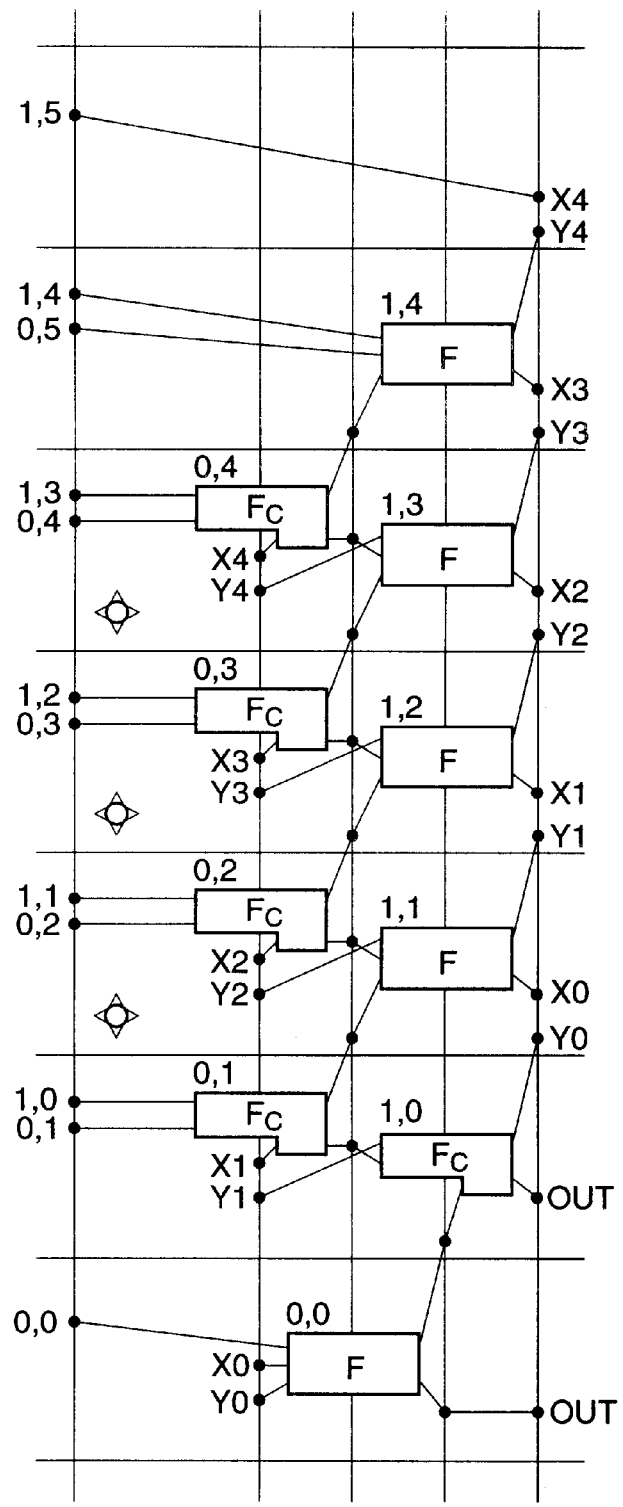
FIG. 20D is a bitslice/timing diagram of a type "D1/U" group having a width of six bits and formed as part of an unsigned multiplier array in accordance with a preferred embodiment of the present invention.

FIG. 20D is a bitslice/timing diagram of a type "D1/U" group having a width of six bits and formed as part of an unsigned multiplier array in accordance with a preferred embodiment of the present invention. This D1 group utilizes type F and type Fc 3/2 full-adders and replaces 2 adjacent type C columns.

Figure 20E:
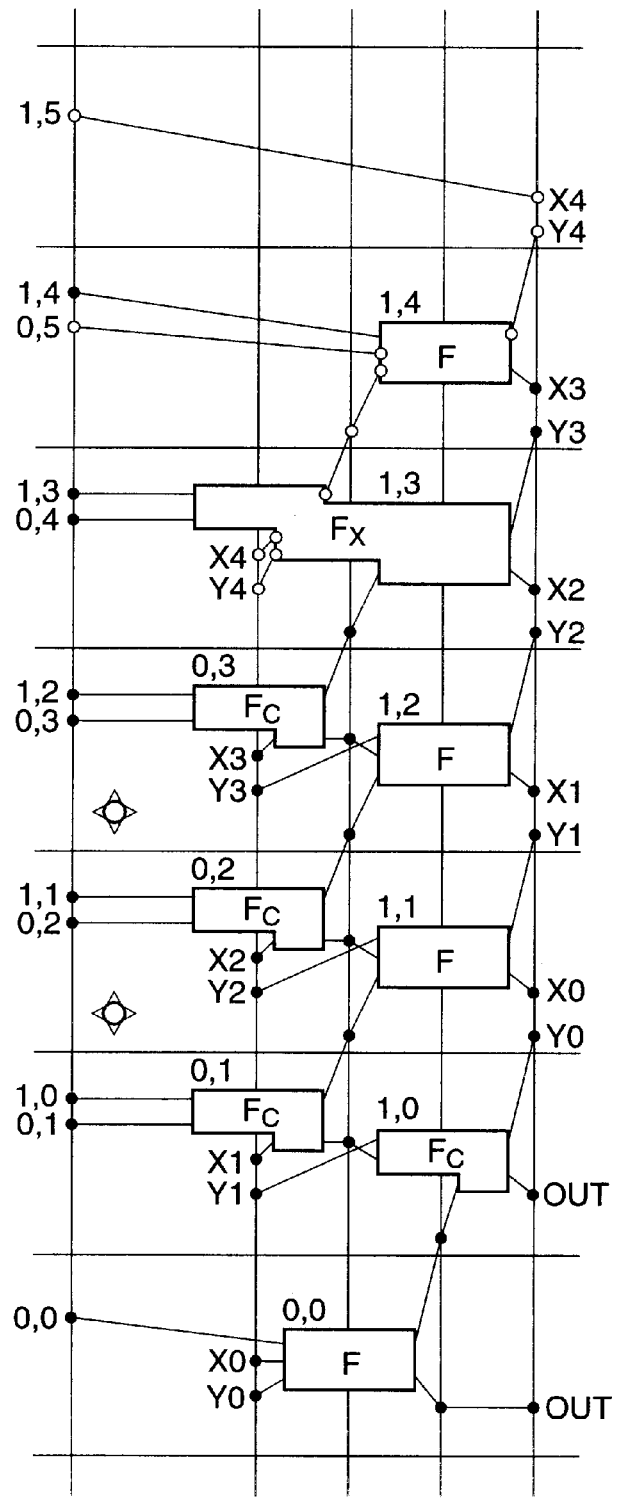
FIG. 20E is a bitslice/timing diagram of a type "D1i/S" group having a width of six bits and formed as part of a two's complement signed multiplier array in accordance with a preferred embodiment of the present invention.

FIG. 20E is a bitslice/timing diagram of a type "D1i/S" group having a width of six bits and formed as part of a two's complement signed multiplier array in accordance with a preferred embodiment of the present invention. This replaces two adjacent type Ci columns. It makes use of type F, Fc and Fx adders.

Figure 20F:
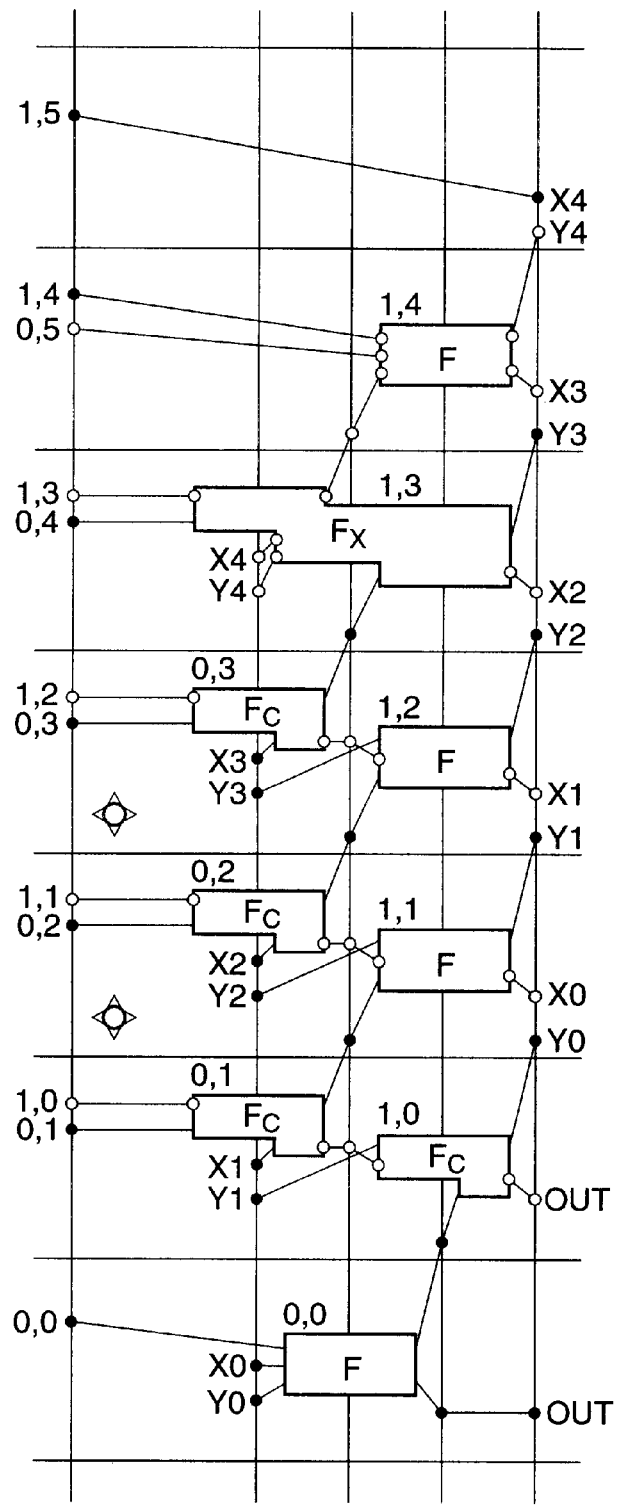
FIG. 20F is a bitslice/timing diagram of a type "D1f/S" group having a width of six bits and formed as part of a two's complement signed multiplier array in accordance with a preferred embodiment of the present invention.

FIG. 20F is a bitslice/timing diagram of a type "D1f/S" group having a width of six bits and formed as part of a two's complement signed multiplier array in accordance with a preferred embodiment of the present invention. This replaces a Ci, Cf pair and makes use of F, Fc and Fx adders.

Figure 20G:
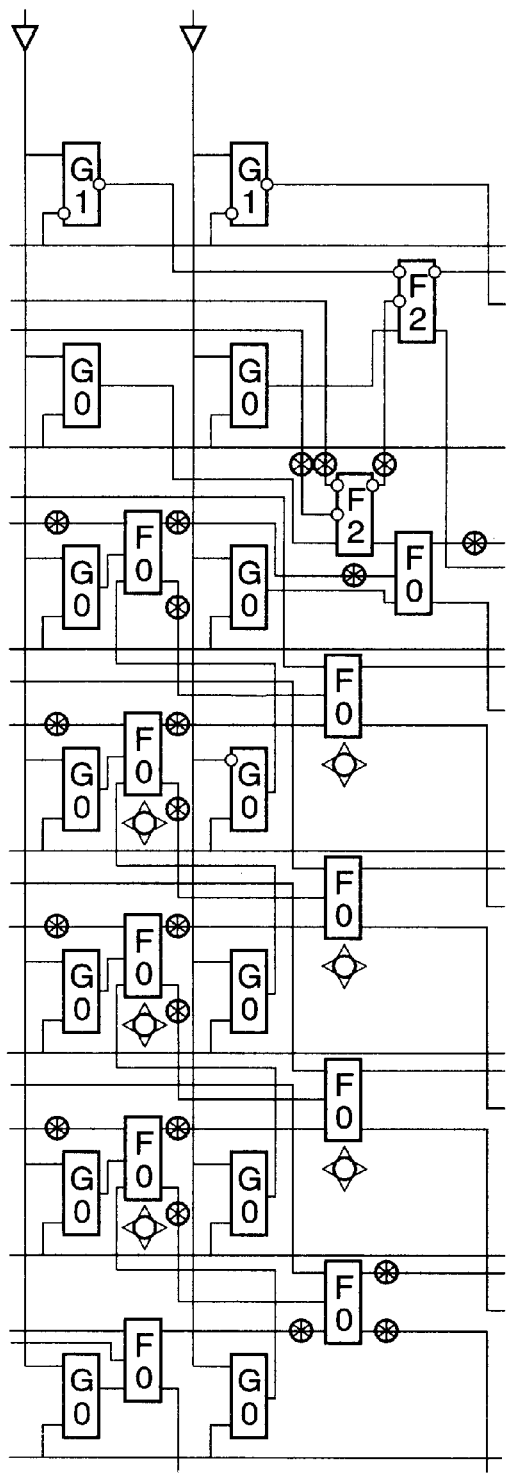
FIG. 20G is a topological schematic diagram of a group formed in accordance with the bitslice/timing diagram of FIG. 20E, but with a width of seven bits.

FIG. 20G is a topological schematic diagram of a group formed in accordance with the bitslice/timing diagram of FIG. 20E, but with a width of seven bits.

Figure 20H:
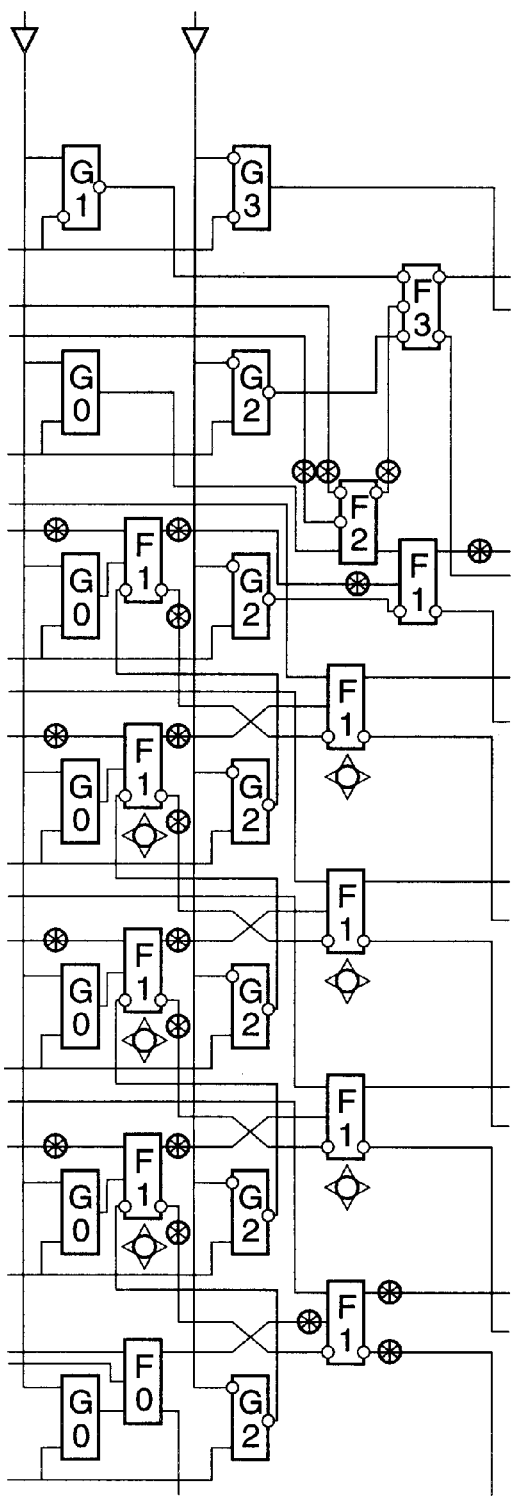
FIG. 20H is a topological schematic diagram of a group formed in accordance with the bitslice/timing diagram of FIG. 20F, but with a width of seven bits.

FIG. 20H is a topological schematic diagram of a group formed in accordance with the bitslice/timing diagram of FIG. 20F, but with a width of seven bits.

Figure 20I:
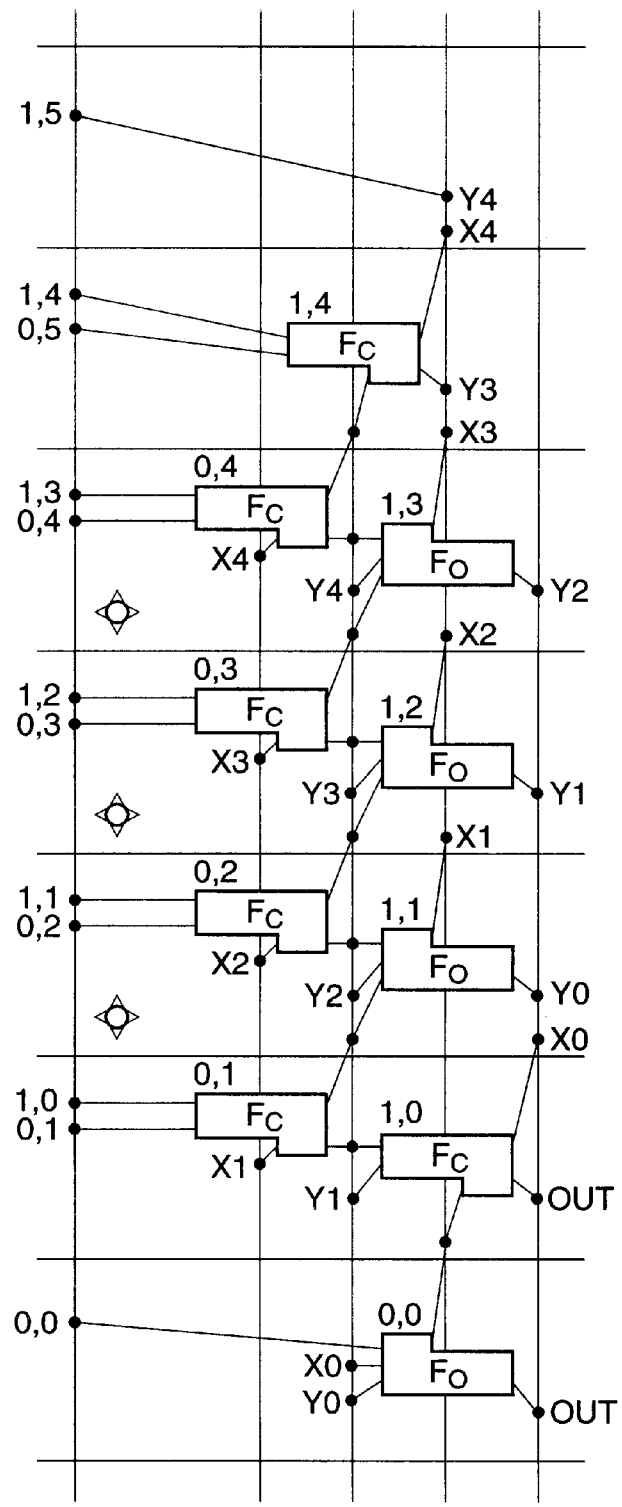
FIG. 20I is a bitslice/timing diagram of a type "D2i/U" group having a width of six bits and formed as part of an unsigned multiplier array in accordance with a preferred embodiment of the present invention.

FIG. 20I is a bitslice/timing diagram of a type "D2i/U" group having a width of six bits and formed as part of an unsigned multiplier array in accordance with a preferred embodiment of the present invention. This differs from the D1i group in that $X_1 \ldots X_N$ outputs are available before their corresponding $Y_1 \ldots Y_N$ outputs.

Figure 20J:
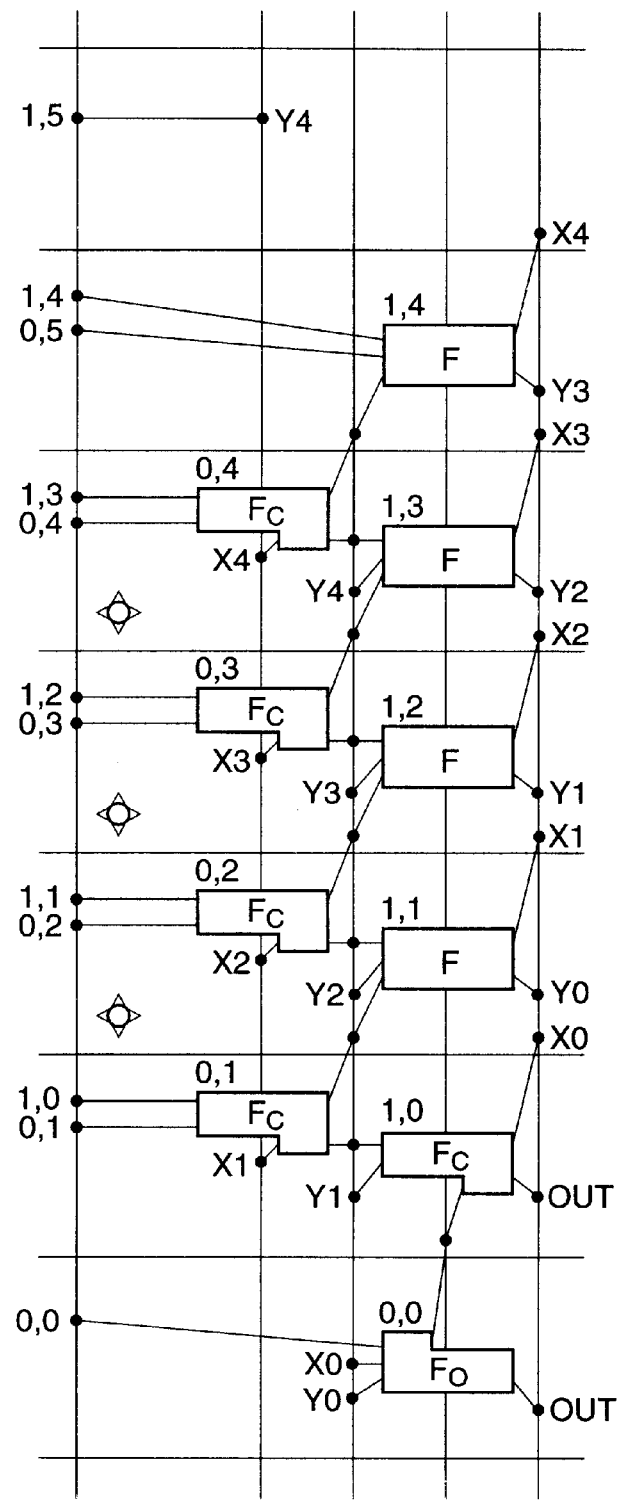
FIG. 20J is a bitslice/timing diagram of a type "D2f/U" group having a width of six bits and formed as part of an unsigned multiplier array in accordance with a preferred embodiment of the present invention.

FIG. 20J is a bitslice/timing diagram of a type "D2f/U" group having a width of six bits and formed as part of an unsigned multiplier array in accordance with a preferred embodiment of the present invention. This group is a double column group adapted to receive the staggered outputs of, for example, a D2i/unsigned group and provide outputs to a CLA subtractor.

Figure 20K:
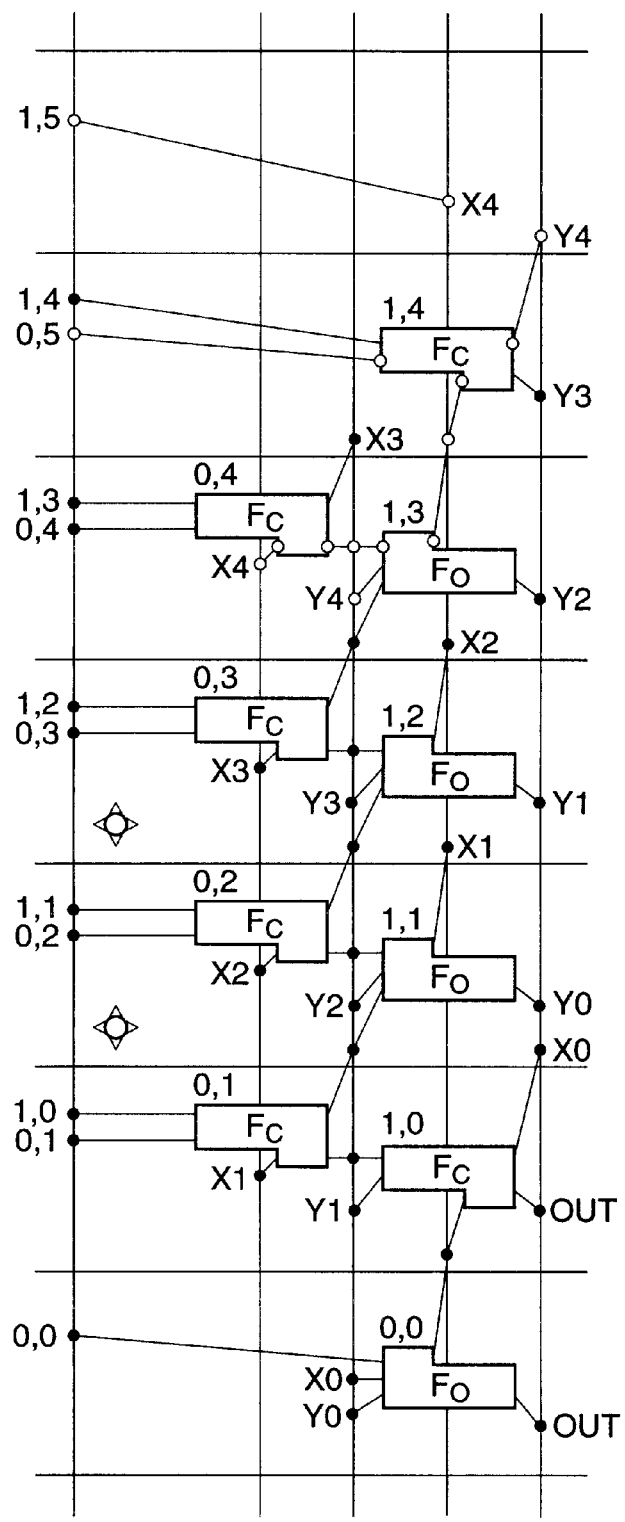
FIG. 20K is a bitslice/timing diagram of a type "D2i/S" group having a width of six bits and formed as part of a two's complement signed multiplier array in accordance with a preferred embodiment of the present invention.

FIG. 20K is a bitslice/timing diagram of a type "D2i/S" group having a width of six bits and formed as part of a two's complement signed multiplier array in accordance with a preferred embodiment of the present invention. Outputs here are also staggered. Fo and Fc adders are used.

Figure 20L:
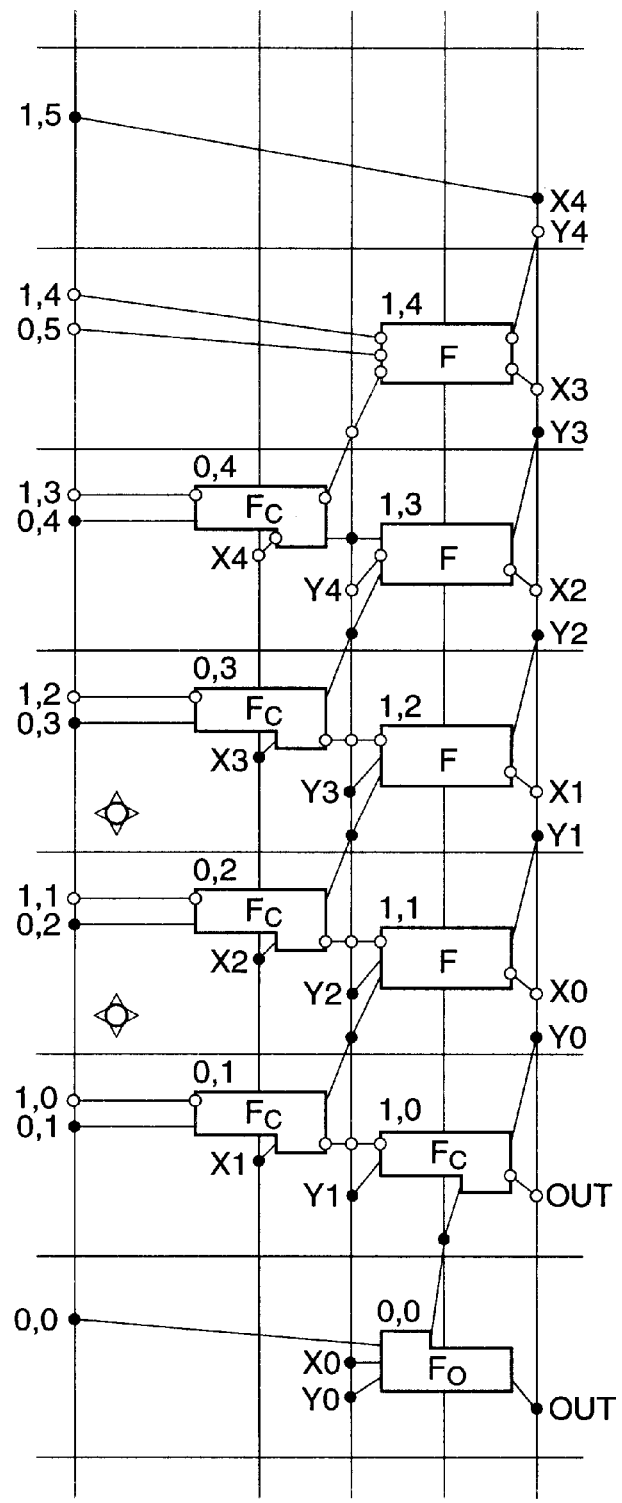
FIG. 20L is a bitslice/timing diagram of a type "D2f/S" group having a width of six bits and formed as part of a two's complement signed multiplier array in accordance with a preferred embodiment of the present invention.

FIG. 20L is a bitslice/timing diagram of a type "D2f/S" group having a width of six bits and formed as part of a two's complement signed multiplier array in accordance with a preferred embodiment of the present invention. This is a right group, double column, using F, Fo and Fc adders.

Figure 20M:
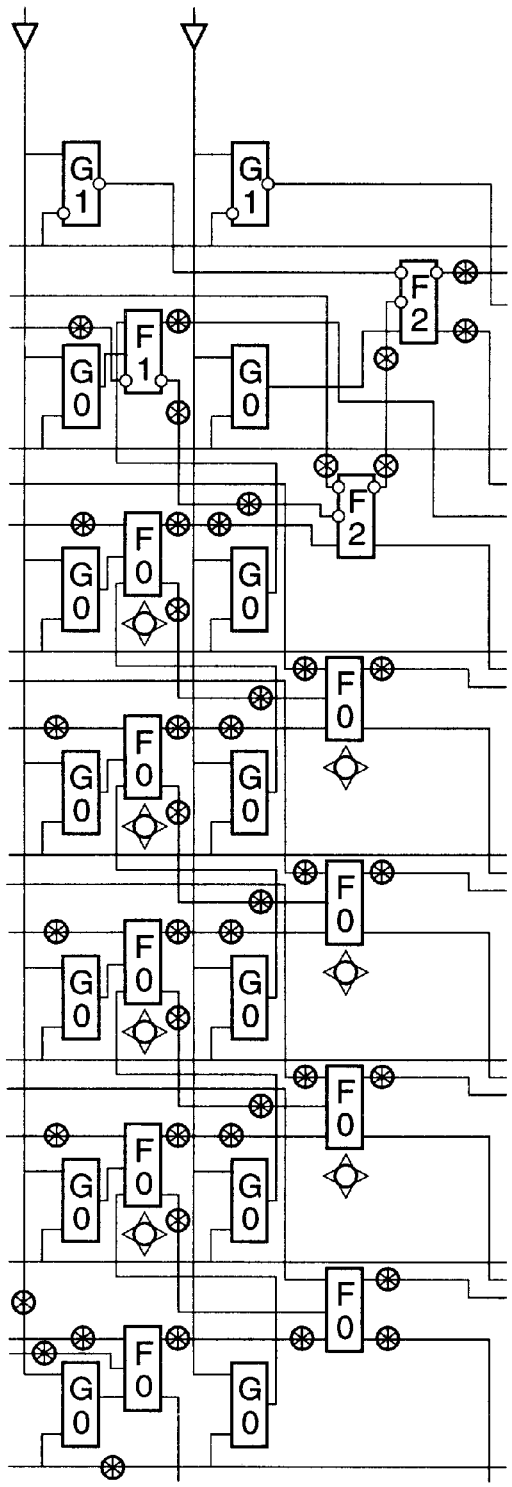
FIG. 20M is a topological schematic diagram of a group formed in accordance with the bitslice/timing diagram of FIG. 20K, but with a width of seven bits.

FIG. 20M is a topological schematic diagram of a group formed in accordance with the bitslice/timing diagram of FIG. 20K, but with a width of seven bits.

Figure 20N:
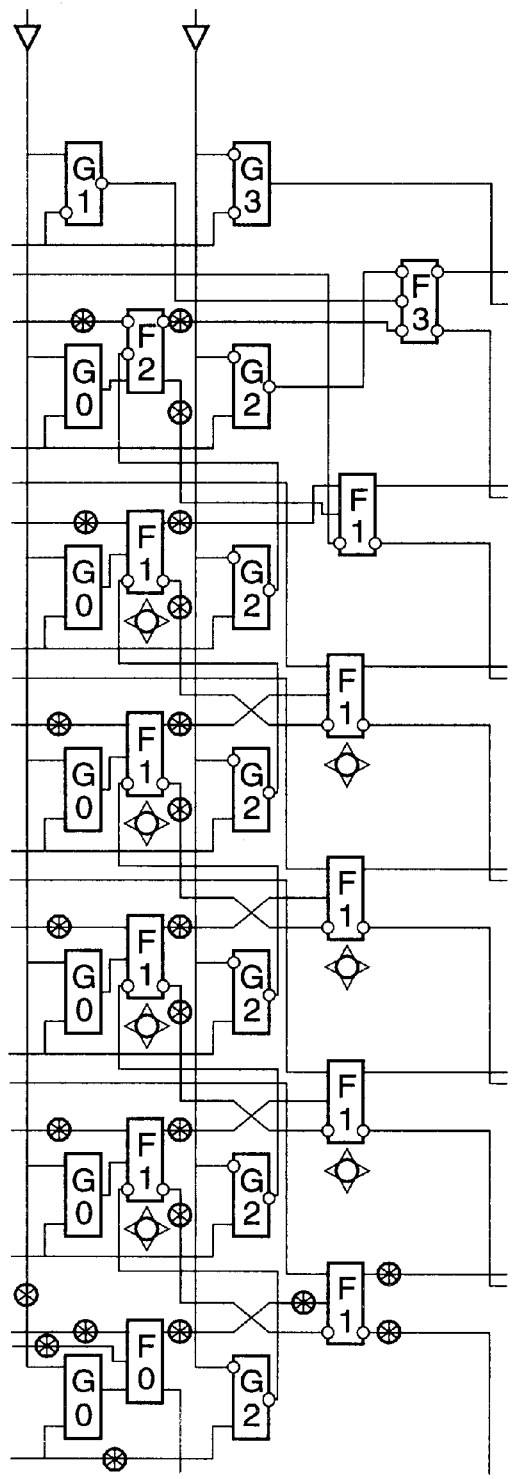
FIG. 20N is a topological schematic diagram of a group formed in accordance with the bitslice/timing diagram of FIG. 20L, but with a width of seven bits.

FIG. 20N is a topological schematic diagram of a group formed in accordance with the bitslice/timing diagram of FIG. 20L, but with a width of seven bits.

FIG. 21A is a bitslice/timing diagram of a prior art equivalent type "E-BASIC/U" group having a width of five bits and formed as part of an unsigned multiplier array. This is a three-column group as taken from FIG. 1.

FIG. 21B is a bitslice/timing diagram of a prior art equivalent type "E-BASIC$_i$/S" group having a width of five bits and formed as part of a two's complement signed multiplier array. This is a three-column internal group as taken from FIG. 2.

FIG. 21C is a bitslice/timing diagram of a prior art equivalent type "E-BASIC$_f$/S" group having a width of five bits and formed as part of a two's complement signed multiplier array. This is a three-column right group as taken from FIG. 2.

FIG. 21D is a bitslice/timing diagram of a type "E0/U" group having a width of five bits and formed as part of an unsigned multiplier array in accordance with a preferred embodiment of the present invention. Type "E0/U" is a three column group which can be used to replace any three columns (excluding the left-most column) in FIG. 1. Type F and Fc adders are used.

FIG. 21E is a bitslice/timing diagram of a type "E0i/S" group having a width of six bits and formed as part of a two's complement signed multiplier array in accordance with a preferred embodiment of the present invention. "E0i/S" is a three column group which can be used to replace any three columns (excluding the left-most and right-most columns) in FIG. 2. Type F and Fc adders are used.

FIG. 21F is a bitslice/timing diagram of a type "E0f/S" group having a width of six bits and formed as part of a two's complement signed multiplier array in accordance with a preferred embodiment of the present invention. "E0f/S" is a three column group which can be used to replace the right-most three columns in FIG. 2. Type F and Fc adders are used.

FIG. 21G is a topological schematic diagram of a group formed in accordance with the bitslice/timing diagram of FIG. 21E, but with a width of seven bits.

FIG. 21H is a topological schematic diagram of a group formed in accordance with the bitslice/timing diagram of FIG. 21F, but with a width of seven bits.

FIG. 21I is a bitslicel timing diagram of a type "E1i/U" group having a width of six bits and formed as part of an unsigned multiplier array in accordance with a preferred embodiment of the present invention. Group "E1i/U" is a three column group for internal array use which provides staggered outputs with and $Y_0$ coming after the balance of the outputs. Type F and Fc adders ar e used.

FIG. 21J is a bitslice/timing diagram of a type "E1f/U" group having a width of six bits and formed as part of an unsigned multiplier array in accordance with a preferred embodiment of the present invention. Group "E1f/U" is adapted to work with an adjacent group "E1i/U". Type F, Fc and Fy adders are used.

FIG. 21K is a bitslice/timing diagram of a type "E1i/S" group having a width of seven bits and formed as part of a two's complement signed multiplier array in accordance with a preferred embodiment of the present invention. This group is the signed version of "E1i/U". It uses type F, Fc and Fx adders.

FIG. 21L is a bitslice/timing diagram of a type "E1f/S" group having a width of seven bits and formed as part of a two's complement signed multiplier array in accordance with a preferred embodiment of the present invention. This group is the signed version of "E1f/U". It uses type F, Fc, Fx and Fy adders.

FIG. 21M is a topological schematic diagram of a group formed in accordance with the bitslice/timing diagram of FIG. 21K, but with a width of eight bits.

Figure 21N:
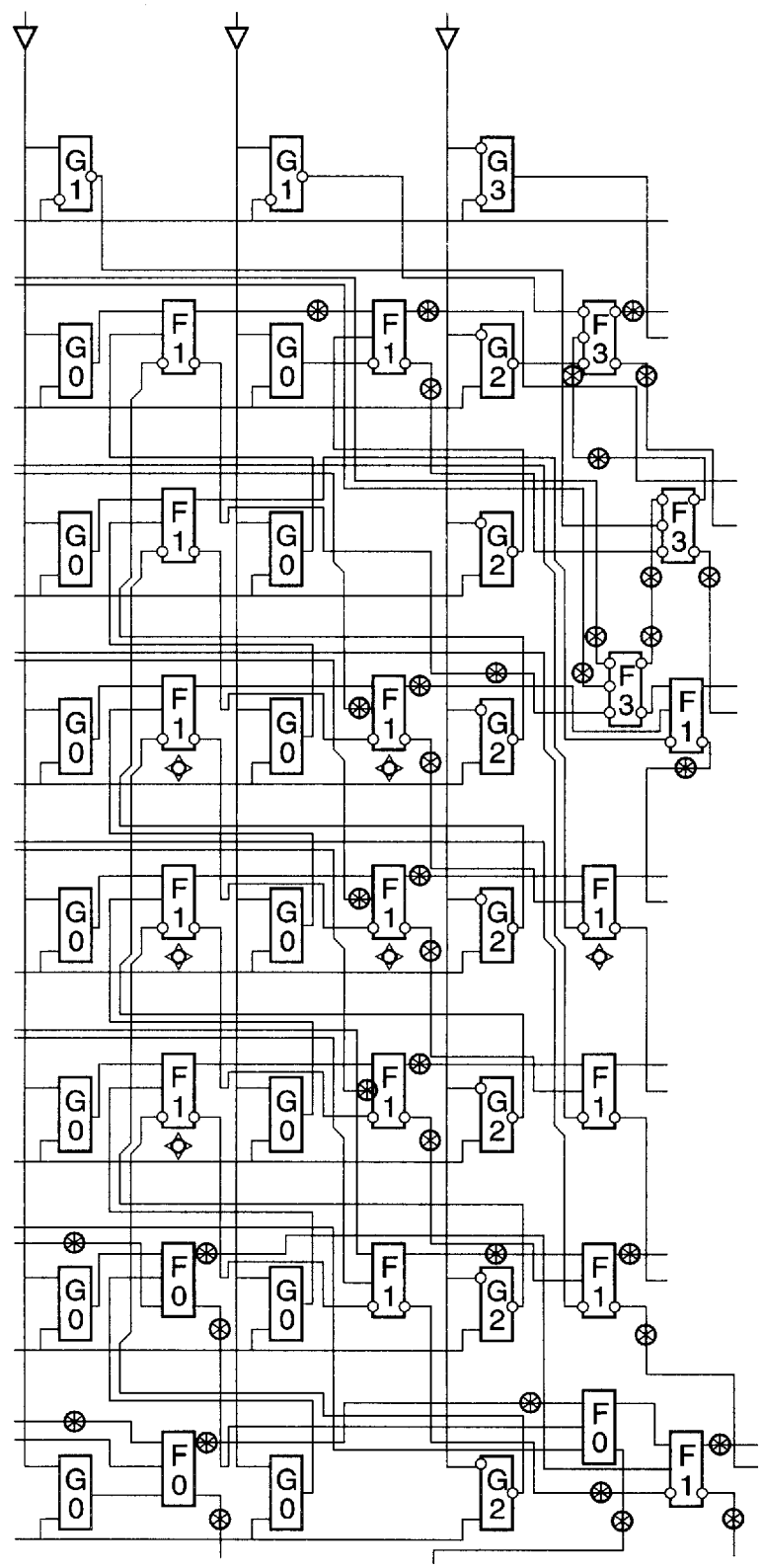
FIG. 21N is a topological schematic diagram of a group formed in accordance with the bitslice/timing diagram of FIG. 21L, but with a width of eight bits.
Figure 21O:
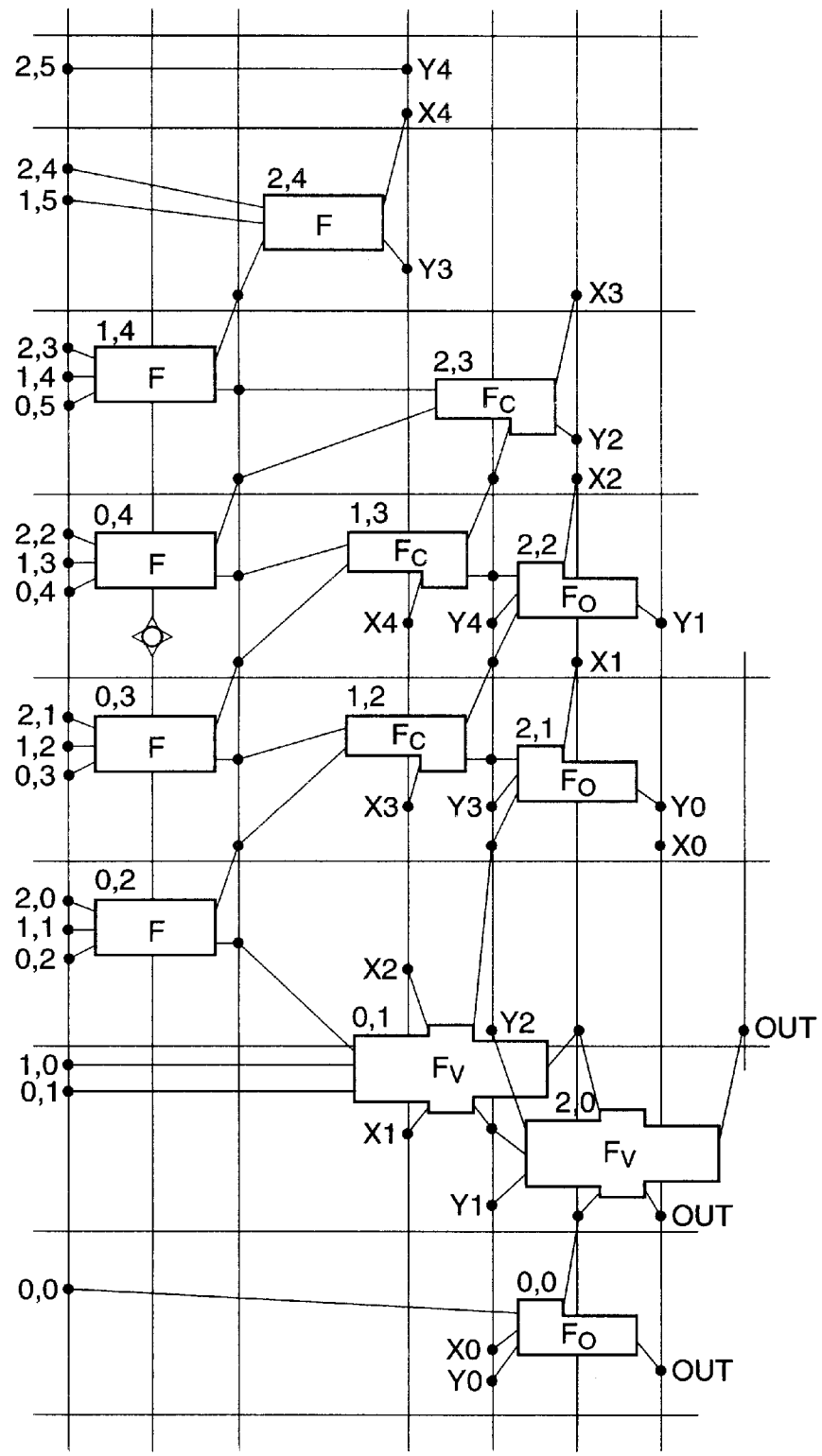
FIG. 21-O is a bitslice/timing diagram of a type "E2i/U" group having a width of six bits and formed as part of an unsigned multiplier array in accordance with a preferred embodiment of the present invention.
FIG. 21P is a bitslice/timing diagram of a type "E2f/U" group having a width of six bits and formed as part of an unsigned multiplier array in accordance with a preferred embodiment of the present invention.
FIG. 21Q is a bitslice/timing diagram of a type "E2i/S" group having a width of seven bits and formed as part of a two's complement signed multiplier array in accordance with a preferred embodiment of the present invention.
FIG. 21R is a bitslice/timing diagram of a type "E2f/S" group having a width of seven bits and formed as part of a two's complement signed multiplier array in accordance with a preferred embodiment of the present invention.
FIG. 21S is a topological schematic diagram of a group formed in accordance with the bitslice/timing diagram of FIG. 21Q, but with a width of eight bits.
FIG. 21T is a topological schematic diagram of a group formed in accordance with the bitslice/timing diagram of FIG. 21R, but with a width of eight bits.

FIG. 21N is a topological schematic diagram of a group formed in accordance with the bitslice/timing diagram of FIG. 21L, but with a width of eight bits.

FIG. 21-O is a bitslice/timing diagram of a type "E2i/U" group having a width of six bits and formed as part of an unsigned multiplier array in accordance with a preferred embodiment of the present invention. Note the staggering of the outputs of the group. Type F, Fc, Fo and Fv adders are used.

Figure 21P:
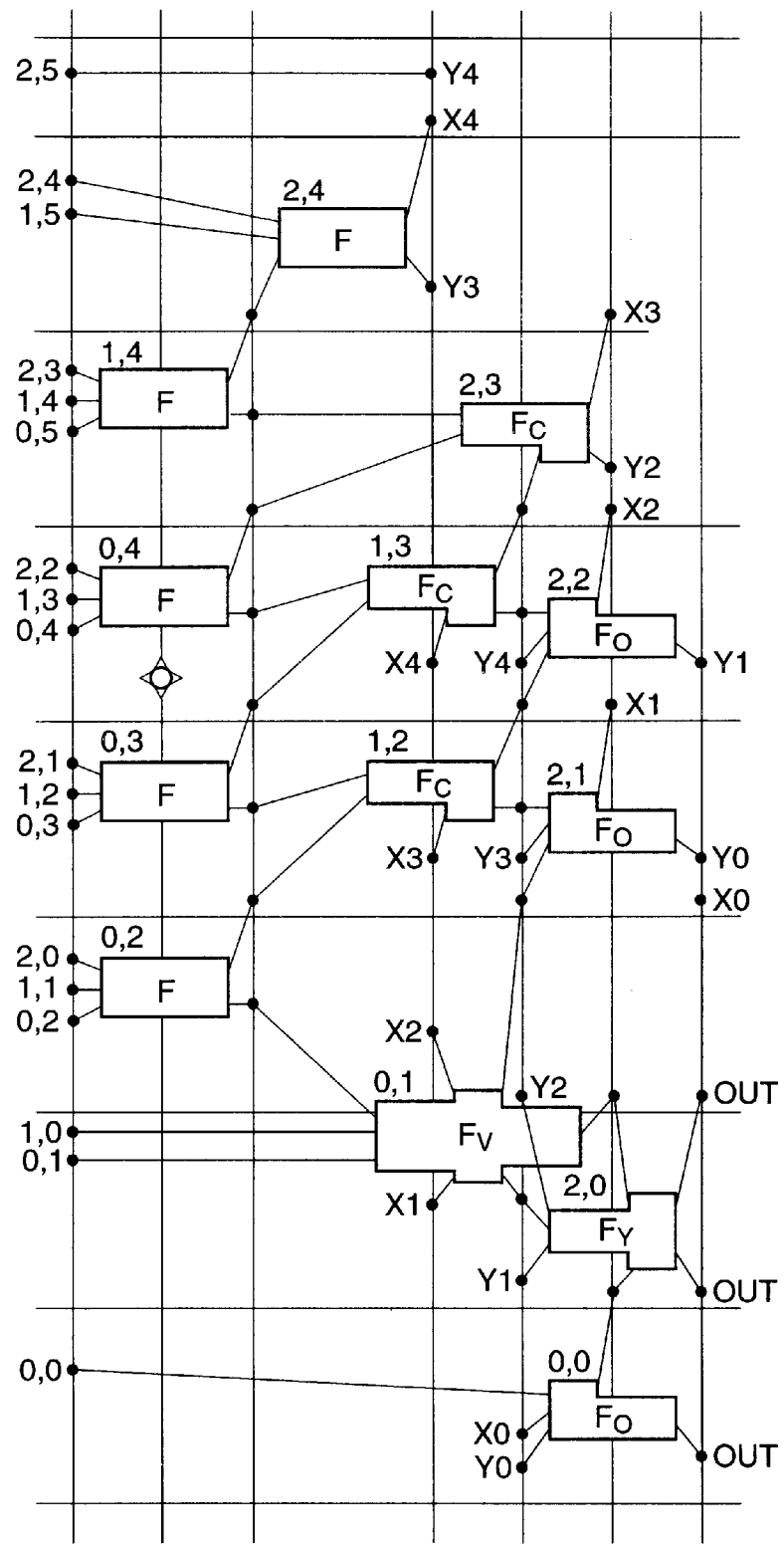

FIG. 21P is a bitslice/timing diagram of a type "E2f/U" group having a width of six bits and formed as part of an unsigned multiplier array in accordance with a preferred embodiment of the present invention. This group mates with an adjacent "E2i/U" group to form a right group. Type F, Fc, Fo, Fv and Fy adders are used.

Figure 21Q:
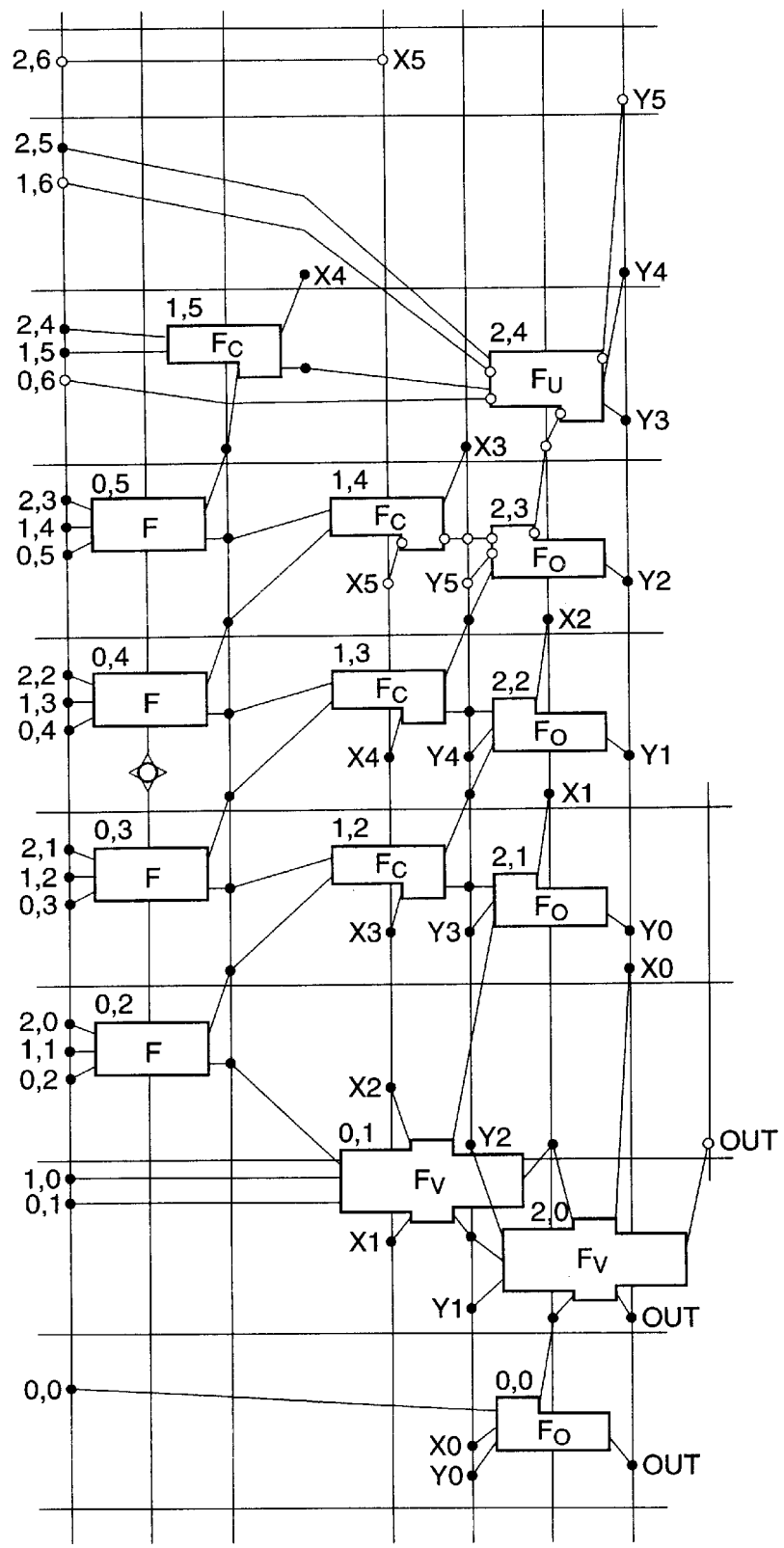

FIG. 21Q is a bitslice/timing diagram of a type "E2i/S" group having a width of seven bits and formed as part of a two's complement signed multiplier array in accordance with a preferred embodiment of the present invention. Note the staggering of the outputs of the group. Type F, Fc, Fo, Fu and Fv adders are used.

Figure 21R:
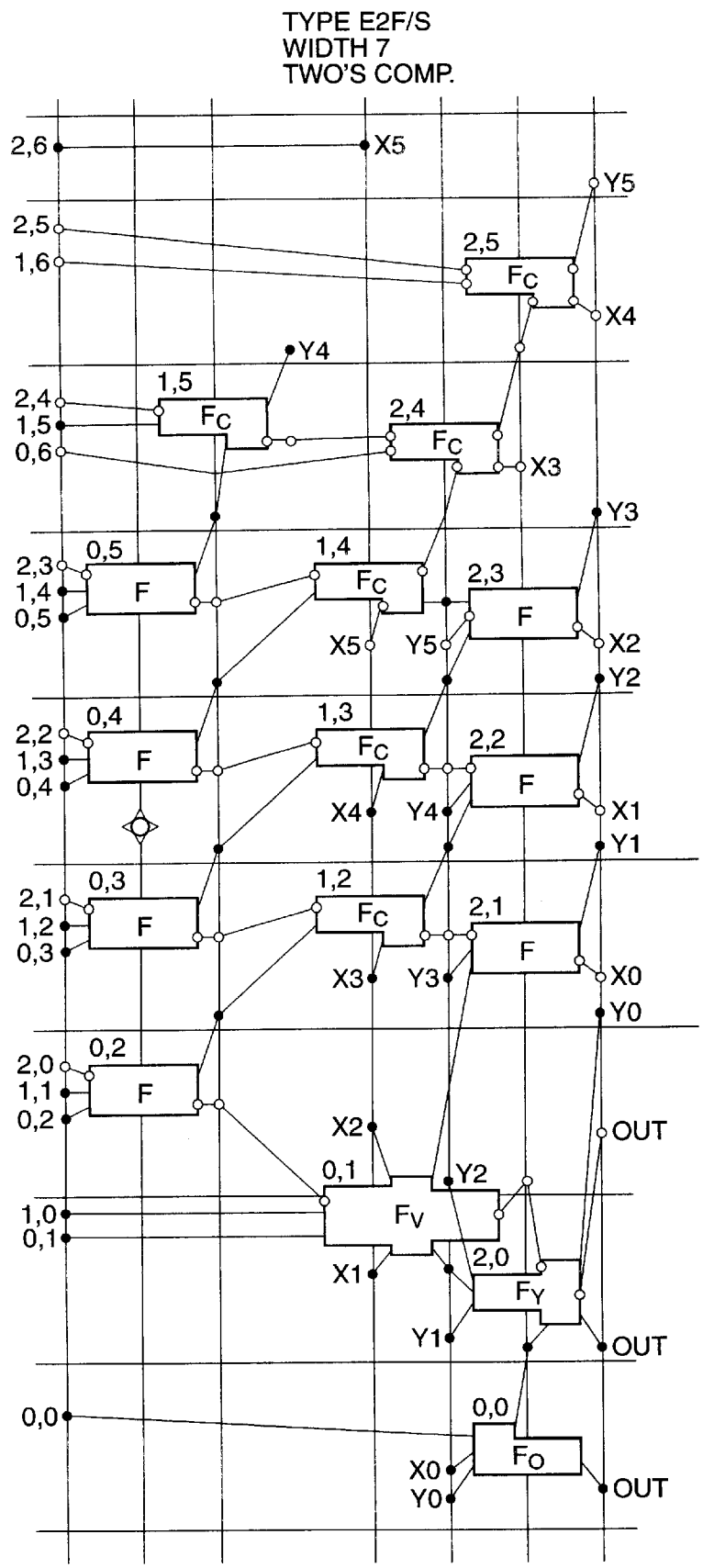

FIG. 21R is a bitslice/timing diagram of a type "E2f/S" group having a width of seven bits and formed as part of a two's complement signed multiplier array in accordance with a preferred embodiment of the present invention. This group mates with an adjacent "E2i/S" group to form a right group. Type F, Fc, Fo, Fv and Fy adders are used.

Figure 21S:
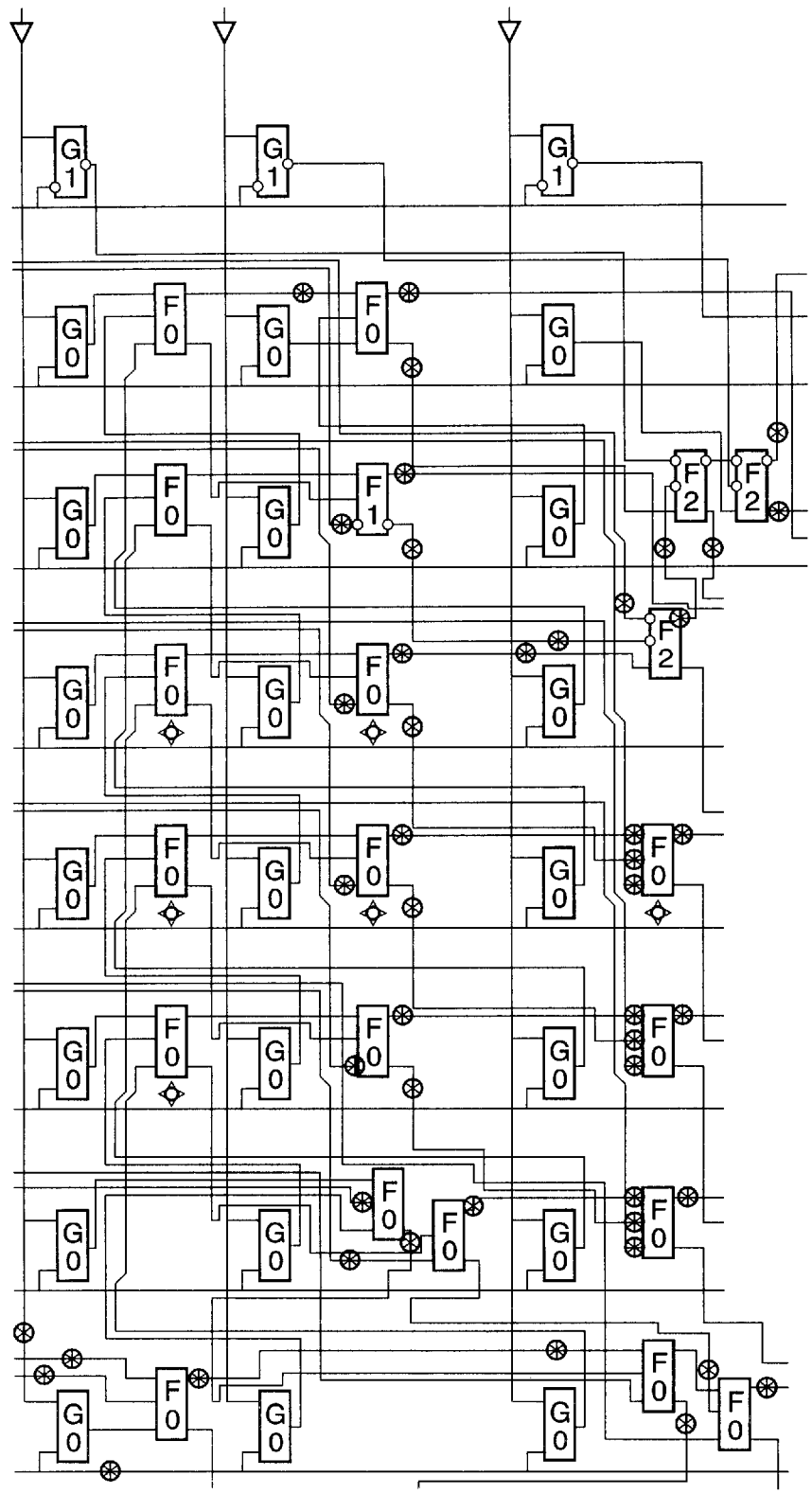

FIG. 21S is a topological schematic diagram of a group formed in accordance with the bitslice/timing diagram of FIG. 21Q, but with a width of eight bits.

Figure 21T:
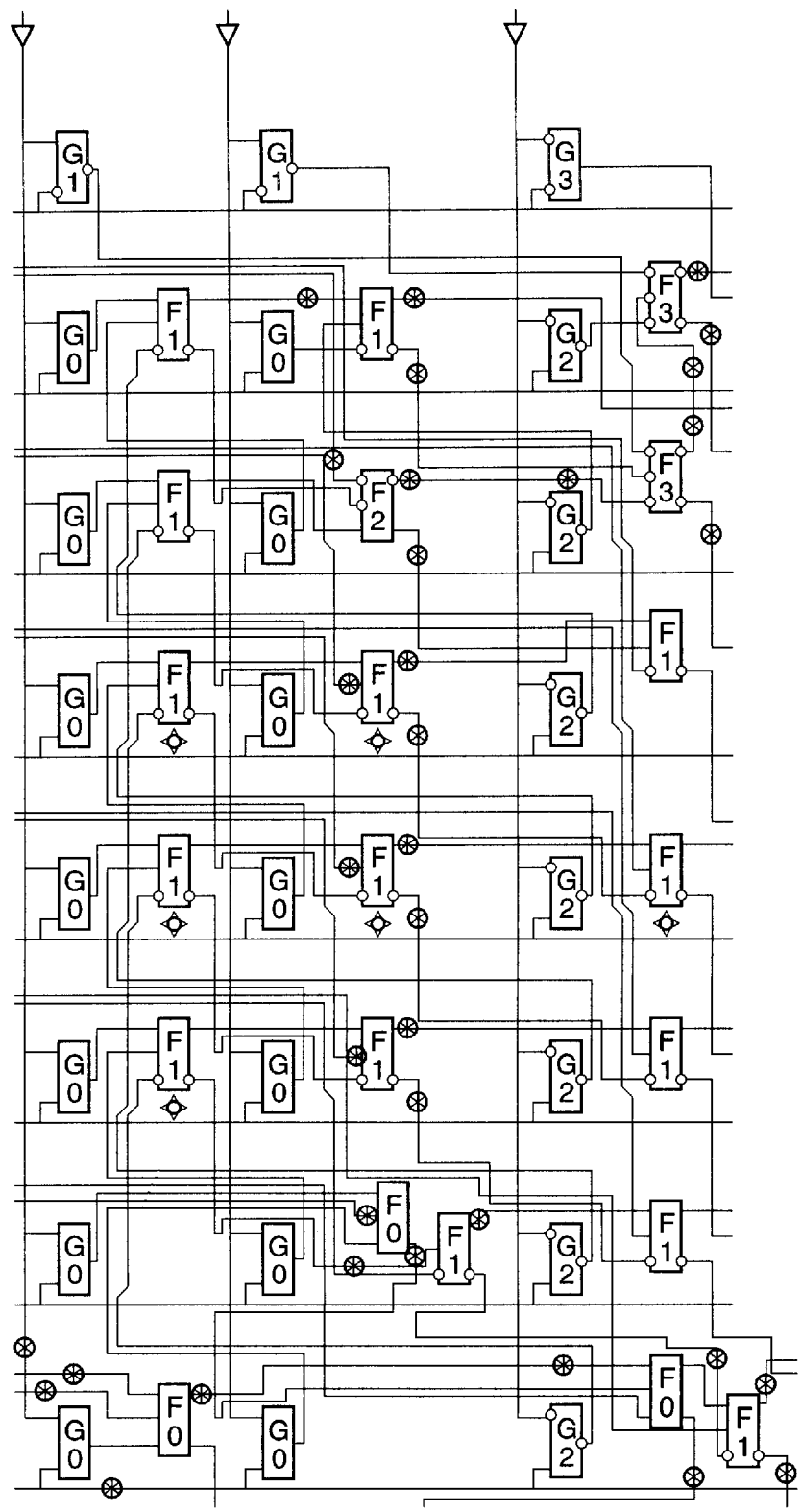

FIG. 21T is a topological schematic diagram of a group formed in accordance with the bitslice/timing diagram of FIG. 21R, but with a width of eight bits.

Figure 22A:
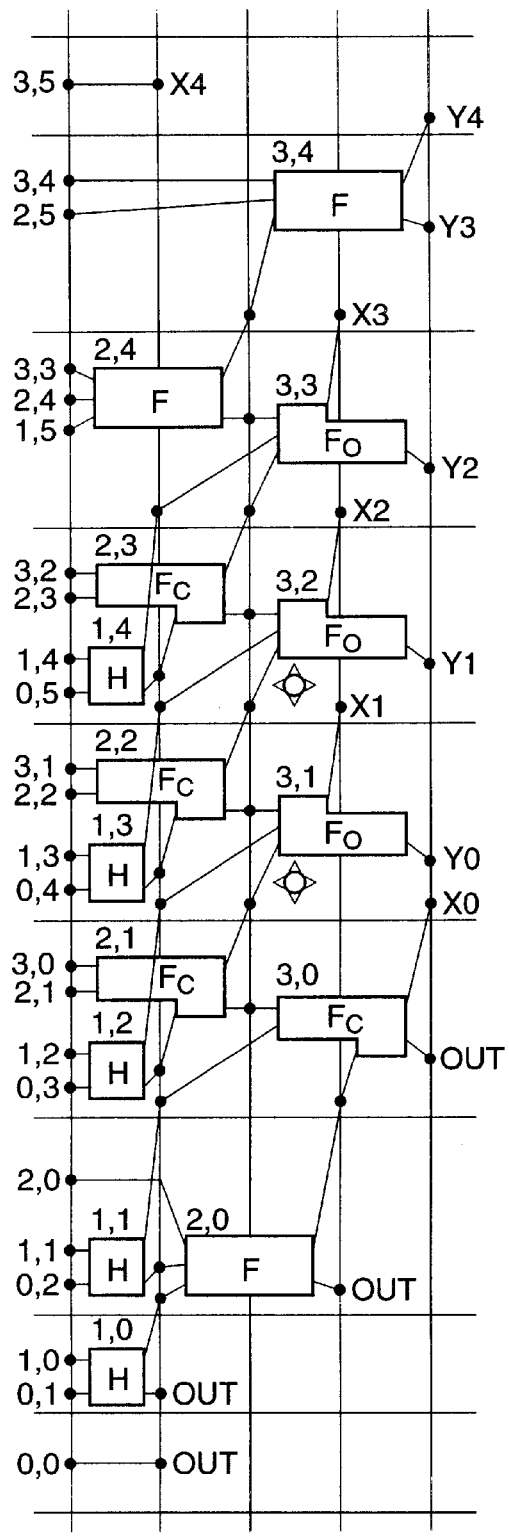
FIG. 22A is a bitslice/timing diagram of a type "G2/U" group having a width of six bits and formed as part of an unsigned multiplier array in accordance with a preferred embodiment of the present invention.

FIG. 22A is a bitslice/timing diagram of a type "G2/U" group having a width of six bits and formed as part of an unsigned multiplier array in accordance with a preferred embodiment of the present invention. Group "G2/U" is a triple column for left side use. Note the staggering of the outputs. Type F, Fc, Fo and H adders are used.

Figure 22B:
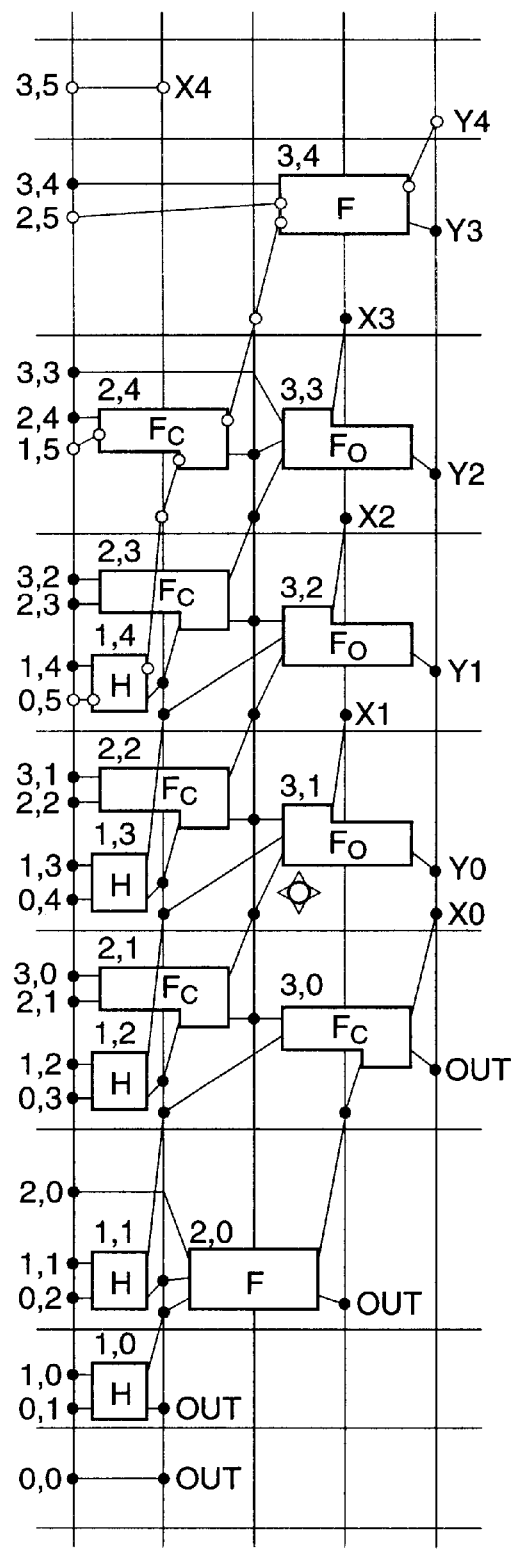
FIG. 22B is a bitslice/timing diagram of a type "G2/S" group having a width of six bits and formed as part of a two's complement signed multiplier array in accordance with a preferred embodiment of the present invention.

FIG. 22B is a bitslice/timing diagram of a type "G2/S" group having a width of six bits and formed as part of a two's complement signed multiplier array in accordance with a preferred embodiment of the present invention. Group "G2/S" is a triple column for left side use. Note the staggering of the outputs. Type F, Fc, Fo and H adders are used.

Figure 22C:
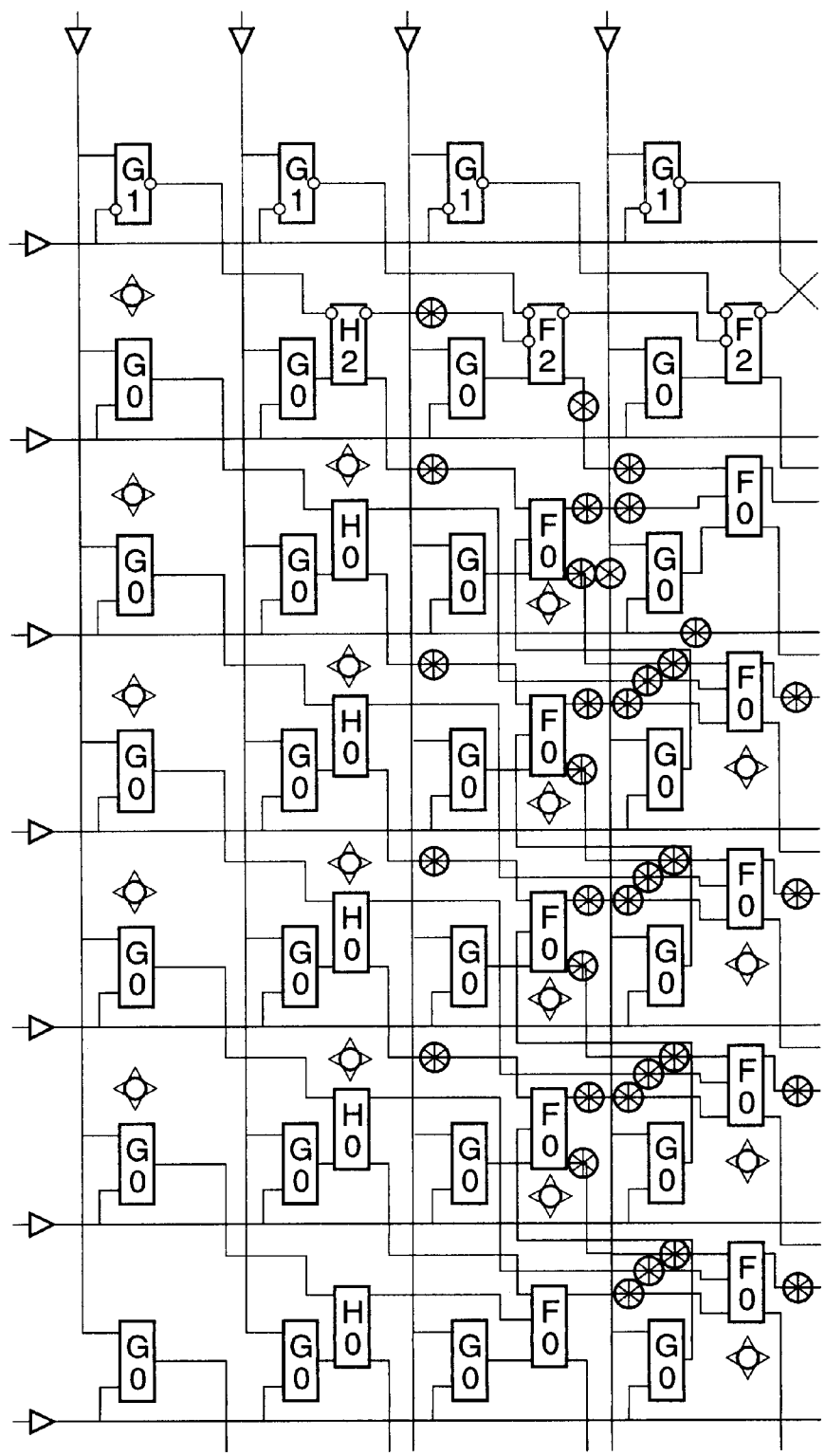
FIG. 22C is a topological schematic diagram of a group formed in accordance with the bitslice/timing diagram of FIG. 22B, but with a width of seven bits.

FIG. 22C is a topological schematic diagram of a group formed in accordance with the bitslice/timing diagram of FIG. 22B, but with a width of seven bits.

Figure 23A:
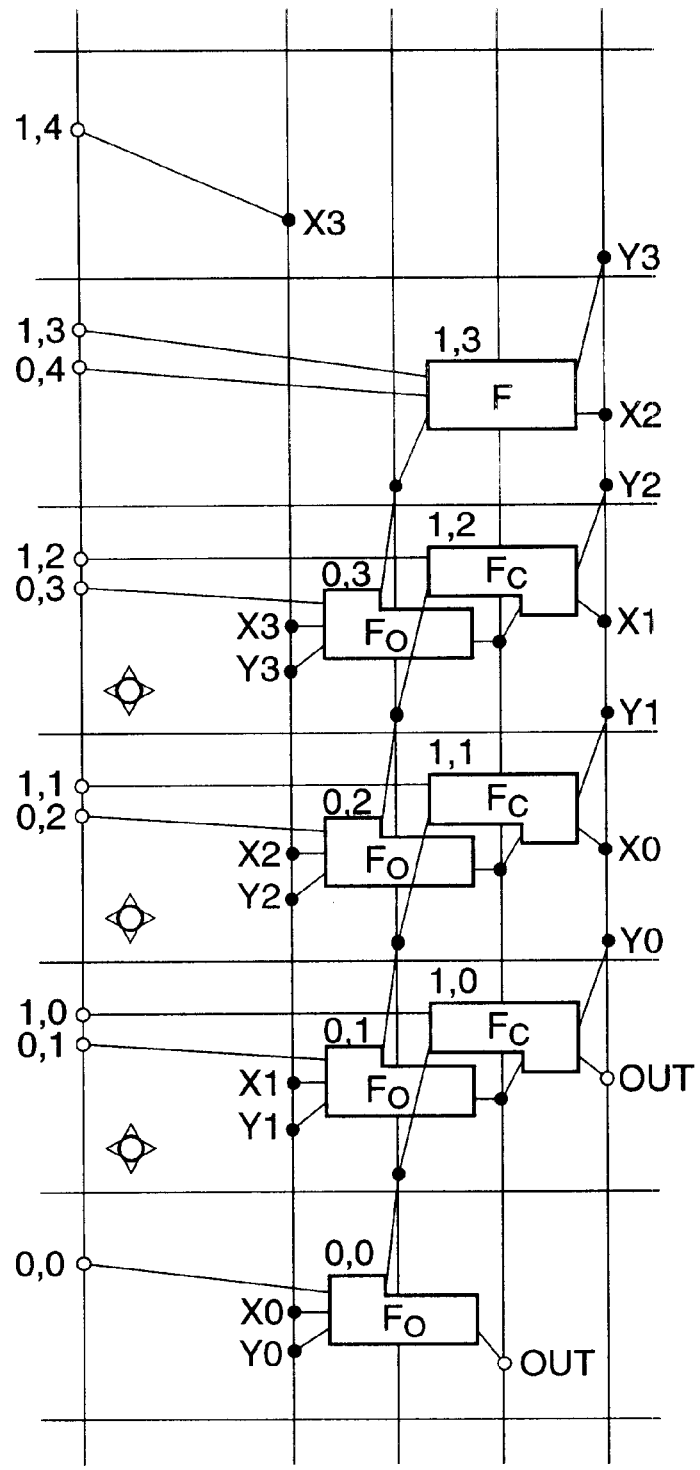
FIG. 23A is a bitslice/timing diagram of a type "H/U" group having a width of five bits and formed as part of an unsigned multiplier array in accordance with a preferred embodiment of the present invention.

FIG. 23A is a bitslice/timing diagram of a type "H/U" group having a width of five bits and formed as part of an unsigned multiplier array in accordance with a preferred embodiment of the present invention.

Figure 23B:
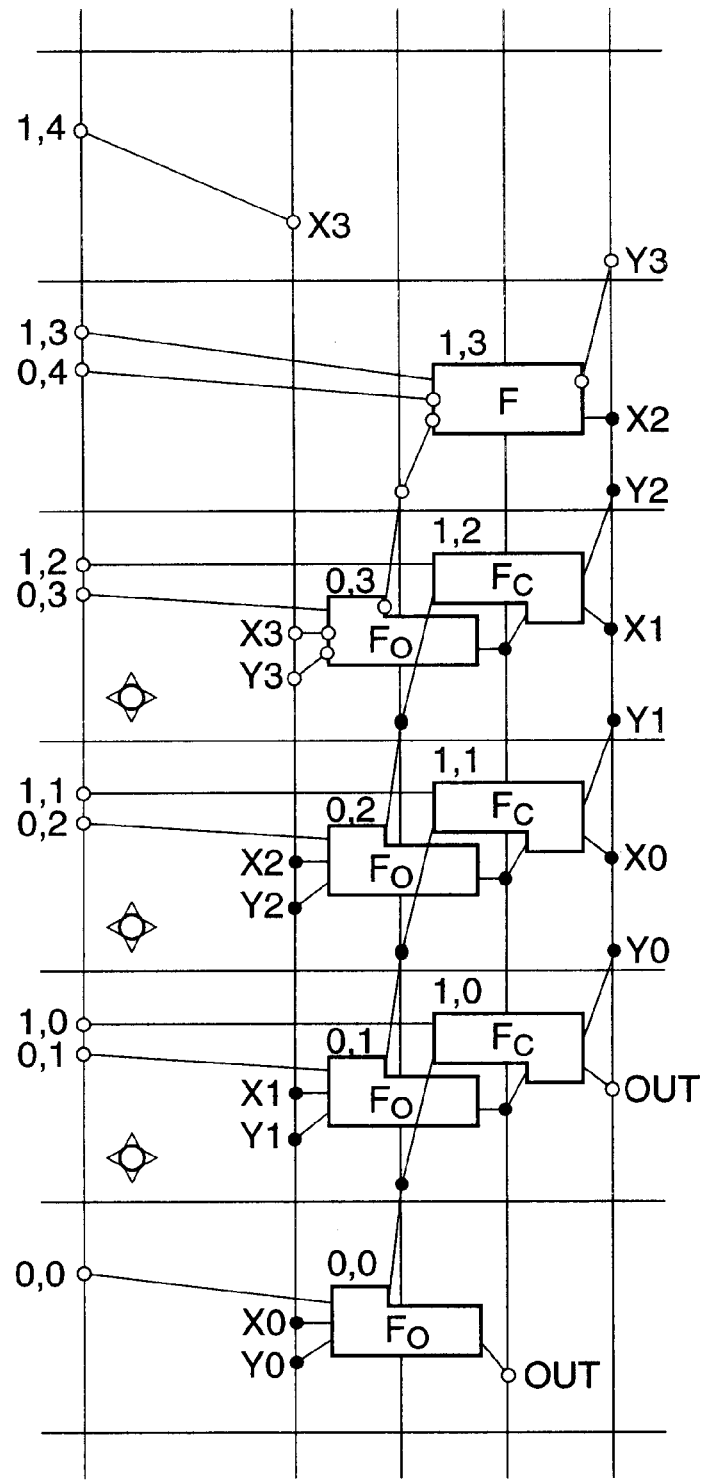
FIG. 23B is a bitslice/timing diagram of a type "Hi/S" group having a width of five bits and formed as part of a two's complement signed multiplier array in accordance with a preferred embodiment of the present invention.

FIG. 23B is a bitslice/timing diagram of a type "Hi/S" group having a width of five bits and formed as part of a two's complement signed multiplier array in accordance with a preferred embodiment of the present invention.

Figure 23C:
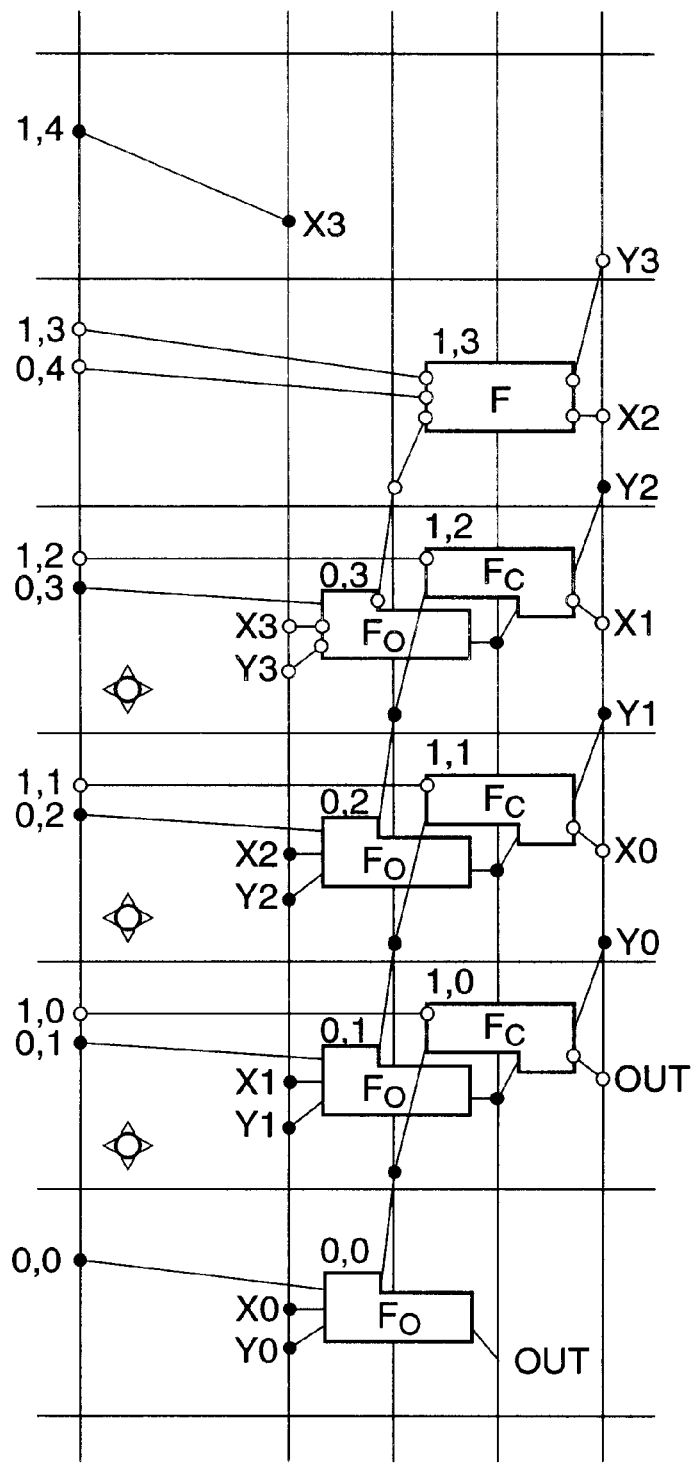
FIG. 23C is a bitslice/timing diagram of a type "Hf/S" group having a width of five bits and formed as part of a two's complement signed multiplier array in accordance with a preferred embodiment of the present invention.

FIG. 23C is a bitslice/timing diagram of a type "Hf/S" group having a width of five bits and formed as part of a two's complement signed multiplier array in accordance with a preferred embodiment of the present invention. Group "Hf/S" is a double column for right side use and used type F, Fc and Fo adders.

Figure 23D:
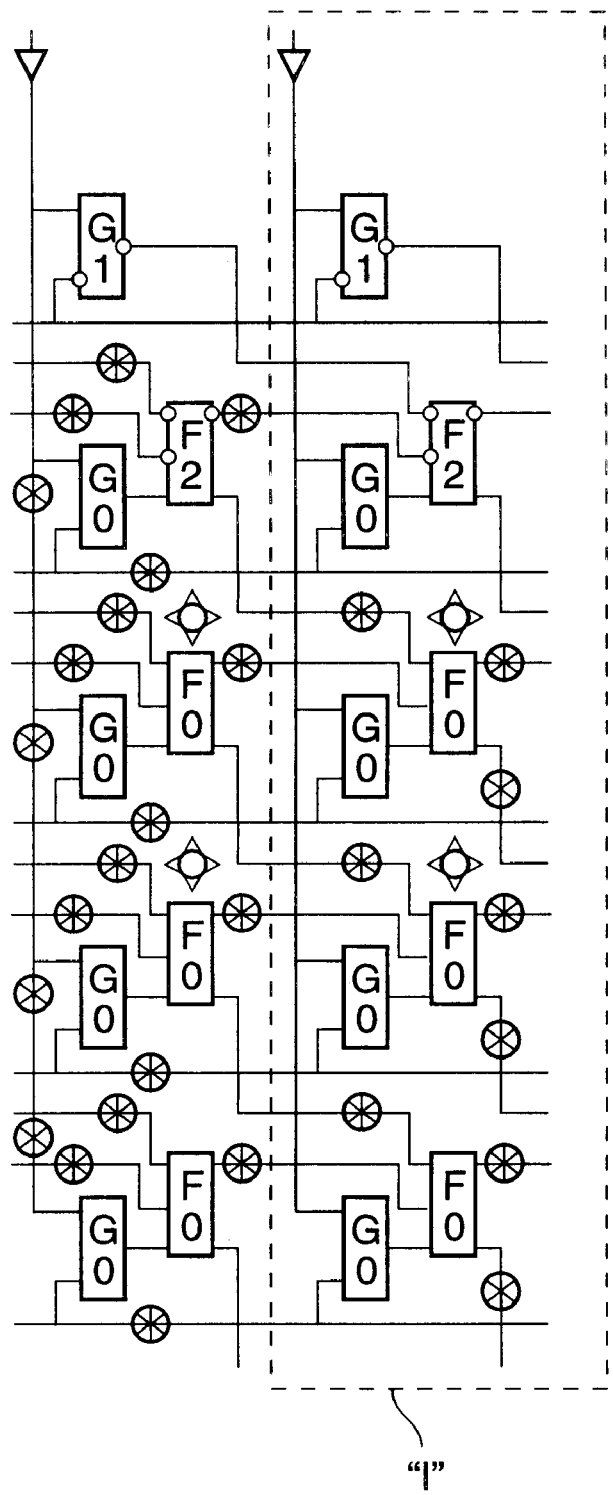
FIG. 23D is a topological schematic diagram of a type "Hi/S" group having a width of five bits and formed as part of a two's complement signed multiplier array in accordance with a preferred embodiment of the present invention and with the bitslice/timing diagram of FIG. 23B.

FIG. 23D is a topological schematic diagram of a type "Hi/S" group having a width of five bits and formed as part of a two's complement signed multiplier array in accordance with a preferred embodiment of the present invention and with the bitslice/timing diagram of FIG. 23B. Group "Hi/S" is a double column for internal array use and uses type F, Fc and Fo adders.

Figure 23E:
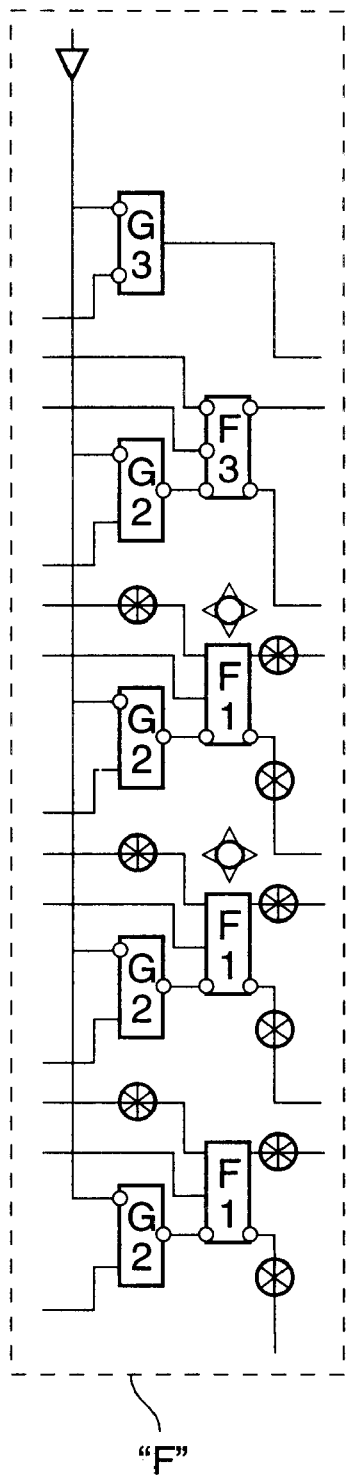
FIG. 23E is a topological schematic diagram of a type "Hf2c/S" group having a width of five bits and formed as part of a two's complement signed multiplier array in accordance with a preferred embodiment of the present invention. Substitution of box "F" of FIG. 23E with box "I" of FIG. 23D results in a type "Hf/S", Width 5, two's complement group in accordance with the bitslice/timing diagram of FIG. 23C.

FIG. 23E is a topological schematic diagram of a type "Hf2c/S" group having a width of five bits and formed as part of a two's complement signed multiplier array in accordance with a preferred embodiment of the present invention. Substitution of box "F" of FIG. 23E with box "I" of FIG. 23D results in a type "Hf/S", Width 5, two's complement group in accordance with the bitslice/timing diagram of FIG. 23C.

A PRESENTLY PREFERRED APPROACH TO GROUP SELECTION

Turning now to FIG. 24A, a presently preferred approach to selection of groups for column substitution is diagrammed. The column denoted "mode" is an indicator of the relative complexity of the solution—a mode of 6 is much more complex and potentially faster than a mode of 0. A designer may wish to preview each possible solution and review timing and area used before selecting a particular solution for the problem at hand. Some older fabrication technologies will not readily support the more complex of the solutions.

Taking, for example, the simplest mode 0 solution, note that the groups are laid down from right to left, i.e, group Cf (one column wide) is selected, then a number of Ci groups (also one column wide) are laid down, decrementing a "columns to go" counter as each column is laid down, until finally only two columns remain and group A (one column wide) is laid down to complete the array. This approach simply implements a multiplier array according to FIG. 2.

In the mode 1 entry, group Hf (two columns wide) is laid down, then a number of Hi groups (each two columns wide) followed by a Ci group (one column wide) where an even number of columns is desired, or no Ci group where an odd number of columns is desired (note the two entries under mode 1). The balance of the table shows presently preferred group selections and order of implementation for the various combinations of the groups described previously.

While, in practice, the FIG. 24A method of array construction works well for signed (two's complement) arrays as well as unsigned arrays where the elements are identical and only the truth tables of the elements differ, FIG. 24B shows how the unsigned columns would be laid out using unsigned column group components (those ending in "/U"—the signed groups end in "/S").

ACTUAL GATE LEVEL IMPLEMENTATIONS OF SELECTED QUIKADDERS™

Figure 25A:
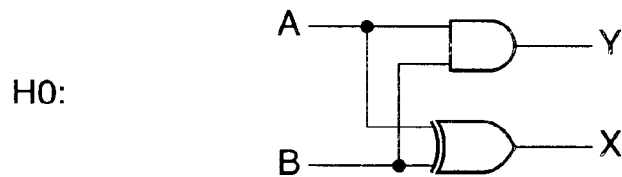
FIG. 25A is a gate level logic implementation of a type H0 half-adder in accordance with a presently preferred embodiment of the present invention.

The following diagrams in FIGS. 25A through 25-O are representative of gate level circuits which will implement the described devices. These do not represent the only way to implement these devices and are intended only as an aid to understanding the invention and not as a limitation to these specific gate-level implementations. The specific implementation used will differ based upon the macrocells available in the process used, the logic optimizer, if any, used, and individual design choices. The circuits shown and described, will, however, work for most purposes.

FIG. 25A is a gate level logic implementation of a type H0 half-adder in accordance with a presently preferred embodiment of the present invention.

Figure 25B:
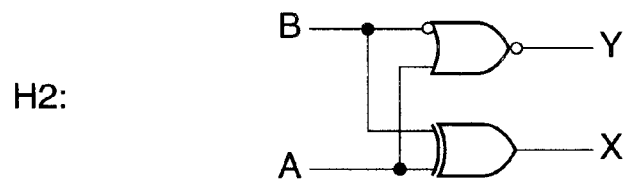
FIG. 25B is a gate level logic implementation of a type H2 half-adder in accordance with a presently preferred embodiment of the present invention.

FIG. 25B is a gate level logic implementation of a type H2 half-adder in accordance with a presently preferred embodiment of the present invention.

Figure 25C:
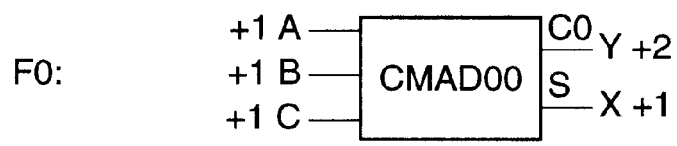
FIG. 25C is a gate level logic implementation of a type F0 conventional 3/2 full-adder in accordance with a presently preferred embodiment of the present invention.

FIG. 25C is a gate level logic implementation of a type F0 conventional 3/2 full-adder in accordance with a presently preferred embodiment of the present invention. The CMAD00 corresponds to the 2X-Drive Full Adder, a standard cell described in the Motorola Technical Data of the M5C Series Design Reference Guide, Motorola, 1994.

Figure 25D:
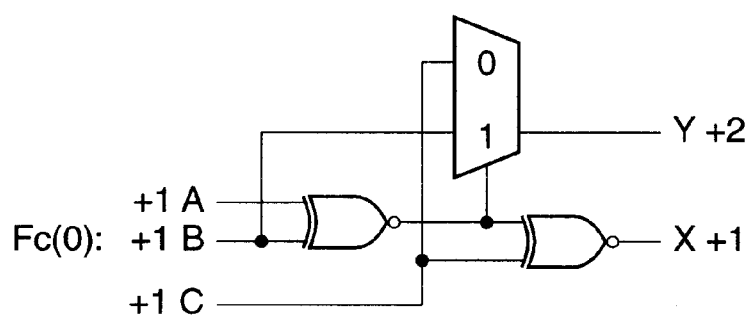
FIG. 25D is a gate level logic implementation of a type Fc(0) 3/2 full-adder in accordance with a presently preferred embodiment of the present invention.

FIG. 25D is a gate level logic implementation of a type Fc(0) 3/2 Quikadder™ in accordance with a presently preferred embodiment of the present invention.

Figure 25E:
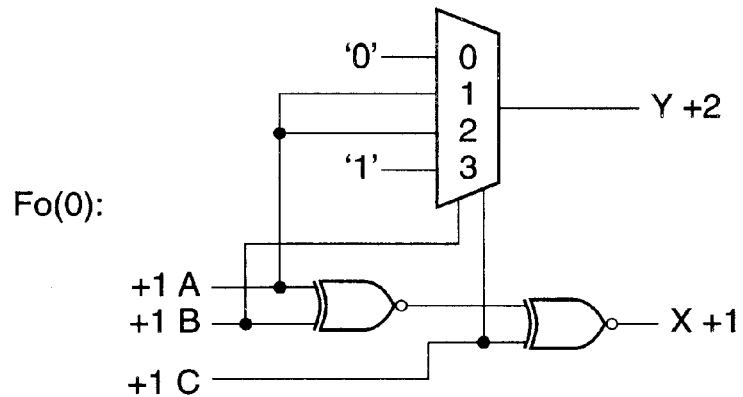
FIG. 25E is a gate level logic implementation of a type Fo(0) Quikadder™ in accordance with a presently preferred embodiment of the present invention.

FIG. 25E is a gate level logic implementation of a type Fo(0) Quikadder™ in accordance with a presently preferred embodiment of the present invention.

Figure 25F:
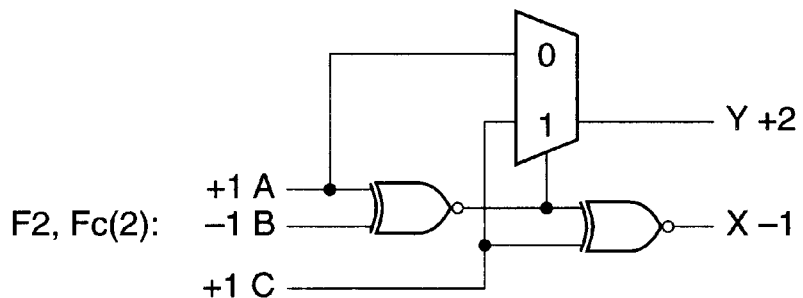
FIG. 25F is a gate level logic implementation of a type F2 conventional 3/2 full-adder and a type Fc(2) 3/2 Quikadder™ in accordance with a presently preferred embodiment of the present invention.

FIG. 25F is a gate level logic implementation of a type F2 conventional 3/2 full-adder and a type Fc(2) 3/2 Quikadder™ in accordance with a presently preferred embodiment of the present invention.

Figure 25G:
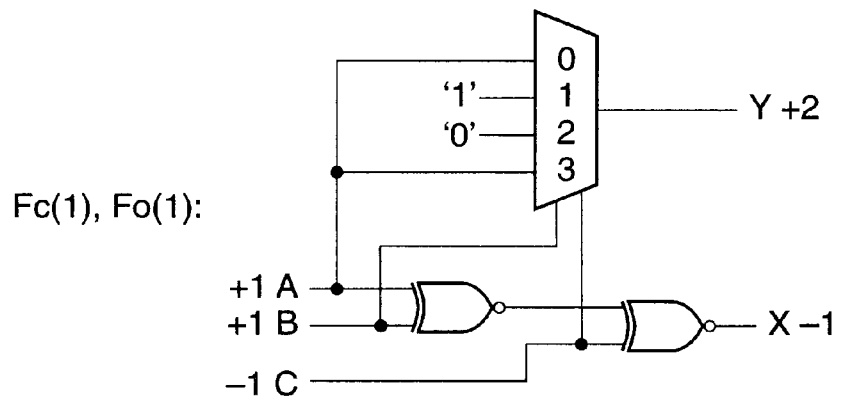
FIG. 25G is a gate level logic implementation of a type Fc(1) Quikadder™ and a type Fo(1) Quikadder™ in accordance with a presently preferred embodiment of the present invention.

FIG. 25G is a gate level logic implementation of a type Fc(1) Quikadder™ and a type Fo(1) Quikadder™ in accordance with a presently preferred embodiment of the present invention.

Figure 25H:
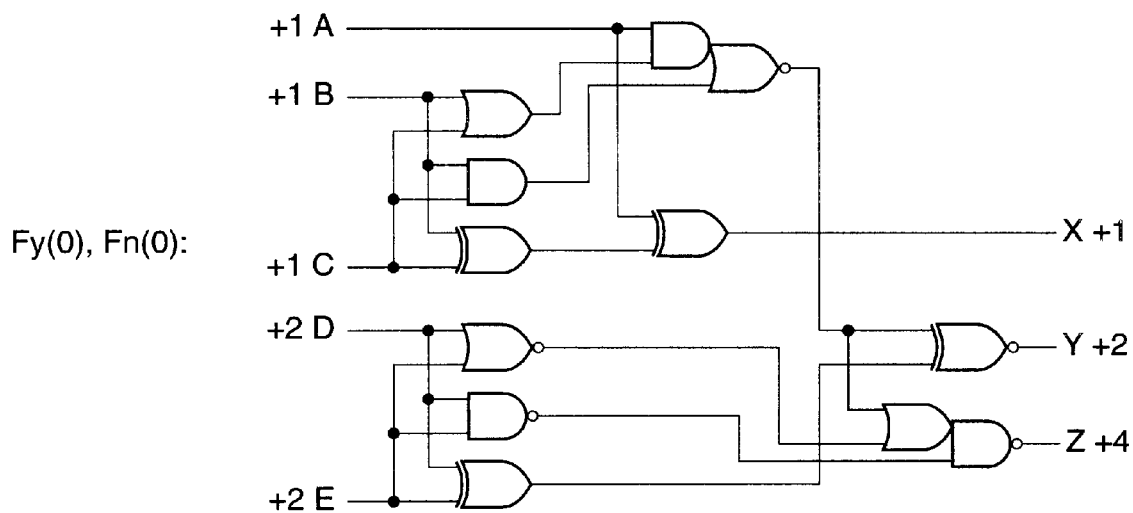
FIG. 25H is a gate level logic implementation of a type Fy(0) Quikadder™ and a type Fu(0) Quikadder™ in accordance with a presently preferred embodiment of the present invention.

FIG. 25H is a gate level logic implementation of a type Fy(0) Quikadder™ and a type Fu(0) Quikadder™ in accordance with a presently preferred embodiment of the present invention.

Figure 25I:
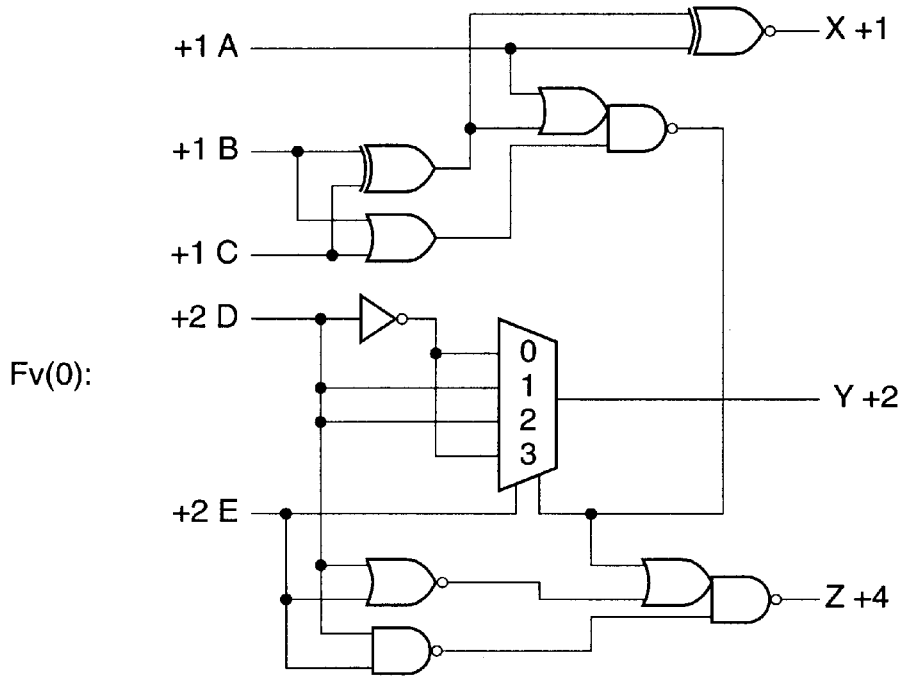
FIG. 25I is a gate level logic implementation of a type Fv(0) Quikadder™ in accordance with a presently preferred embodiment of the present invention.

FIG. 25I is a gate level logic implementation of a type Fv(0) Quikadder™ in accordance with a presently preferred embodiment of the present invention.

Figure 25J:
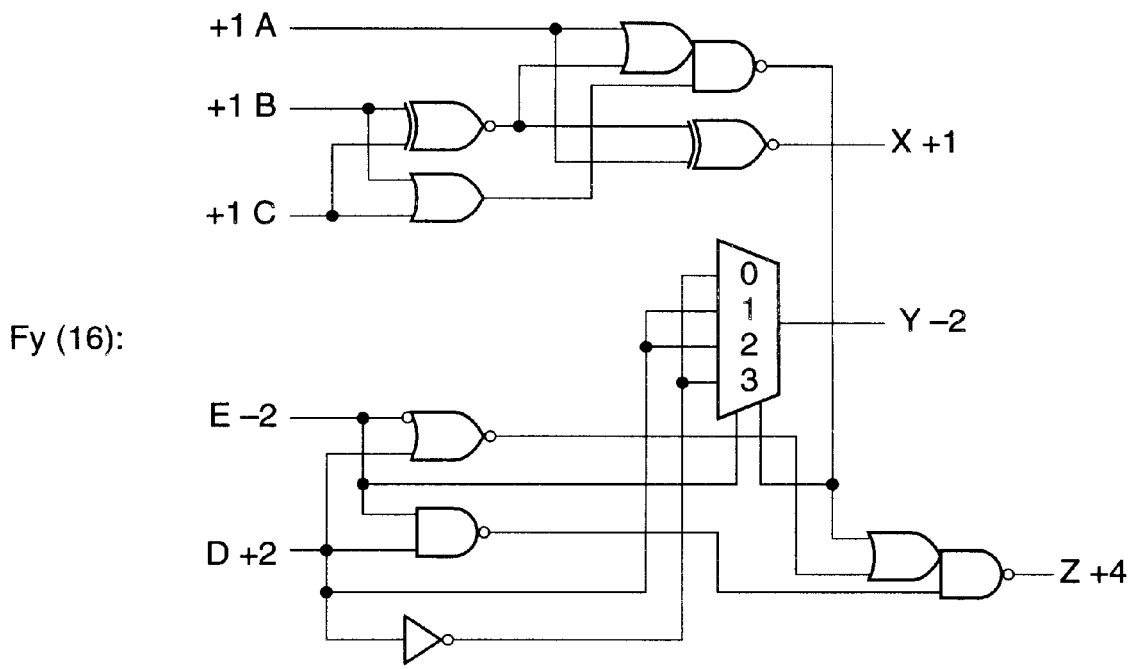
FIG. 25J is a gate level logic implementation of a type Fy(16) Quikadder™ in accordance with a presently preferred embodiment of the present invention.

FIG. 25J is a gate level logic implementation of a type Fy(16) Quikadder™ in accordance with a presently preferred embodiment of the present invention.

Figure 25K:
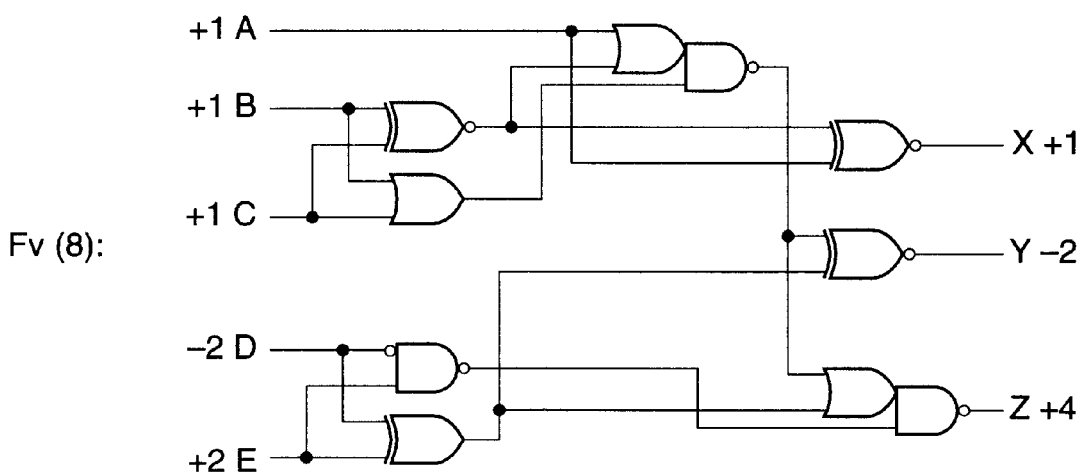
FIG. 25K is a gate level logic implementation of a type Fv(8) Quikadder™ in accordance with a presently preferred embodiment of the present invention.

FIG. 25K is a gate level logic implementation of a type Fv(8) Quikadder™ in accordance with a presently preferred embodiment of the present invention.

Figure 25L:
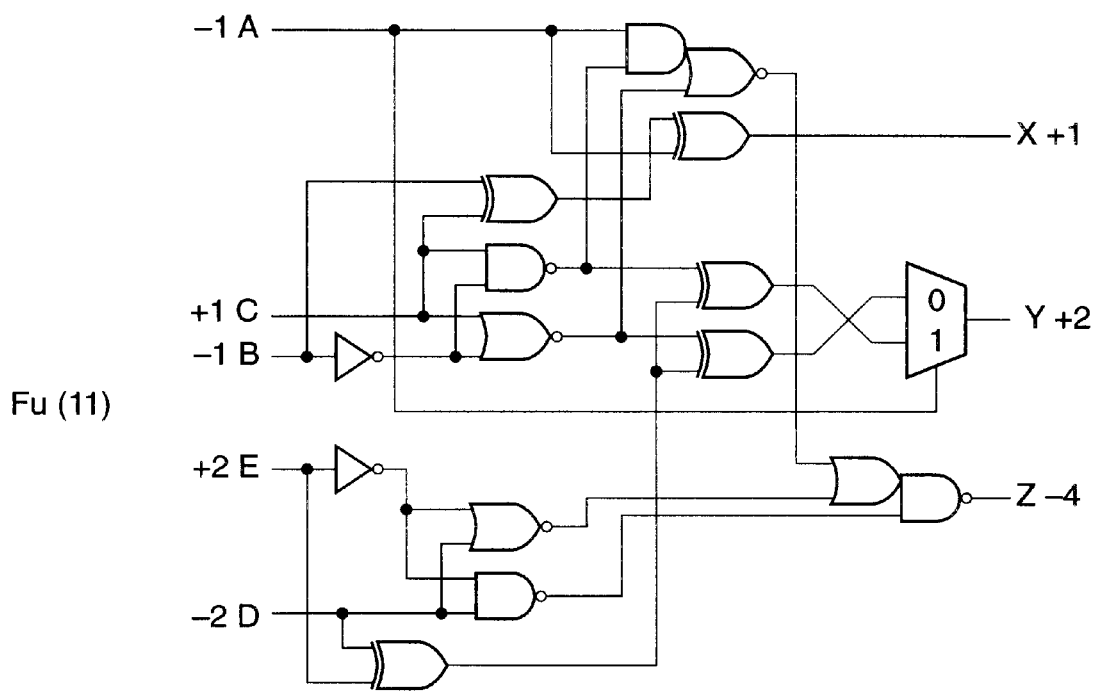
FIG. 25L is a gate level logic implementation of a type Fu(11) Quikadder™ in accordance with a presently preferred embodiment of the present invention.

FIG. 25L is a gate level logic implementation of a type Fu(11) Quikadder™ in accordance with a presently preferred embodiment of the present invention.

Figure 25M:
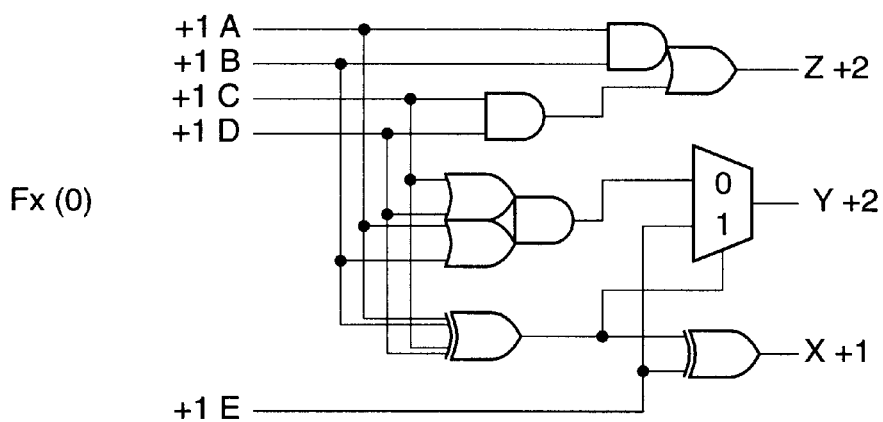
FIG. 25M is a gate level logic implementation of a type Fx(0) Quikadder™ in accordance with a presently preferred embodiment of the present invention.

FIG. 25M is a gate level logic implementation of a type Fx(0) Quikadder™ in accordance with a presently preferred embodiment of the present invention.

Figure 25N:
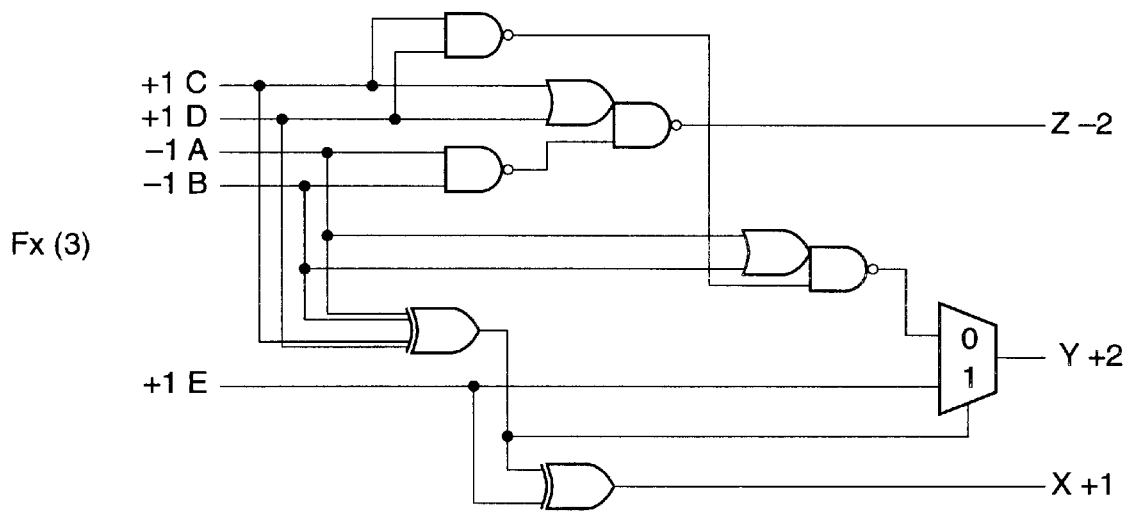
FIG. 25N is a gate level logic implementation of a type Fx(3) Quikadder™ in accordance with a presently preferred embodiment of the present invention.
Figure 25O:
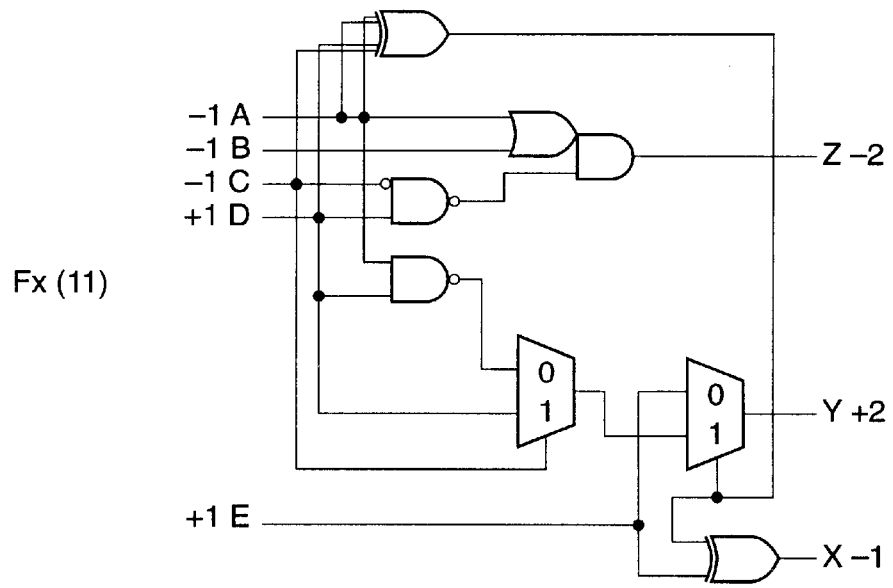
FIG. 25-O is a gate level logic implementation of a type Fx(11) Quikadder™ in accordance with a presently preferred embodiment of the present invention.

FIG. 25N is a gate level logic implementation of a type Fx(3) Quikadder™ in accordance with a presently preferred embodiment of the present invention.

FIG. 25-O is a gate level logic implementation of a type Fx(11) Quikadder™ in accordance with a presently preferred embodiment of the present invention.

DESIGN IMPLEMENTATION

In conventional practice, one will first use a logic optimizer to optimize the gate level logical structures for each tile for the process to be used. Such logic optimizers currently include: Viewlogic's Viewsynthesis, available from Viewlogic Systems, Inc. of Marlboro, Mass., the Synopsys® Design Compiler, available from Synopsys, Inc. of Mountain View, Calif., Autologic®, available from Mentor Graphics Corporation of Oregon, and the Berkeley MIS system available from the University of California at Berkeley, Calif.

The next step is to use a CAD tool to form the multiplier arrays using the optimized tiles and the design principals of FIGS. 24A and 24B (or another arrangement of column groups, if desired). Finally the placement and routing of the logic on silicon is accomplished in a conventional manner and the device is fabricated in a conventional manner.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of ordinary skill in the art after perusal of this application. For example, those of ordinary skill in the art will readily appreciate that the present invention may be implemented for non-square (i.e., M×N) multiplier arrays. The invention may also be used with substitute column groups greater than four columns in width where appropriate for the fabrication technology. The invention can be extended easily to two-layer rewiring which would work with groups that exceed eight columns in width, subject to routing length and fabrication limitations. The invention can also be used to improve the timing of the first few columns of the array. The invention can also be used to implement one's complement multipliers, sign-magnitude multipliers, and floating-point multipliers. The invention, therefore, is not to be limited except in the spirit of the appended claims.

What is claimed is:

1. A binary adder structure comprising:
   a first "A", second "B" and third "C" inputs, all received by a first time;

a first "S" and second "Y" outputs, said first output representing a sum of said first, second and third inputs, said second output representing a carry from the addition of said first, second and third inputs, said second output available by a second time, said first output available by a third time, said third time being later than said second time and said second time being later than said first time, wherein the delay from said first time to said second time is one gate delay and the delay from said second time to said third time is one gate delay; and wherein the relative weights and signs of the inputs and outputs are: A=+1, B=+1, C=+1, S=+1, Y=+2.

2. A binary adder structure comprising:

a first "A", second "B" and third "C" inputs, all received by a first time;

a first "S" and second "Y" outputs, said first output representing a sum of said first, second and third inputs, said second output representing a carry from the addition of said first, second and third inputs, said second output available by a second time, said first output available by a third time, said third time being later than said second time and said second time being later than said first time, wherein the delay from said first time to said second time is one gate delay and the delay from said second time to said third time is one gate delay; and wherein the relative weights and signs of the inputs and outputs are: A=+1, B=−1, C=−1, S=+1, Y=−2.

3. A binary adder structure comprising:

a first "A", second "B" and third "C" inputs, all received by a first time;

a first "S" and second "Y" outputs, said first output representing a sum of said first, second and third inputs, said second output representing a carry from the addition of said first, second and third inputs, said second output available by a second time, said first output available by a third time, said third time being later than said second time and said second time being later than said first time, wherein the delay from said first time to said second time is one gate delay and the delay from said second time to said third time is one gate delay; and wherein the relative weights and signs of the inputs and outputs are: A=−1, B=−1, C=+1, S=+1, Y=−2.

4. A binary adder structure comprising:

first "A", second "B" and third "C" inputs, said second and third inputs both to be received by a first time and said first input to be received by a second time;

first "S" and second "Y" outputs, said first output representing a sum of said first, second and third inputs, said second output representing a carry from the addition of said first, second and third inputs, said first and second outputs available by a third time, said third time being later than said second time and said second time being later than said first time.

5. A binary adder structure according to claim 4 wherein the delay from said first time to said second time is one gate delay and the delay from said second time to said third time is one gate delay.

6. A binary adder structure according to claim 4 wherein the relative weights and signs of the inputs and outputs are: A=+1, B=+1, C=−1, S=−1, Y=+2.

7. A binary adder structure according to claim 4 wherein the relative weights and signs of the inputs and outputs are: A=+1, B=−1, C=+1, S=−1, Y=+2.

8. A binary adder structure according to claim 4 wherein the relative weights and signs of the inputs and outputs are: A=−1, B=+1, C=+1, S=−1, Y=+2.

9. A binary adder structure according to claim 4 wherein the relative weights and signs of the inputs and outputs are: A=−1, B=+1, C=−1, S=+1, Y=−2.

10. A binary adder structure according to claim 4 wherein the relative weights and signs of the inputs and outputs are: A=−1, B=−1, C=+1, S=+1, Y=−2.

11. A binary adder structure according to claim 4 wherein the relative weights and signs of the inputs and outputs are: A=−1, B=−1, C=−1, S=−1, Y=−2.

12. The binary adder structure of claim 4, further comprising:

a multiplexor having a first input, a second input, a first selector, and a first output, said first input coupled to said first "A" input, said second input coupled to said third "C" input, and said first output coupled to said second "Y" output;

a first exclusive NOR gate having a first NOR input, a second NOR input, and first NOR output, said first NOR input coupled to said first "A" input, and said second NOR input coupled to said second "B" input; and a second exclusive NOR gate having a third NOR input, a fourth NOR input, and a second NOR output, said third NOR input coupled to said first NOR output and to said first selector, said fourth NOR input coupled to said third "C" input, and said second NOR output coupled to said first "S" output.

13. The binary adder structure of claim 12, further comprising:

a multiplexor having a first input, a second input, a third input, a fourth input, a first selector, a second selector, and a first output, said first input and said fourth input coupled to said first "A" input, and said first output coupled to said second "Y" output;

a first exclusive NOR gate having a first NOR input, a second NOR input, and first NOR output, said first NOR input coupled to said first "A" input, and said second NOR input coupled to said second "B" input and to said first selector; and a second exclusive NOR gate having a third NOR input, a fourth NOR input, and a second NOR output, said third NOR input coupled to said first NOR output, said fourth NOR input coupled to said third "C" input and said second selector, and said second NOR output coupled to said first "S" output.

14. A binary adder structure comprising:

first "A", second "B", third "C", fourth "D" and fifth "E" inputs, said "C" and "D" inputs both to be received by a first time, said "A" and "B" inputs both to be received by a second time, and said "E" input to be received by a third time;

first "X", second "Y" and third "Z" outputs, said "X" output representing a sum of said "A", "B", "C", "D" and "E" inputs, said "Y" output representing a first carry from the addition of said "A", "B", "C", "D" and "E" inputs, and said "Z" output representing a second carry from the addition of said "A", "B", "C", "D" and "E" inputs, said "Z" output available by said third time and said "X" and "Y" outputs available by a fourth time, said fourth time being later than said third time, said third time being later than said second time and said second time being later than said first time.

15. A binary adder structure according to claim 14 wherein the delay from said first time to said second time is one gate delay, the delay from said second time to said third time is one gate delay and the delay from said third time to said fourth time is one gate delay.

16. A binary adder structure according to claim 14 wherein the relative weights and signs of the inputs and outputs are: A=+1, B=−1, C=−1, D=+1, E=+1, X=+1, Y=+2, Z=−2.

17. A binary adder structure according to claim 14 wherein the relative weights and signs of the inputs and outputs are: A=−1, B=−1, C=+1, D=−1, E=+1, X=−1, Y=+2, Z=−2.

18. A binary adder structure according to claim 14 wherein the relative weights and signs of the inputs and outputs are: A=+1, B=+1, C=+1, D=+1, E=+1, X=+1, Y=+2 and Z=+2.

19. The binary adder structure of claim 14, further comprising:
   a first NAND gate having a first NAND input coupled to said third "C" input, a second NAND input coupled to said fourth "D" input, and a first NAND output;
   a second NAND gate having a third NAND input coupled to said first "A" input, a fourth NAND input coupled to said second "B" input, and a second NAND output;
   a first OR gate having a first OR input coupled to said third "C" input, a second input coupled to said fourth "D" input, and a first OR output;
   a third NAND gate having a fifth NAND input coupled to said first OR output, a sixth NAND input coupled to said second NAND output, and a third NAND output coupled to said third "Z" output;
   a second OR gate having a third OR input coupled to said first "A" input, a fourth OR input coupled to said second "B" input, and a second OR output;
   a fourth NAND gate having a seventh NAND input coupled to said second OR output, an eight NAND input coupled to said first NAND output, and a fourth NAND output;
   a first XOR gate having a first XOR input coupled to said first "A" input, a second XOR input coupled to said second "B" input, a third XOR input coupled to said third "C" input, a fourth XOR input coupled to said fourth "D" input, and a first XOR output;
   a multiplexor having a first input coupled to said fourth NAND output, a second input to said fifth "E" input, a first selector coupled to said first XOR output, and a first output coupled to said second "Y" output; and
   a second XOR gate having a fifth input coupled to said first XOR output, a sixth input coupled to said fifth "E" input, and a second XOR output coupled to said second "X" output.

20. The binary adder structure of claim 14, farther comprising:
   a first XOR gate having a first XOR input and a second XOR input coupled to said first "A" input, a third XOR input coupled to said third "C" input, a fourth XOR input coupled to said fourth "D" input, and a first XOR output;
   a first OR gate having a first OR input coupled to said first "A" input, a second OR input coupled to said second "B" input, and a first OR output;
   a first NAND gate having a first NAND input coupled to said fourth "D" input, a second NAND input coupled to said third "C" input, and a first NAND output;
   a first AND gate having a first AND input coupled to said first OR output, a second AND input coupled to said first NAND output, and a first AND output coupled to said third "Z" output;
   a second NAND gate having a third NAND input coupled to said first "A" input, a fourth NAND input coupled to said third "C" input, and a second NAND output;
   a first multiplexor having a first input coupled to said second NAND output, a second input coupled to said third "C" input, a first selector coupled to said fourth "D" input, and a first output;
   a second multiplexor having a first input coupled to said fifth "E" input, a second input coupled to said first output, a second selector coupled to said first XOR output, and a second output; and
   a second XOR gate having a third XOR input coupled to said second selector and said first XOR output, a fourth input coupled to said fifth "E" input, and a second XOR output coupled to said second "X" output.

21. A binary adder structure comprising:
   first "A", second "B", third "C", fourth "D" and fifth "E" inputs, said "B", "C", "D" and "E" inputs all to be received by a first time and said "A" input to be received by a second time;
   first "X", second "Y" and third "Z" outputs, said "X" output representing a sum of said "A", "B", "C", "D" and "E" inputs, said "Y" output representing a first carry from the addition of said "A", "B", "C", "D" and "E" inputs, and said "Z" output representing a second carry from the addition of said "A", "B", "C", "D" and "E" inputs, said "Z" output available by a third time and said "X" and "Y" outputs available by a fourth time, said fourth time being later than said third time, said third time being later than said second time and said second time being later than said first time.

22. A binary adder structure according to claim 21 wherein the delay from said first time to said second time is one gate delay, the delay from said second time to said third time is one gate delay and the delay from said third time to said fourth time is one gate delay.

23. A binary adder structure according to claim 21 wherein the relative weights and signs of the inputs and outputs are: A=+1, B=+1, C=+1, D=+2, E=+2, X=+1, Y=+2, Z=+4.

24. A binary adder structure according to claim 21 wherein the relative weights and signs of the inputs and outputs are: A=−1, B=+1, C=−1, D=+2, E=−2, X=+1, Y=+2, Z=−4.

25. A binary adder structure comprising:
   first "A", second "B", third "C", fourth "D" and fifth "E" inputs, said "B", "C" and "D" inputs all to be received by a first time and said "A" and "E" inputs both to be received by a second time;
   first "X", second "Y" and third "Z" outputs, said "X" output representing a sum of said "A", "B", "C", "D" and "E" inputs, said "Y" output representing a first carry from the addition of said "A", "B", "C", "D" and "E" inputs, and said "Z" output representing a second carry from the addition of said "A", "B", "C", "D" and "E" inputs, said "Z" output available by a third time and said "X" and "Y" outputs available by a fourth time, said fourth time being later than said third time, said third time being later than said second time and said second time being later than said first time.

26. A binary adder structure according to claim 25 wherein the delay from said first time to said second time is one gate delay, the delay from said second time to said third time is one gate delay and the delay from said third time to said fourth time is one gate delay.

27. A binary adder structure according to claim 25 wherein the relative weights and signs of the inputs and outputs are: A=+1, B=+1, C=+1, D=+2, E=+2, X=+1, Y=+2, Z=+4.

28. A binary adder structure according to claim 25 wherein the relative weights and signs of the inputs and outputs are: A=+1, B=+1, C=+1, D=+2, E=−2, X=+1, Y=−2, Z=+4.

29. A binary adder structure comprising:

first "A", second "B", third "C", fourth "D" and fifth "E" inputs, said "B", "C" and "D" inputs all to be received by a first time and said "A" and "E" inputs both to be received by a second time;

first "X", second "Y" and third "Z" outputs, said "X" output representing a sum of said "A", "B", "C", "D" and "E" inputs, said "Y" output representing a first carry from the addition of said "A", "B", "C", "D" and "E" inputs, and said "Z" output representing a second carry from the addition of said "A", "B", "C", "D" and "E" inputs, said "X" and "Z" outputs available by a third time and said "Y" output available by a fourth time, said fourth time being later than said third time, said third time being later than said second time and said second time being later than said first time.

30. A binary adder structure according to claim 29 wherein the delay from said first time to said second time is one gate delay, the delay from said second time to said third time is one gate delay and the delay from said third time to said fourth time is one gate delay.

31. A binary adder structure according to claim 29 wherein the relative weights and signs of the inputs and outputs are: A=+1, B=+1, C=+1, D=+2, E=+2, X=+1, Y=+2, Z=+4.

32. A binary adder structure according to claim 29 wherein the relative weights and signs of the inputs and outputs are: A=+1, B=+1, C=+1, D=−2, E=+2, X=+1, Y=−2, Z=+4.

33. A binary adder structure according to claim 29 wherein the relative weights and signs of the inputs and outputs are: A=+1, B=+1, C=+1, D=+2, E=−2, X=+1, Y=−2, Z=+4.

34. The binary adder structure of claim 29, further comprising:

a first XOR gate having a first XOR input coupled to said second "B" input, a second XOR input coupled to said third "C" input, and a first XOR output;

a first OR gate having a first OR input coupled to said second "B" input, a second OR input coupled to said third "C" input, and a first OR output;

a second OR gate having a third OR input coupled to said first "A" input, a fourth OR input coupled to said first XOR output, "C" input, and a second OR output;

a first NAND gate having a first NAND input coupled to said second OR output, a second NAND input coupled to said first OR output, and a first NAND output;

a first XNOR gate having a first XNOR input coupled to said first XOR output, a second XNOR input coupled to said first "A" input, and a first XNOR output coupled to said first "X" output;

a first inverter having a first inverter input coupled to said fourth "D" input and a first inverter output;

a first multiplexor having a first input coupled to said first inverter output, a second input and a third input each coupled to said fourth "D" input, a fourth input coupled to said first inverter output; a first selector coupled to said fifth "E" input, a second selector coupled to said first NAND output, and a first output coupled to said second "Y" output;

a first NOR gate having a first NOR input coupled to said fourth "D" input, a second NOR input coupled to said fifth "E" input, and a first NOR output;

a third OR gate having a fifth OR input coupled to said second selector, a sixth OR input coupled to said first NOR output, and a third OR output coupled to said third "Z" output;

a second NAND gate having a third NAND input coupled to said fourth "D" input, a fourth NAND input coupled to said fifth "E" input, and a second NAND output; and a third NAND gate having a fifth NAND input coupled to said third OR output, a sixth NAND input coupled to said second NAND output, and a thrid NAND output coupled to said third "Z" output.

35. The binary adder structure of claim 29, further comprising:

a first XNOR gate having a first XNOR input coupled to said second "B" input, a second XNOR input coupled to said third "C" input, and a first XNOR output;

a first OR gate having a first OR input coupled to said first "A" input, a second OR input coupled to said first XNOR output, and a first OR output;

a second OR gate having a third OR input coupled to said second "B" input, a fourth OR input coupled to said third "C" input, and a second OR output;

a first NAND gate having a first NAND input coupled to said first OR output, a second NAND input coupled to said second OR output, and a first NAND output;

a second XNOR gate having a third XNOR input coupled to said first XNOR output, a second XNOR input coupled to said first "A" input, and a second XNOR output coupled to said first "X" output;

a second NAND gate having an inverted NAND input coupled to said fourth "D" input, a third NAND input coupled to said fifth "E" input, and a second NAND output an XOR gate having a first XOR input coupled to said fourth "D" input, a second XOR input coupled to said fifth "E" input, and an XOR output;

a third XNOR gate having a fifth XNOR input coupled to said first NAND output, a sixth XNOR input coupled to said XOR output, and a third XNOR output coupled to said second "Y" output;

a third OR gate having a fifth OR input coupled to said first NAND output, a sixth OR input coupled to said XOR output, and a third OR output; and* a third NAND gate having a fifth NAND input coupled to said third OR output, a sixth NAND input coupled to said second NAND output, and a third NAND output coupled to said third "Z" output.

36. A binary adder structure comprising:

first "A", second "B", third "C", fourth "D" and fifth "E" inputs, said "B", "C", "D" and "E" inputs all to be received by a first time and said "A" input to be received by a second time;

first "X", second "Y" and third "Z" outputs, said "X" output representing a sum of said "A", "B", "C", "D" and "E" inputs, said "Y" output representing a first carry from the addition of said "A", "B", "C", "D" and "E" inputs, and said "Z" output representing a second carry from the addition of said "A", "B", "C", "D" and "E" inputs, said "X", "Y" and "Z" outputs all available by a third time, said third time being later than said second time and said second time being later than said first time.

37. A binary adder structure according to claim 36 wherein the delay from said first time to said second time is one gate delay and the delay from said second time to said third time is one gate delay.

38. A binary adder structure according to claim 36 wherein the relative weights and signs of the inputs are: A=−1, B=−1, C=+1, D=−2, E=+2, X=+1, Y=+2, Z=−4.

39. A binary adder structure according to claim 36 wherein the relative weights and signs of the inputs and outputs are: A=+1, B=+1, C=+1, D=+2, E=+2, X=+1, Y=+2 and Z=+4.

40. A binary adder structure comprising:
first "A", second "B", third "C", fourth "D" and fifth "E" inputs, said "B", "C" and "D" inputs all to be received by a first time and said "A" and "E" inputs to be received by a second time;
first "X", second "Y" and third "Z" outputs, said "X" output representing a sum of said "A", "B", "C", "D" and "E" inputs, said "Y" output representing a first carry from the addition of said "A", "B", "C", "D" and "E" inputs, and said "Z" output representing a second carry from the addition of said "A", "B", "C", "D" and "E" inputs, said "X", "Y" and "Z" outputs all available by a third time, said third time being later than said second time and said second time being later than said first time.

41. A binary adder structure according to claim 40 wherein the delay from said first time to said second time is one gate delay and the delay from said second time to said third time is one gate delay.

42. A binary adder structure according to claim 40 wherein the relative weights and signs of the inputs and outputs are: A=−1, B=−1, C=+1, D=−2, E=+2, X=+1, Y=+2, Z=−4.

43. A binary adder structure according to claim 40 wherein the relative weights and signs of the inputs and outputs are: A=+1, B=+1, C=+1, D=+2, E=−2, X=+1, Y=−2, Z=+4.

44. A binary adder structure according to claim 40 wherein the relative weights and signs of the inputs and outputs are: A=−1, B=+1, C=−1, D=+2, E=−2, X=+1, Y=+2, Z=−4.

45. A binary adder structure according to claim 40 wherein the relative weights and signs of the inputs and outputs are: A=+1, B=+1, C=+1, D=+2, E=+2, X=+1, Y=+2 and Z=+4.

46. The binary adder structure of claim 40, further comprising:
a first XNOR gate having a first XNOR input coupled to said second "B" input, a second XNOR input coupled to said third "C" input, and a first XNOR output;
a first OR gate having a first OR input coupled to said first "A" input, a second OR input coupled to said first XNOR output, and a first OR output;
a second OR gate having a third OR input coupled to said second "B" input, a fourth OR input coupled to said third "C" input, and a second OR output;
a first NAND gate having a first NAND input coupled to said first OR output, a second NAND input coupled to said second OR output, and a first NAND output;
a second XNOR gate having a third XNOR input coupled to said first XNOR output, a second XNOR input coupled to said first "A" input, and a second XNOR output coupled to said first "X" output;

a first NOR gate having an inverted NOR input coupled to said fifth "E" input, a first input coupled to said fourth "D" input, and a first NOR output;
a second NAND gate having an inverted NAND input coupled to said fifth "E" input, a third NAND input coupled to said fourth "D" input, and a second NAND output;
a first inverter having an inverter input and an inverter output, said inverter input coupled to said fifth "D" input;
a multiplexor having a first input coupled to said inverter output, a second input and a third input coupled to said fifth "D" input, a fourth input coupled to said inverter output, a first selector coupoled to said fifth "E" input, a second selector coupled to said first NAND output; and an output coupled to said second "Y" output;
a third OR gate having a fifth OR input coupled to said first NAND output, a sixth OR input coupled to said first NOR output, and a third OR output; and
a third NAND gate having a fourth NAND input coupled to said third OR output, a fifth NAND input coupled to said second NAND output, and a third NAND output coupled to said third "Z" output.

47. In a multiplier array including: a plurality of X inputs, each representing a bit of an X input value, a plurality of Y inputs, each representing a bit of a Y input value, an array of AND gates disposed to form a partial product array of partial products of said X inputs and said Y inputs, at least a portion of said multiplier array being organized as a plurality of groups of circuitry, each of said groups of circuitry having three columns of 3/2 full-adders, the left-most column of each group being "lower" than the middle column and the middle column being "higher" and the left-most group being "lower" than a group to the right of it, circuitry comprising:
a first bitslice of said multiplier array in a first group of three columns of full-adders, said bitslice and group including a first, second and third 3/2 full-adder, each having three inputs, a carry output and a sum output, said first 3/2 full-adder having each of said its three inputs connected to different outputs of said AND gates of said partial product array, its carry output connected to a first input of a fourth 3/2 full-adder in a next higher column of the same group in a next higher bitslice, and its sum output connected to a first input of said second 3/2 full-adder;
said second 3/2 full-adder having a second input connected to a carry output of a fifth 3/2 full-adder in a next lower column of the same group in a next lower bitslice, a carry output connected to a first input of a sixth 3/2 full-adder in a next higher column of the same group in a next higher bitslice, a sum output connected to a first input of said third 3/2 full-adder, and a third input connected to a sum output of a seventh 3/2 full-adder in the same column of a next lower group in the same bitslice; and
said third 3/2 full-adder having a second input connected to a carry input of an eighth 3/2 full-adder in a next lower column of the same group in a next lower bitslice, a third input connected to a carry output of a ninth 3/2 full-adder in the same column of a next lower group in a next lower bitslice, a carry output connected to a first input of a tenth 3/2 full-adder in the same column of a next higher group in the next higher bitslice.

48. An unsigned mutiplier array comprising:
at least one "H/U" group, each having a type Fc 3/2 full adders, a type F 3/2 full adder, and a type Fo 3/2 adder;
at least one "C/U" group coupled to said "H/U" group, each of said "C/U" group having at least one type F 3/2 full adder; and
at least one "A/U" group coupled to said "C/U" group, said at least one "A/U" group each having at least one two-input half-adder.

49. An unsigned multiplier array comprising:
at least one "H/U" group, each having a type Fc 3/2 full adders, a type F 3/2 full adder, and a type Fo 3/2 adder; and
at least one "A/U" group, each having at least one two input half-adder.

50. An unsigned multiplier array comprising:
at least one "D1/U" group, each having at least one type Fc 3/2 full adders and at least one type F 3/2 full adders;
at least one "C/U" group coupled to said "D1/U" group, each of said "C/U" group having at least one type F 3/2 full adder; and
at least one "A/U" group coupled to said "C/U" group, said at least one "A/U" group each having at least one two-input half-adder.

51. An unsigned multiplier array comprising:
at least one "D1/U" group, each having at least one type Fc 3/2 full adder and at least one type F 3/2 full adder; and
at least one "A/U" group, each having at least one two input half-adder.

52. An unsigned multiplier array comprising:
at least one "E0/U" group, each having at least one type Fc 3/2 full adder and at least one type F 3/2 full adder;
at least one "C/U" group coupled to said "E0/U" group, each of said "C/U" group having at least one type F 3/2 full adder; and
at least one "A/U" group coupled to said "C/U" group, said at least one "A/U" group each having at least one two-input half-adder.

53. An unsigned multiplier array comprising:
one "E1f/U" group having at least one type F 3/2 full adder, at least one type Fc 3/2 full adder, and a type Fy 3/2 full adder;
at least one "E1i/U" group, each having at least one type F 3/2 full adder and at least one type Fc 3/2 full adder;
at least one "C/U" group coupled to said "E1f/U" group, each of said "C/U" group having at least one type F 3/2 full adder; and
a "A/U" group coupled to said "C/U" group, said "A/U" group having at least one two-input half-adder.

54. An unsigned multiplier array comprising:
one "D2f/U" group having at least one type Fc 3/2 full adder, at least one type F 3/2 full adder, and a type Fo 3/2 full adder;
at least one "D2i/U" group coupled to said "D2f/U" group, each of said "D2f/U" group having at least at least one type Fc 3/2 full adder and at least one type Fo 3/2 full adder; and
a "A/U" group coupled to said "D2i/U" group, said "A/U" group having at least one two-input half-adder.

55. An unsigned multiplier array comprising:
one "D2f/U" group having at least at least one type Fc 3/2 full adder and at least one type Fo 3/2 full adder;

at least one "D2i/U" group coupled to said "D2f/U" group, each of said "D2i/U" group having at least at least one type Fc 3/2 full adder and at least one type Fo 3/2 full adder; and
a "B2/U" group coupled to said "D2i/U" group and having at least one two-input half-adder, at least one type F 3/2 full adder, and at least one type Fo 3/2 full adder.

56. An unsigned multiplier array comprising:
an "E2f/U" group having at least one type F 3/2 full adder, at least one type Fc 3/2 full adder, at least one type Fo 3/2 full adder, a type Fv 3/2 full adder, and a type Fy 3/2 full adder;
at least one "E2i/U" group coupled to said "E2f/U" group and having at least one type F 3/2 full adder, at least one type Fc 3/2 full adder, at least one type Fo 3/2 full adder, and at least one type Fv 3/2 full adder;
at least one "D2i/U" group coupled to said "E2i/U" group, each of said "D2i/U" group having at least at least one type Fc 3/2 full adder and at least one type Fo 3/2 full adder; and
a "B2/U" group coupled to said "D2i/U" group and having at least one two-input half-adder, at least one type F 3/2 full adder, and at least one type Fo 3/2 full adder.

57. An unsigned multiplier array comprising:
one "E2f/U" group having at least one type F 3/2 full adder, at least one type Fc 3/2 full adder, at least one type Fo 3/2 full adder a type Fv 3/2 full adder, and a type Fy 3/2 full adder;
at least one "E2i/U" group coupled to said "E2f/U" group and having at least one type F 3/2 full adder, at least one type Fc 3/2 full adder, at least one type Fo 3/2 full adder, and at least one type Fv 3/2 full adder; and
a "G2/U" group coupled to said "E2i/U" group and having at least one type F 3/2 full adder, at least one type Fc 3/2 full adder, at least one type Fo 3/2 full adder and at least one two-input half-adder.

58. An unsigned multiplier array comprising:
one "E2f/U" group having at least one type F 3/2 full adder, at least one type Fc 3/2 full adder, at least one type Fo 3/2 full adder, a type Fv 3/2 full adder, and a type Fy 3/2 full adder;
at least one "E2i/U" group coupled to said "E2f/U" group and having at least one type F 3/2 full adder, at least one type Fc 3/2 full adder, at least one type Fo 3/2 full adder, and at least one type Fv 3/2 full adder;
at least one "C/U" group coupled to said "E2i/U" group, each of said "C/U" group having at least one type F 3/2 full adder; and
an "A/U" group coupled to said "C/U" group, said "A/U" group having at least one two-input half-adder.

59. A two's complement signed multiplier array comprising:
one "Hf/S" group having a type F 3/2 full adder, at least one type Fc 3/2 full adder and at least one type Fo 3/2 full adder;
at least one "Hi/S" group coupled to said "Hf/S" group and having at least one type F 3/2 full adder, at least one type Fc 3/2 full adder and at least one type Fo 3/2 full adder;
at least one "Ci/S" group coupled to said "Hi/S" group and having at least one type F 3/2 full adder; and
an "A/S" group coupled to said "Ci/S" group and having at least one two-input half-adder.

60. A two's complement signed multiplier array comprising:
one "Hf/S" group having a type F 3/2 full adder, at least one type Fc 3/2 full adder and at least one type Fo 3/2 full adder;
at least one "Hi/S" group coupled to said "Hf/S" group and having at least one type F 3/2 full adder, at least one type Fc 3/2 full adder and at least one type Fo 3/2 full adder; and
an "A/S" group coupled to said "Hi/S" group and having at least one two-input half-adder.

61. A two's complement signed multiplier array comprising:
a "D1f/S" group having at least one type F 3/2 full adder, at least one type Fc 3/2 full adder, and a type Fx 3/2 full adder;
at least one "D1i/S" group coupled to said " D1f/S" group and having at least one type F 3/2 full adder, at least one type Fc 3/2 full adder, and a type Fx 3/2 full adder;
at least one "Ci/S" group coupled to said "D1i/S" group and having at least one type F 3/2 full adder; and
an "A/S" group coupled to said "Ci/S" group and having at least one two-input half-adder.

62. A two's complement signed multiplier array comprising:
one "D1f/S" group having at least one type F 3/2 full adder, at least one type Fc 3/2 full adder, and a type Fx 3/2 full adder;
at least one "D1i/S" group coupled to said "D1f/S" group and having at least one type F 3/2 full adder, at least one type Fc 3/2 full adder, and a type Fx 3/2 full adder; and
an "A/S" group coupled to said "D1i/S" group and having at least one two-input half-adder.

63. A two's complement signed multiplier array comprising:
an "E0f/S" group having at least one type F 3/2 full adder and at least one type Fc 3/2 full adder;
at least one "E0i/S" group coupled to said "E0f/S" group and having at least one type F 3/2 full adder and at least one type Fc 3/2 full adder;
at least one "Ci/S" group coupled to said "E0i/S" group and having at least one type F 3/2 full adder; and
an "A/S" group coupled to said "Ci/S" group and having at least one two-input half-adder.

64. A two's complement signed multiplier array comprising:
an "E1f/S" group having at least one type F 3/2 full adder, at least one type Fc 3/2 full adder, a type Fx 3/2 full adder, and a type Fy 3/2 full adder;
at least one "E1i/S" group coupled to said "E1f/S" group and having at least one type F 3/2 full adder, at least one type Fc 3/2 full adder, and a type Fx 3/2 full adder;
at least one "Ci/S" group coupled to said "E1i/S/" group and having at least one type F 3/2 full adder; and
an "A/S" group coupled to said "Ci/S" group and having at least one two-input half-adder.

65. A two's complement signed multiplier array comprising:
one "D2f/S" group having at least one type F 3/2 full adder, a type Fo 3/2 full adder, and at least one type Fc 3/2 full adder;
at least one "D2i/S" group coupled to said "D2f/S" group and having at least one type Fo 3/2 full adder and at least one type Fc 3/2 full adder; and
an "A/S" group coupled to said "D2i/S" group and having at least one two-input half-adder.

66. A two's complement signed multiplier array comprising:
one "D2f/S" group having at least one type F 3/2 full adder, a type Fo 3/2 full adder, and at least one type Fc 3/2 full adder;
at least one "D2i/S" group coupled to said "D2f/S" group and having at least one type Fo 3/2 full adder and at least one type Fc 3/2 full adder; and
a "B2/S" group coupled to said "D2i/S" group and having at least one type Fo 3/2 full adder, at least one type F 3/2 full adder, and at least one two-input half adder.

67. A two's complement signed multiplier array comprising:
an "E2f/S" group having at least one type F 3/2 full adder, at least one type Fc 3/2 full adder, a type Fo 3/2 full adder, a type Fv 3/2 full adder, and a type Fy 3/2 full adder;
at least one "E2i/S" group coupled to said "E2f/S" and having at least one type F 3/2 full adder, at least one type Fc 3/2 full adder, at least one type Fo 3/2 full adder, a type Fu 3/2 full adder, and at least one type Fv 3/2 full adder;
at least one "D2i/S" group coupled to said "E2i/S" group and having at least one type Fo 3/2 full adder and at least one type Fc 3/2 full adder; and
a "B2/S" group coupled to said "D2i/S" group and having at least one type Fo 3/2 full adder, at least one type F 3/2 full adder, and at least one two-input half adder.

68. A two's complement signed multiplier array comprising:
an "E2f/S" group having at least one type F 3/2 full adder at least one type Fc 3/2 full adder, a type Fo 3/2 full adder, a type Fv 3/2 full adder, and a type Fy 3/2 full adder;
at least one "E2i/S" group coupled to said "E2f/S" and having at least one type F 3/2 full adder, at least one type Fc 3/2 full adder, at least one type Fo 3/2 full adder, a type Fu 3/2 full adder, and at least one type Fv 3/2 full adder; and
a "G2/S" group coupled to said "E2i/S" group and having at least one type F 3/2 full adder, at least one type Fc 3/2 full adder, at least one type Fo 3/2 full adder and at least one two-input full adder.

69. A two's complement signed multiplier array comprising:
an "E2f/S" group having at least one type F 3/2 full adder, at least one type Fc 3/2 full adder, a type Fo 3/2 full adder a type Fv 3/2 full adder, and a type Fy 3/2 full adder;
at least one "E2i/S" group coupled to said "E2f/S" and having at least one type F 3/2 full adder, at least one type Fc 3/2 full adder, at least one type Fo 3/2 full adder, a type Fu 3/2 full adder, and at least one type Fv 3/2 full adder; and
at least one "Ci/S" group coupled to said "E2i/S" group and having at least one type F 3/2 full adder; and
an "A/S" group coupled to said "Ci/S" group and having at least one two-input half-adder.

* * * * *

UNITED STATES PATENT AND TRADEMARK OFFICE
CERTIFICATE OF CORRECTION

PATENT NO: 5,974,437
DATED: October 26, 1999
INVENTOR(S): Johannsen

It is certified that error appears in the above-identified patent and that said Letter Patent are hereby corrected as shown below:

In column 5 line 8 delete "Febuary" and insert - - February- -.
In column 23 line 14 delete "bitslicel timing" and insert - - bitslice/timing- -.

In column 6 line 59 delete "FIG.2 is a is a schematic" and insert - - FIG. 2 is a schematic- -.
In column 17 line 4 under TABLE 7 delete "reproduceability" and insert - - reproducibility- - .
In column 32 line 15 delete "thrid" and insert - -third- -.
In column 34 line 14 delete "coupoled" and insert - - coupled- - .
In column 35 line 1 delete "mutiplier" and insert - - multiplier- -.

Signed and Sealed this

Seventeenth Day of April, 2001

Attest:

NICHOLAS P. GODICI

Attesting Officer    Acting Director of the United States Patent and Trademark Office